(12) United States Patent
Hirose et al.

(10) Patent No.: US 9,317,119 B2
(45) Date of Patent: Apr. 19, 2016

(54) HAPTIC FEEDBACK DEVICE, HAPTIC FEEDBACK METHOD, DRIVING SIGNAL GENERATING DEVICE AND DRIVING SIGNAL GENERATION METHOD

(71) Applicant: Panasonic Corporation, Osaka (JP)

(72) Inventors: Yoshifumi Hirose, Kyoto (JP); Shoichi Araki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 179 days.

(21) Appl. No.: 14/128,745

(22) PCT Filed: Mar. 14, 2013

(86) PCT No.: PCT/JP2013/001694
§ 371 (c)(1),
(2) Date: Dec. 23, 2013

(87) PCT Pub. No.: WO2013/161163
PCT Pub. Date: Oct. 31, 2013

(65) Prior Publication Data
US 2014/0132568 A1 May 15, 2014

(30) Foreign Application Priority Data

Apr. 27, 2012 (JP) ................................ 2012-104167
Nov. 30, 2012 (JP) ................................ 2012-263690

(51) Int. Cl.
*G06F 3/01* (2006.01)
*G06F 3/044* (2006.01)
*G06F 3/041* (2006.01)

(52) U.S. Cl.
CPC ................ *G06F 3/016* (2013.01); *G06F 3/044* (2013.01); *G06F 3/0416* (2013.01); *G06F 2203/04104* (2013.01)

(58) Field of Classification Search
CPC ....... G06F 3/016; G06F 3/043; G06F 3/0433; G06F 3/0436; G06F 3/044; G06F 3/0416; G06F 2203/04104; G06F 3/00; G08B 6/00
See application file for complete search history.

(56) References Cited

U.S. PATENT DOCUMENTS 7,742,036 B2 * 6/2010 Grant et al. .................... 345/156
8,378,979 B2 * 2/2013 Frid et al. ...................... 345/173
(Continued)

FOREIGN PATENT DOCUMENTS

JP        2950435        9/1999
JP      2010-55282        3/2010
(Continued)

OTHER PUBLICATIONS

International Search Report issued Jun. 18, 2013 in International (PCT) Application No. PCT/JP2013/001694.

*Primary Examiner* — Dwayne Bost
*Assistant Examiner* — Darlene M Ritchie
(74) *Attorney, Agent, or Firm* — Wenderoth, Lind & Ponack, L.L.P.

(57) ABSTRACT

A haptic feedback device includes: a plurality of actuators for vibrating a panel; a touch information obtaining unit for obtaining a plurality of touch positions on the panel; a haptic feedback determining unit for determining a first touch position at which to provide haptic feedback from among the plurality of touch positions; and a driving signal obtaining unit for obtaining first driving signals for driving the actuators to vibrate the panel at the first touch position according to a first haptic signal and vibrate the panel at a second touch position more weakly than at the first touch position, the first driving signals being generated using transfer functions from the actuators to the first touch position or a vicinity thereof and transfer functions from the actuators to the second touch position or a vicinity thereof.

20 Claims, 38 Drawing Sheets

(56) References Cited

U.S. PATENT DOCUMENTS

| | | | |
|---|---|---|---|
| 2004/0160421 A1* | 8/2004 | Sullivan | 345/173 |
| 2005/0146512 A1* | 7/2005 | Hill et al. | 345/173 |
| 2007/0002029 A1* | 1/2007 | Iso | 345/173 |
| 2007/0097073 A1* | 5/2007 | Takashima et al. | 345/156 |
| 2008/0198139 A1* | 8/2008 | Lacroix et al. | 345/173 |
| 2009/0002328 A1 | 1/2009 | Ullrich et al. | |
| 2009/0167704 A1 | 7/2009 | Terlizzi et al. | |
| 2009/0250267 A1 | 10/2009 | Heubel et al. | |
| 2009/0284485 A1* | 11/2009 | Colgate et al. | 345/173 |
| 2010/0079264 A1* | 4/2010 | Hoellwarth | 340/407.2 |
| 2010/0156818 A1* | 6/2010 | Burrough et al. | 345/173 |
| 2010/0231550 A1* | 9/2010 | Cruz-Hernandez et al. | 345/174 |
| 2010/0238115 A1 | 9/2010 | Komaarashi et al. | |
| 2010/0265191 A1* | 10/2010 | Mui et al. | 345/173 |
| 2010/0315364 A1 | 12/2010 | Miyake | |
| 2011/0090167 A1 | 4/2011 | Harris | |
| 2011/0242029 A1 | 10/2011 | Kasahara et al. | |
| 2011/0260990 A1* | 10/2011 | Ali et al. | 345/173 |
| 2012/0050230 A1* | 3/2012 | Harris | 345/178 |
| 2012/0086564 A1* | 4/2012 | Sinha | 340/407.1 |
| 2012/0194460 A1* | 8/2012 | Kuwabara et al. | 345/173 |
| 2012/0229407 A1* | 9/2012 | Harris et al. | 345/173 |
| 2013/0222311 A1* | 8/2013 | Pesonen | 345/173 |
| 2013/0278400 A1* | 10/2013 | Harris | 340/407.1 |
| 2015/0035774 A1* | 2/2015 | Christiansson et al. | 345/173 |

FOREIGN PATENT DOCUMENTS

| | | |
|---|---|---|
| JP | 2010-224684 | 10/2010 |
| JP | 2010-286986 | 12/2010 |
| JP | 2011-519082 | 6/2011 |
| JP | 2011-221640 | 11/2011 |
| JP | 2011-527791 | 11/2011 |
| WO | 2009/085060 | 7/2009 |
| WO | 2009/123769 | 10/2009 |
| WO | 2010/038552 | 4/2010 |
| WO | 2011/102898 | 8/2011 |

* cited by examiner

Offline processing

Online processing

Offline processing

Online processing

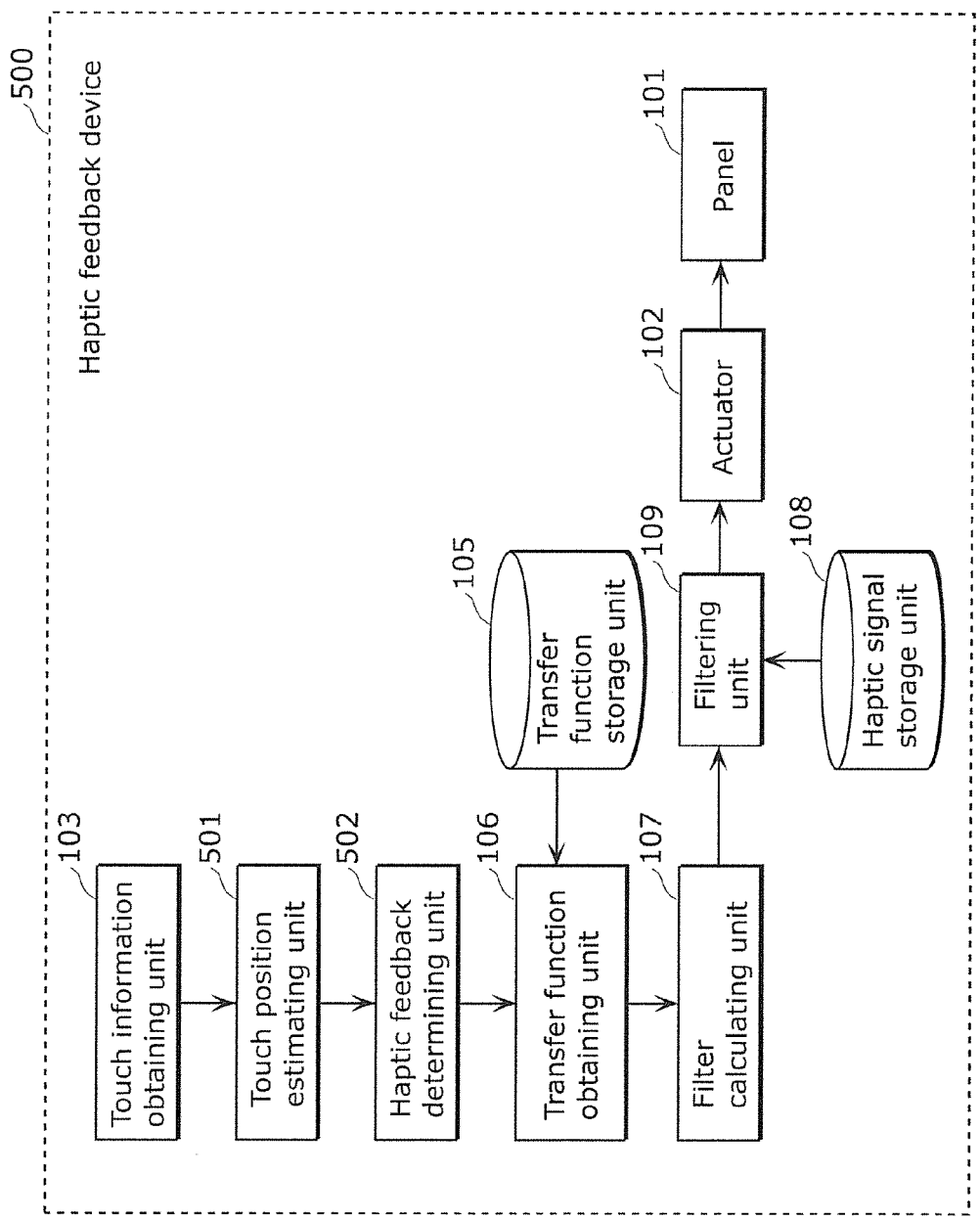

HAPTIC FEEDBACK DEVICE, HAPTIC FEEDBACK METHOD, DRIVING SIGNAL GENERATING DEVICE AND DRIVING SIGNAL GENERATION METHOD

TECHNICAL FIELD

The present invention relates to a haptic feedback device and a haptic feedback method for providing haptic feedback for a user action performed on a touch panel.

BACKGROUND ART

Public terminals (for example, automated teller machines (ATM) and ticket vending machines) which include touch panels are conventionally known. Moreover, the number of personal use devices (for example, tablet personal computers (PC) and smartphones) using touch panels is increasing.

Touch panels are input devices which detect touches made on the panel as inputs. Touch panels typically use a liquid crystal display or an organic light-emitting diode display. In this case, touch panels are also referred to as touch displays. For example, touch panels detect touches made by a user with respect to a graphical user interface (GUI) object (a button, for example) displayed in the display region.

These kinds of user interfaces used in touch panels are advantageous in that they are highly adaptable in regard to the arrangement of GUI objects. However, with these user interfaces, touch panels provide less sensory feedback upon the press of a button to user interfaces using conventional, mechanical buttons. As such, these kinds of user interfaces are disadvantageous in that they can cause the user to be uncertain about whether a touch he or she made on the touch panel was correctly detected or not.

A method of providing haptic feedback for a touch made on a touch panel has been proposed (see Patent Literature (PTL) 1). PTL 1 discloses a method of providing haptic feedback for touches made on a touch panel capable of detecting multiple touches (hereinafter referred to as a multi-touch panel).

CITATION LIST

Patent Literature

[PTL 1] United States Patent Application Publication No. 2009/0250267

SUMMARY OF INVENTION

Technical Problem

However, with the above conventional technique, an even further increase in the efficiency of haptic feedback for multiple touches is desired.

As such, the present invention provides a haptic feedback device and haptic feedback method which are capable of effectively providing haptic feedback with respect to multiple touches.

Solution to Problem

A haptic feedback device according to an aspect of the present invention is a haptic feedback device which provides haptic feedback to a user by vibrating a panel, the haptic feedback device including: the panel; a plurality of actuators placed in mutually different positions on the panel for vibrating the panel; a touch information obtaining unit configured to obtain a plurality of touch positions on the panel by detecting a plurality of touches having a state of concurrent contact on the panel; a haptic feedback determining unit configured to determine a first touch position at which to provide haptic feedback from among the plurality of touch positions; and a driving signal obtaining unit configured to obtain first driving signals for driving the plurality of actuators to vibrate the panel at the first touch position according to a first haptic signal and vibrate the panel at a second touch position included in the plurality of touch positions more weakly than at the first touch position, the first driving signals being generated using transfer functions from the plurality of actuators to the first touch position or a vicinity thereof and transfer functions from the plurality of actuators to the second touch position or a vicinity thereof, wherein the plurality of actuators vibrate the panel based on the first driving signals.

These general and specific aspects may be implemented using a system, a method, an integrated circuit, a computer program, a computer-readable recording medium, or any combination of systems, methods, integrated circuits, computer programs, or computer-readable recording media.

Advantageous Effects of Invention

An aspect of the present invention allows for the effective provision of haptic feedback with respect to multiple touches.

BRIEF DESCRIPTION OF DRAWINGS

FIG. 26 is a block diagram showing the functional configuration of the haptic feedback device according to Embodiment 5.

DESCRIPTION OF EMBODIMENTS

In the present Description, "multiple touches" refers to a plurality of touches having a state of concurrent contact on the panel. In other words, "multiple touches" means a plurality of touches which all contact the panel at a given point in time. To further clarify, multiple touches are a plurality of temporally overlapping touches made at a plurality of positions on the panel. As such, multiple touches are not only a plurality of touches initiated at the same time, but include touches initiated at different times which are detected at the same time, at some point in time. More specifically, when a second touch is initiated after a first touch is initiated and held, the first touch and the second touch are "multiple touches" at the point in time of the initiation of the second touch.

(Underlying Knowledge Forming Basis of the Present Invention)

With a multi-touch panel, it is possible for more than one user to perform actions at the same time. Moreover, with a multi-touch panel, a user is capable of intuitively enlarging or rotating a target object, for example, by performing an action using more than one finger. With such a multi-touch panel, regarding the provision of haptic feedback for the multiple touches, it is preferable to provide haptic feedback which can be discriminated for each touch.

Typically, when haptic feedback is provided for two or more touch positions at the same time with only one actuator, a similar type of haptic feedback is provided for each of the touch positions at the same time. Moreover, with one actuator, it is difficult to provide a given one of two or more touch positions with a different haptic feedback than the other touch positions.

Figure 1:
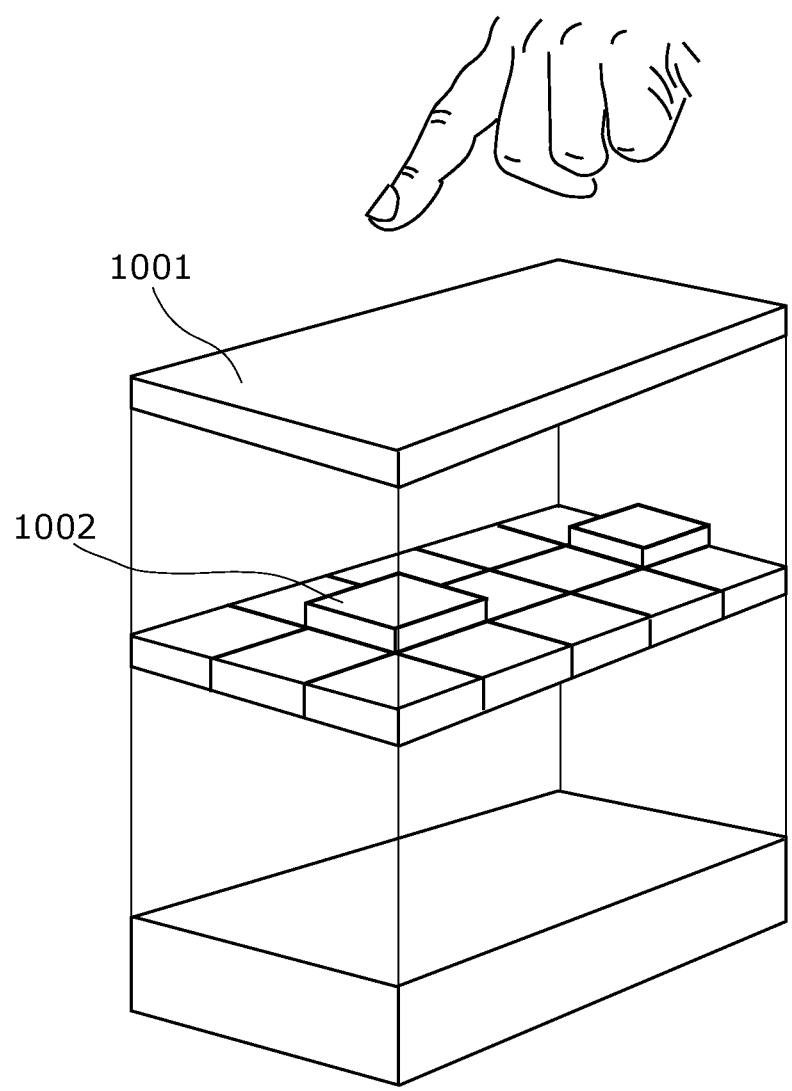
FIG. 1 shows the configuration of a conventional haptic feedback device.

In light of this, in the touch panel disclosed in PTL 1, an array of actuators 1002, each of which can be independently raised and lowered up and down, are disposed below a flexible surface layer 1001, as FIG. 1 shows. Distinguishable haptic feedback is provided for multiple touches by independently raising a plurality of actuators 1002 located below a touch position.

In this way, with the method disclosed in PTL 1, it is possible to provide a plurality of touch positions with different haptic feedback at the same time by disposing an array of actuators 1002 below the surface layer 1001. However, in order to provide haptic feedback at a given position on the surface layer 1001, it is necessary to provide the actuators 1002 in units as small as or smaller than the resolution of a human finger (approximately 10 mm to 20 mm). As such, with the method disclosed in PTL 1, provision of an extremely large number of actuators is required.

Moreover, in order to make it possible to directly touch a GUI object (such as a button) displayed on the screen, provision of a display apparatus, such as a liquid crystal display, below the actuators 1002 is required. As such, the actuators 1002 must be transparent. However, such transparent actuators are difficult to install in touch panels.

In light of this, a haptic feedback device according to an aspect of the present invention is a haptic feedback device which provides haptic feedback to a user by vibrating a panel, the haptic feedback device including: the panel; a plurality of actuators placed in mutually different positions on the panel for vibrating the panel; a touch information obtaining unit configured to obtain a plurality of touch positions on the panel by detecting a plurality of touches having a state of concurrent contact on the panel; a haptic feedback determining unit configured to determine a first touch position at which to provide haptic feedback from among the plurality of touch positions; and a driving signal obtaining unit configured to obtain first driving signals for driving the plurality of actuators to vibrate the panel at the first touch position according to a first haptic signal and vibrate the panel at a second touch position included in the plurality of touch positions more weakly than at the first touch position, the first driving signals being generated using transfer functions from the plurality of actuators to the first touch position or a vicinity thereof and transfer functions from the plurality of actuators to the second touch position or a vicinity thereof, wherein the plurality of actuators vibrate the panel based on the first driving signals.

With this configuration, it is possible to provide haptic feedback at a first touch position and provide haptic feedback weaker than what is provided at the first touch position at a second touch position, or not provide haptic feedback to the second touch position. As such, among multiple touches, it is possible to provide suitable haptic feedback by providing a touch requiring haptic feedback with haptic feedback that is different than what is provided for other touches. In other words, it is possible to reduce unnecessary confusion caused by haptic feedback. Moreover, the driving signals for driving each of the actuators is are signals generated using transfer functions. As such, even if the first touch position and an actuator are not adjacent, it is possible to provide a large vibration at the first touch position and provide a small or no vibration at a second touch position. In other words, since it is not necessary to provide a plurality of actuators below the panel, it is possible to efficiently provide haptic feedback for multiple touches. Furthermore, even in cases where a display apparatus is provided below the panel, provision of transparent actuators are not required, making it possible to relatively simply manufacture the haptic feedback device.

For example, the haptic feedback device may further include a filter obtaining unit configured to obtain first filters for generating, by filtering a given haptic signal, driving signals for driving the plurality of actuators to vibrate the panel at the first touch position according to the given haptic signal and vibrate the panel at the second touch position according to a signal having a weaker vibration strength than the given haptic signal, wherein the driving signal obtaining unit is configured to obtain the first driving signals by filtering the first haptic signal with the first filters.

With this configuration, it is possible to generate driving signals by filtering the haptic signal using filters. These filters are used on a given haptic signal. In other words, with respect to the generation of one driving signal, a common filter can be used for a plurality of haptic signals, thereby reducing the load for generating the driving signals.

For example, the filter obtaining unit may be configured to calculate the first filters to yield a sum of convolution results, in a time domain, of the transfer functions from the plurality of actuators to the first touch position and the first filters that indicates an impulse, and a sum of convolution results, in the time domain, of the transfer functions from the plurality of actuators to the second touch position and the first filters that indicates zero.

With this configuration, it is possible to calculate filters in the time domain.

For example, the filter obtaining unit may be configured to calculate the first filters to yield a sum of products, in a frequency domain, of the transfer functions from the plurality of actuators to the first touch position and the first filters that indicates an impulse, and a sum of products, in the frequency domain, of the transfer functions from the plurality of actuators to the second touch position and the first filters that indicates zero.

With this configuration, it is possible to calculate filters in the frequency domain. In other words, it is possible to reduce the processing load more so than when the filters are calculated in the time domain.

For example, the driving signal obtaining unit may be further configured to obtain second driving signals for driving the plurality of actuators to vibrate the panel at the second touch position according to a second haptic signal and cause the panel to not vibrate at the first touch position, the second driving signals being generated using the transfer functions from the plurality of actuators to the first touch position and the transfer functions from the plurality of actuators to the second touch position, and the haptic feedback device may further include a signal adding unit configured to sum the first driving signals and the second driving signals for the plurality of actuators, wherein the plurality of actuators vibrate the panel based on the summed signals.

With this configuration, it is possible to vibrate the panel according to the first haptic signal at the first touch position and vibrate the panel according to the second haptic signal at the second touch position. In other words, it is possible to provide mutually different haptic feedback for a plurality of touch positions. As such, it is possible to provide further suitable haptic feedback by providing distinguishable haptic feedback for multiple touches at the same time.

For example, the haptic feedback device may further include: a filter storage unit which stores filters for generating, by filtering a given haptic signal, driving signals for driving the plurality of actuators to, with respect to an arbitrary combination of a plurality of positions on the panel, vibrate the panel at one position according to the given haptic signal and cause the panel to not vibrate at an other position, wherein the filter obtaining unit may be configured to obtain the filters that correspond to both the first touch position and the second touch position from the filter storage unit as the first filters.

With this configuration, it is possible to generate the driving signals using a filter stored in the filter storage unit. As such, it is possible to reduce the time between obtaining the touch position and providing haptic feedback, thereby reducing delays in haptic feedback. Furthermore, it is also possible to reduce the processing load for haptic feedback, meaning it is possible to suitably provide haptic feedback for multiple touches even in devices with low processing capability such as smart phones or tablet computers.

Moreover, a filter is valid for any given haptic signal. In other words, a filter is not dependent on a haptic signal. As such, since it is not required to store a filter for each haptic signal even when a plurality of haptic signals are used, it is possible to reduce the amount of required storage space compared to when driving signals are stored.

For example, the haptic feedback device may further include a driving signal storage unit which stores driving signals for driving the plurality of actuators to, with respect to an arbitrary combination of a plurality of positions on the panel, vibrate the panel at one position according to the first haptic signal and cause the panel to not vibrate at an other position, the driving signals being generated using transfer functions from the plurality of actuators to the one position and transfer functions from the plurality of actuators to the other position, wherein the driving signal obtaining unit may be configured to obtain the driving signals that each correspond to both the first touch position and the second touch position from the driving signal storage unit as the first driving signals.

With this configuration, it is possible to provide haptic feedback using a driving signal stored in the driving signal storage unit. As such, it is possible to reduce the time between obtaining the touch position and providing haptic feedback, thereby reducing delays in haptic feedback. Furthermore, it is also possible to reduce the processing load for haptic feedback, meaning it is possible to suitably provide haptic feedback for multiple touches even in devices with low processing capability such as smart phones or tablet computers.

For example, the driving signal obtaining unit may be configured to generate the first driving signals using the first haptic signal and the transfer functions from the plurality of actuators to the first touch position and the second touch position.

With this configuration, it is possible to generate the first driving signals using the first haptic signal and the transfer functions. As such, even if the first filters are not calculated, it is possible to reduce the processing load since the first driving signals can be generated.

For example, the first haptic signal may be determined based on a vibration characteristic of the panel.

With this configuration, the first haptic signal is determined based on the vibration characteristics of the panel. As such, as long as the first haptic signal is determined to be a signal having a frequency component that is a resonance frequency of the panel or a nearby frequency, for example, it is possible to increase energy efficiency.

For example, the haptic feedback device may further include: a touch position estimating unit configured to, for each of the plurality of touch positions obtained, based on temporal changes in the touch position, estimate a touch position of a touch to be made a predetermined amount of time later, wherein the haptic feedback determining unit is configured to determine the first touch position and the second touch position from among the touch positions estimated.

With this configuration, it is possible to provide haptic feedback at an estimated touch position. As such, even if the touch position moves during the time between obtaining the touch position and providing haptic feedback, it is possible to suitably provide haptic feedback.

For example, the transfer functions may be impulse responses from the plurality of actuators to the first touch position and the second touch position.

With this configuration, it is possible to use an impulse response as the transfer function.

For example, the haptic feedback device may further include a control position determining unit configured to determine a first control position within a first region and a second control position within a second region, the first region having a predetermined size and including the first touch position, and the second region having a predetermined size and including the second touch position, wherein the driving signal obtaining unit is configured to obtain, as the first driving signals, signals generated using transfer functions from the plurality of actuators to the first control position and transfer functions from the plurality of actuators to the second control position.

With this configuration, it is possible to obtain, as the first driving signals, signals generated using the transfer functions from the actuators to each of the first control position and the second control position. As such, it is possible to appropriately control vibration at the first touch position and more efficiently provide haptic feedback by appropriately determining the first control position and the second control position.

For example, wherein the control position determining unit may be configured to: determine the second touch position to be the second control position; and, for each of a plurality of first candidate positions within the first region, calculate a vibration strength at the first touch position upon the plurality of actuators being driven by driving signals generated using transfer functions from the plurality of actuators to the first candidate position and transfer functions from the plurality of actuators to the second control position, and determine the first control position to be one of the first candidate positions yielding a vibration strength that is greater than or equal to a predetermined vibration strength.

With this configuration, it is possible to determine, from among a plurality of first candidate positions in the first region, as the first control position, a first candidate position which yields a vibration strength at the first touch position that is greater than or equal to a predetermined vibration strength. As such, it is possible to increase the vibration strength at the first touch position and provide further efficient haptic feedback.

For example, the control position determining unit may be configured to: determine the first touch position to be the first control position; and, for each of a plurality of second candidate positions within the second region, calculate a vibration strength at the first touch position upon the plurality of actuators being driven by driving signals generated using the transfer functions from the plurality of actuators to the first control position and transfer functions from the plurality of actuators to the second candidate position, and determine the second control position to be one of the second candidate positions yielding a vibration strength that is greater than or equal to a predetermined vibration strength.

With this configuration, it is possible to determine, from among a plurality of second candidate positions in the second region, as the second control position, a second candidate position which yields a vibration strength at the first touch position that is greater than or equal to a predetermined vibration strength. As such, it is possible to increase the vibration strength at the first touch position and provide further efficient haptic feedback.

For example, for each combination of a plurality of first candidate positions in the first region and a plurality of second candidate positions in the second region, the control position determining unit may be configured to calculate a vibration strength at the first touch position upon the plurality of actuators being driven by driving signals generated using transfer functions from the plurality of the actuators to the first candidate position and transfer functions from the plurality of actuators to the second candidate position, and determine the first control position to be one of the first candidate positions yielding a vibration strength that is greater than or equal to a predetermined vibration strength, and determine the second control position to be one of the second candidate positions yielding a vibration strength that is greater than or equal to the predetermined vibration strength.

With this configuration, from among combinations of the first candidate positions in the first region and the second candidate positions in the second region, it is possible to determine a first candidate position and a second candidate position that cause the vibration strength at the first touch position to be greater than or equal to a predetermined vibration strength to be the first control position and the second control position, respectively. As such, it is possible to increase the vibration strength at the first touch position and provide further efficient haptic feedback.

For example, the filter obtaining unit may be configured to calculate the first filters to yield a sum of products, in a frequency domain, of the transfer functions from the plurality of actuators to the first touch position and the first filters that indicates an impulse, and a sum of products, in the frequency domain, of the transfer functions from the plurality of actuators to the second touch position and the first filters that indicates a response signal having a vibration strength less than or equal to a predetermined vibration strength.

With this configuration, it is possible to calculate the first filters so that the sum of products, in the frequency domain, of the transfer functions the plurality of actuators to the second touch position and the first filters indicates a response signal that is less than or equal to a predetermined vibration strength. As such, the amount of freedom of the first filter increases beyond that of when the first filters are calculated so that the sum of the products indicates zero, and it is possible to obtain driving signals dependent on the characteristics of the actuators as the first driving signals.

For example, the filter obtaining unit may be configured to calculate a plurality of first filter candidates by modifying at least one of an amplitude and a phase of the response signal, and calculate as the first filters, the first filter candidates from among the plurality of first filter candidates that yield, through filtering, driving signals having a vibration strength less than or equal to a predetermined vibration strength.

With this configuration, it is possible to calculate, as the first filters, first filter candidates which yield driving signals having a vibration strength less than or equal to a predetermined value. As such, it is possible to reduce the energy needed for driving the actuators and more efficiently provide haptic feedback.

Alternatively, the filter obtaining unit may be configured to calculate the first filters to yield a sum of products, in a frequency domain, of the transfer functions from the plurality of actuators to the first touch position and the first filters that indicates an impulse, and a ratio of (i) a sum of products, in the frequency domain, of the transfer functions from the plurality of actuators to the first touch position and the first filters and (ii) a sum of products, in the frequency domain, of the transfer functions from the plurality of actuators to the second touch position and the first filters that indicates a response signal having a vibration strength greater than or equal to a predetermined vibration strength ratio.

Moreover, the driving signal generating device according to an aspect of the present invention is a driving signal generating device which generates driving signals for driving a plurality of actuators to vibrate a panel to provide haptic feedback to a user, the driving signal generating device including: a transfer function obtaining unit configured to obtain transfer functions from the plurality of actuators to a plurality of positions on the panel; and a driving signal generating unit configured to generate driving signals for driving the plurality of actuators to, with respect to an arbitrary combination of the plurality of positions on the panel, vibrate the panel at one position according to a first haptic signal and vibrate the panel at an other position more weakly than at the one position, the driving signals being generated using the transfer functions from the plurality of actuators to the one position or a vicinity thereof and the transfer functions from the plurality of actuators to the other position or a vicinity thereof.

With this configuration, it is possible to generate driving signals used by the above haptic feedback device.

These general and specific aspects may be implemented using a system, a method, an integrated circuit, a computer program, a computer-readable recording medium, or any combination of systems, methods, integrated circuits, computer programs, or computer-readable recording media.

Hereinafter, embodiments are described with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following embodiments, structural elements not recited in any one of the independent claims are described as arbitrary structural elements.

Embodiment 1

Device Configuration

Figure 2:
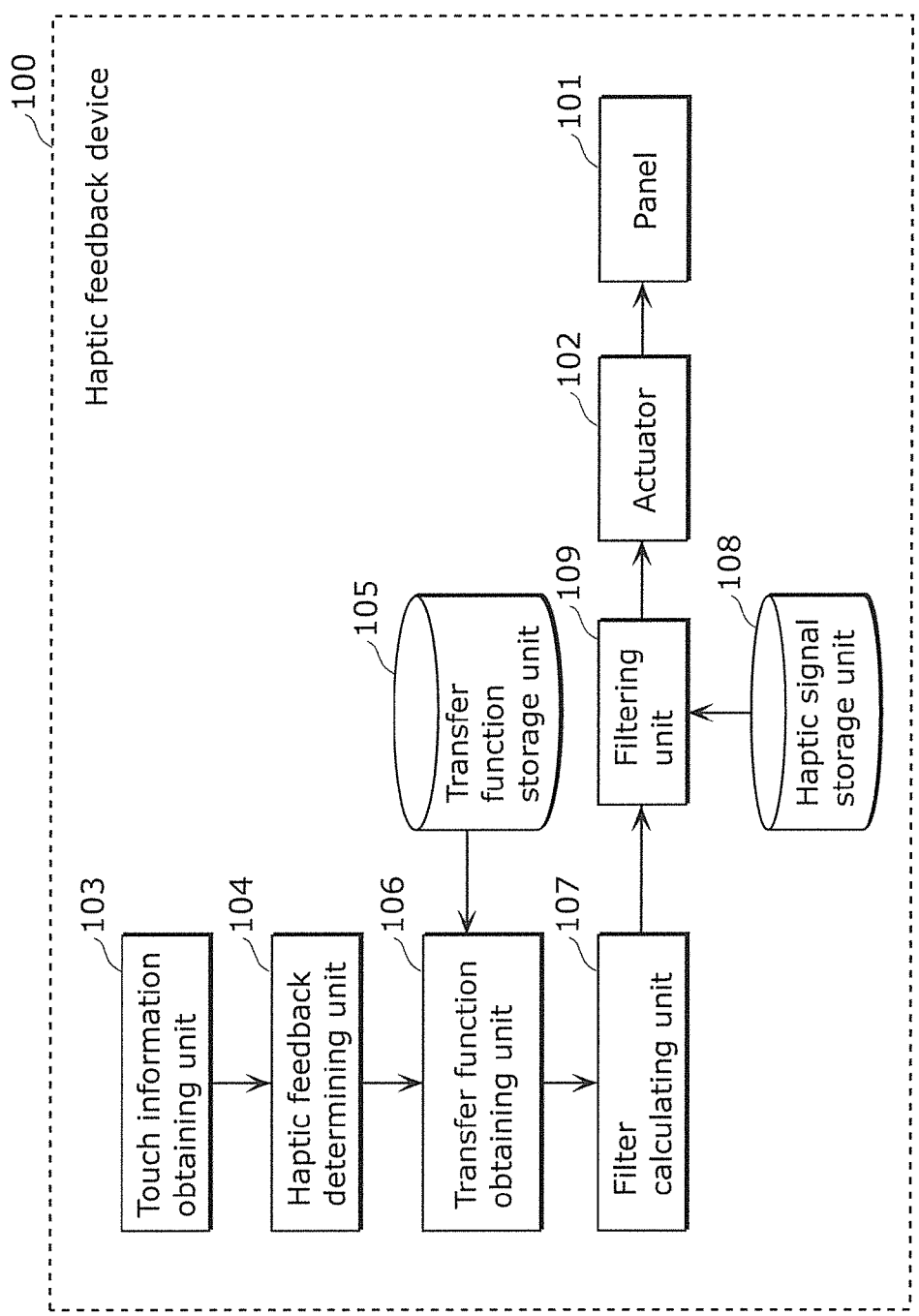
FIG. 2 is a block diagram showing the functional configuration of the haptic feedback device according to Embodiment 1.
Figure 3:
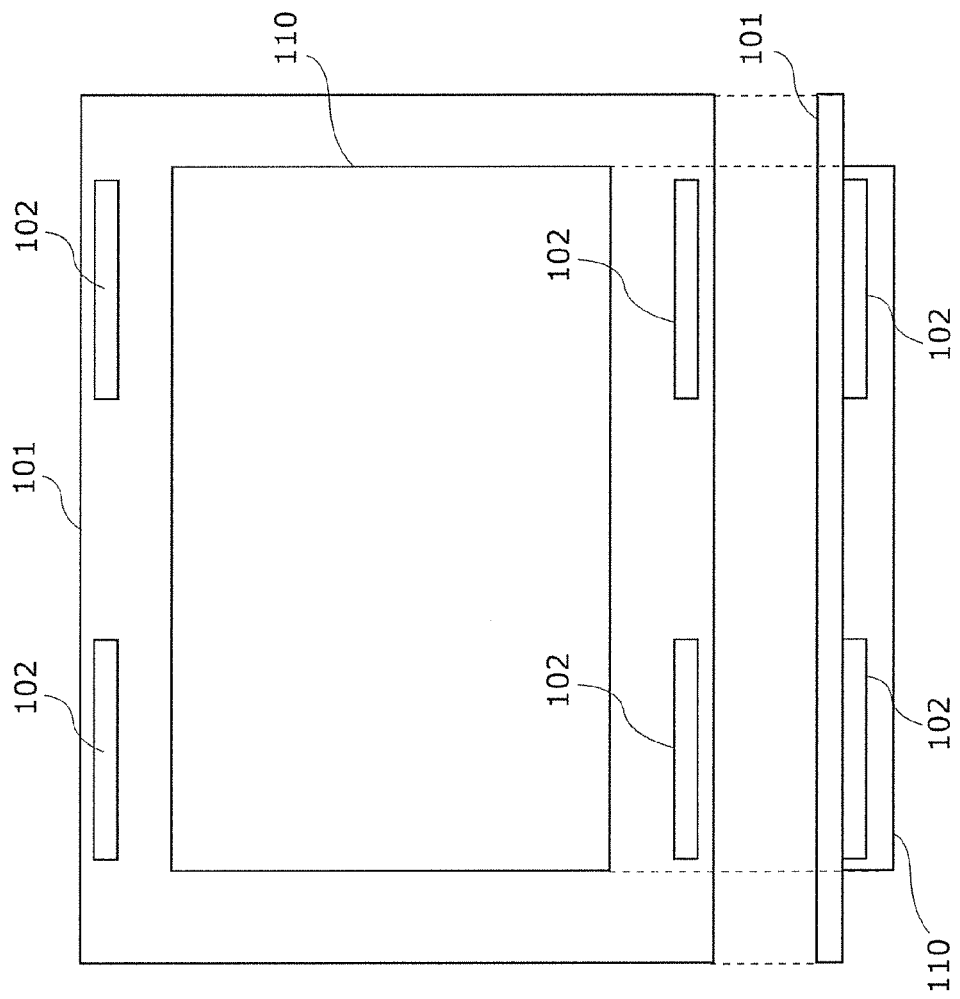
FIG. 3 shows the structure of the haptic feedback device according to Embodiment 1.

FIG. 2 shows the functional configuration of the haptic feedback device 100 according to Embodiment 1. FIG. 3 shows the structure of the haptic feedback device 100 according to Embodiment 1. The haptic feedback device 100 provides haptic feedback by vibrating a panel 101.

As FIG. 2 shows, the haptic feedback device 100 includes the panel 101, a plurality of actuators 102, a touch information obtaining unit 103, a haptic feedback determining unit 104, a transfer function storage unit 105, a transfer function obtaining unit 106, a filter calculating unit 107, a haptic signal storage unit 108, and a filtering unit 109. Next, each structural element of the haptic feedback device 100 will be described.

(Panel 101)

The panel 101 conveys vibrations for providing haptic feedback. More specifically, the panel 101 is a translucent flat member made of glass or acrylic, for example.

It should be noted that the shape, size, thickness, hardness, and fixing method of the panel 101 are not limited to any particular example. However, the transfer functions from the actuators 102 to each position (hereinafter also referred to as point) on the panel 101 change depending on the shape, size, thickness, hardness, and fixing method of the panel 101.

(Actuators 102)

The plurality of actuators 102 are provided in mutually different positions on the panel 101. For example, as FIG. 3 shows, the plurality of actuators 102 are attached to the edges of the panel 101. In other words, the plurality of actuators 102 are provided outside of the region in which images are displayed on the panel 101.

Each actuator 102 vibrates the panel 101 according to a driving signal. In this way, haptic feedback is provided to a user by propagation of vibrations imparted to the panel 101 by each actuator 102 to a touch position on the panel 101.

In Embodiment 1, the number of actuators 102 is equal to or greater than the number of touches that the touch information obtaining unit 103 is capable of detecting at once. This allows the haptic feedback device 100 to provide mutually different haptic feedback for the number of detectable touch positions. It should be noted that the number of actuators 102 is not required to be the number of touches capable of being detected at once. The number of actuators 102 may be less than the number of touches capable of being detected at once. In this case, the haptic feedback device 100 can control the haptics at as many touch positions as there are actuators 102 from among a plurality of touch positions.

The actuators 102 may be, for example, piezoelectric elements (piezo elements). Alternatively, the actuators 102 may be voice coils. Furthermore, the actuators 102 may include an amplifier for amplifying the driving signal. It should be noted that the type of actuator 102 used is not particularly limited.

The spacing of the actuators 102 is not particularly limited. For example, a plurality of the actuators 102 may be arranged so that the panel 101 can be efficiently vibrated.

(Touch Information Obtaining Unit 103)

The touch information obtaining unit 103 obtains a plurality of touch positions on the panel 101 by detecting a plurality of touches having a state of concurrent contact on the panel 101. In other words, the touch information obtaining unit 103 obtains a plurality of touch positions on the panel 101 by detecting multiple touches made by the user on the panel 101.

For example, the touch information obtaining unit 103 obtains touch information indicating coordinates for a plurality of touch positions. The multiple touches, for example, share a state in which a user is touching a plurality of positions on the panel at the same time.

The touch information obtaining unit 103 is, for example, an electrostatic capacitive multi-touch panel or a pressure sensitive multi-touch panel. When, for example, the touch information obtaining unit 103 is an electrostatic capacitive multi-touch panel, the touch information obtaining unit 103 obtains a plurality of touch positions based on changes in electrostatic capacitance caused by the multiple touches. Moreover, when, for example, the touch information obtaining unit 103 is a pressure sensitive multi-touch panel, the touch information obtaining unit 103 obtains a plurality of touch positions based on changes in pressure caused by the multiple touches.

It should be noted that it is not necessary to limit the multi-touch panel to just an electrostatic capacitive multi-touch panel or a pressure sensitive multi-touch panel. In other words, as long as the multi-touch panel is capable of detecting multiple touches, any type of multi-touch panel may be used.

It should be noted that the touch information obtaining unit 103 may, in addition to the plurality of touch positions, obtain as the touch information, information indicating, for example, the surface area, load, or pressure of the contact made at each touch position. In this case the pressure can easily be obtained if a pressure sensitive multi-touch panel is used. The pressure may additionally be obtained using a load sensor.

It should be noted that when the touch information obtaining unit 103 is a multi-touch panel, the multi-touch panel made up of the panel 101 and the touch information obtaining unit 103 may be integrated as one. For example, the touch information obtaining unit 103 and the panel 101 may be formed as one member by adhering an electrostatic capacitative multi-touch panel to the panel 101.

Moreover, as FIG. 3 shows, a display apparatus 110, such as a liquid crystal display or an organic light-emitting diode display, may be provided below the touch information obtaining unit 103 or the panel 101. This allows the haptic feedback device 100 to function as a touch display. It should be noted that provision of the display apparatus 110 is not absolutely necessary.

It should be noted that the plurality of touch positions on the panel 101 include positions touched directly on the panel 101 by the user as well as positions touched on the panel 101 by the user with, for example, a pen.

(Haptic Feedback Determining Unit 104)

The haptic feedback determining unit 104 determines the first touch position at which haptic feedback is to be provided (hereinafter also referred to as feedback position). The haptic feedback determining unit 104, for example, determines, from among a plurality of touch positions, a first touch position at which haptic feedback is to be provided using a vibration indicated by a haptic signal, and at least one second touch position at which haptic feedback is not to be provided using a vibration indicated by a haptic signal (hereinafter also referred to as a non-feedback position).

More specifically, the haptic feedback determining unit 104, for example, determines one feedback position from among the plurality of touch positions based on the display position of GUI objects, loads at the touch positions, or the temporal or special relationship between the plurality of touch positions. Moreover, the haptic feedback determining unit 104 determines the touch positions other than the feedback position among the plurality of touch positions to be non-feedback positions. It should be noted that the method of determining the feedback position is not particularly limited.

(Transfer Function Storage Unit 105)

The transfer function storage unit 105 is, for example, a hard disk or semiconductor memory. The transfer function storage unit 105 stores, for each point on the panel 101, transfer functions from each actuator 102 to a corresponding point. In other words, the transfer function storage unit 105 stores, for a plurality of positions on the panel 101 and the plurality of actuators 102, transfer functions associated with combinations of a position and the actuators 102.

A transfer function indicates an input/output relationship in the system. Here, the driving signal of the actuator corresponds to the input, and the vibration at one point on the panel corresponds to the output. Generally, the transfer function $G(\omega)$ represents a ratio of an input $X(\omega)$ to the system to an output $Y(\omega)$ from the system ($G(\omega)=Y(\omega)/X(\omega)$). For example, when the input $X(\omega)$ is an impulse ($X(\omega)=1$), the transfer function $G(\omega)$ is equal to the output $Y(\omega)$ (impulse response).

As such, in Embodiment 1, the transfer function storage unit 105 stores, for each point on the panel 101, impulse responses from each actuator 102 to the corresponding point, as the transfer functions. It should be noted that the impulse responses may be represented in the time domain or may be represented in the frequency domain. In other words, a temporal waveform of the impulse responses may be stored in the transfer function storage unit 105, and a spectrum of the impulse responses may be stored in the transfer function storage unit 105.

Here, each point on the panel 101 may be, for example, a representative point for each of segmented regions on the panel 101 (for example, a center point or a center of gravity). The segmented regions are, for example, obtained by segmenting the region of the panel 101 into 10 mm unit blocks with a grid. It should be noted that the shape of the segmented regions is not required to be rectangular, and may be a different shape. Moreover, the segmented regions are not required to have a uniform size. For example, the size of a segmented region may differ depending on its position on the panel 101. Based on the touch position obtained by the touch information obtaining unit 103, a region around the touch position is selected. The basis of the selection is not particularly limited. For example, a region having the smallest distance to the touch position may be selected.

Here, the smaller each segmented region is (in other words, the greater the number of segmented regions there are), the greater the resolution capability of haptic feedback becomes, but the greater the storage capacity for storing the transfer functions becomes. In other words, since the resolution capability and the storage capacity have a trade off relationship, the size of each segmented region may be determined based on the resolution capability required or the storage capacity allowed.

Hereinafter the transfer functions stored in the transfer function storage unit 105 will be explained in further detail.

Here, the transfer function storage unit 105 will be explained under the pretense that it stores M×N transfer functions, from each of M (M being an integer of 2 or more) actuators 102 ($A_1, A_2, \ldots, A_M$) to each of N (N being an integer of 2 or more) positions on the panel 101 ($P_1(x_1, y_1), P_2(x_2, y_2), \ldots, P_N(x_N, y_N)$).

Figure 4:
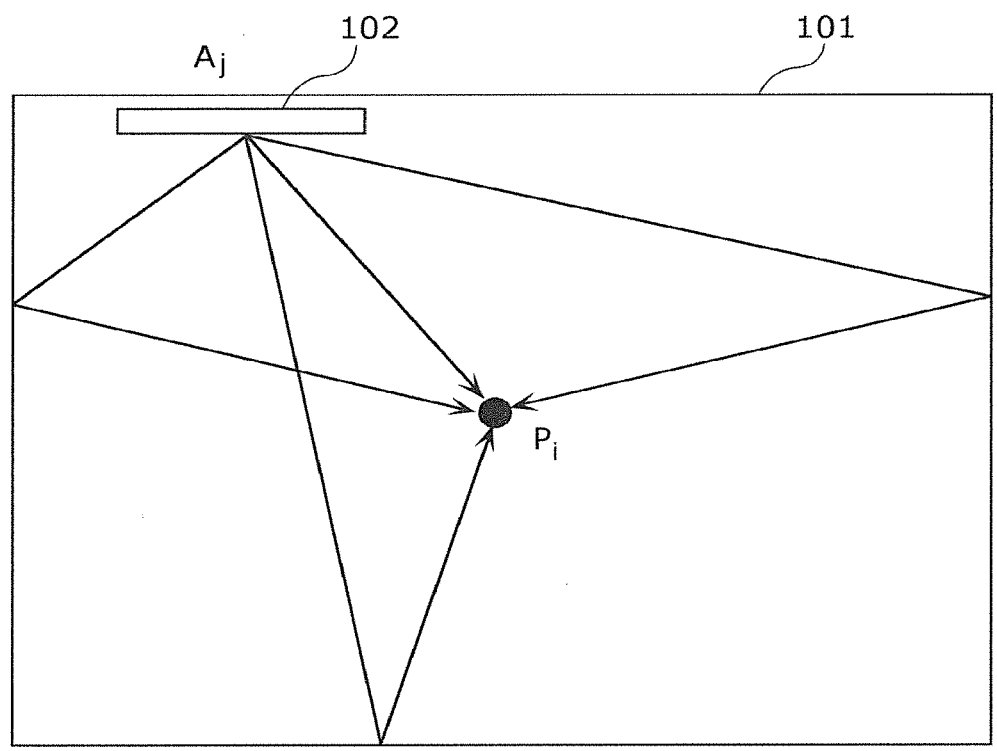
FIG. 4 shows the propagation paths of vibrations from an actuator to a position on the panel.

FIG. 4 shows the propagation paths of vibrations from an actuator 102 to a position on the panel 101.

As FIG. 4 shows, the vibration at position $P_i$ is a composite of a vibration arriving directly at the position $P_i(x_i, y_i)$ from the actuator $A_j$ and vibrations reflecting off the edges of the panel 101 before arriving at the position $P_i(x_i, y_i)$. As such, the transfer function includes a propagation characteristic of every path on the panel from the actuator $A_j$ to the position $P_i$.

It should be noted that the transfer functions may be represented in the time domain or may be represented in the frequency domain. As information, transfer functions represented in the time domain and transfer functions represented in the frequency domain are identical, and one can be converted into the other.

The transfer function from the actuator $A_j$ to the position $P_i(x_i, y_i)$ can be obtained by measuring the vibration (impulse response) at the position $P_i(x_i, y_i)$ when an impulse is inputted to the actuator $A_j$, for example. The impulse response can completely represent the characteristics of the system from the actuator $A_j$ to the position $P_i(x_i, y_i)$. As such, in Embodiment 1, it is possible to use an impulse response as the transfer function.

It should be noted that typically, when an impulse is directly applied, since the continuance of the impulse is extremely short, the S/N ratio of the impulse response tends to reduce. As such, the impulse response may be measured using the time stretched pulse (TSP) instead of the impulse. With this, it is possible to obtain an impulse response having a high S/N ratio as the transfer function. Hereinafter, a method of measuring the impulse response using TSP will be explained.

Figure 5A:
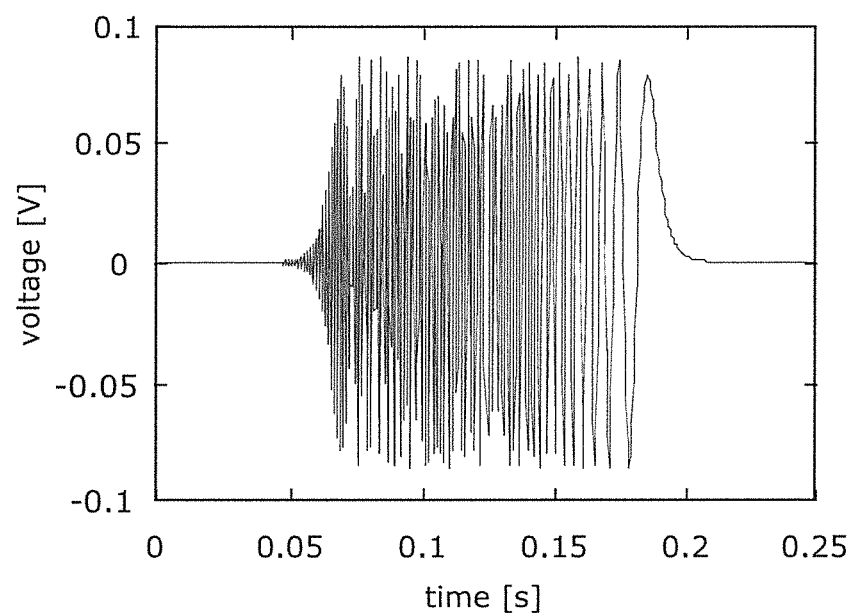
FIG. 5A shows one example of TSP.

As Equation 1 shows, TSP is a signal whose time axis is stretched by the impulse by changing the phase of the impulse with the square of the frequency. FIG. 5A shows one example of TSP.

[Math 1]

$$H(n) = \exp(jkn^2) \quad (1)$$
$$0 \le n \le \frac{N}{2}$$
$$H(n) = H^*(N - n)$$
$$\frac{N}{2} + 1 \le n \le N$$

In Equation 1, H(n) represents TSP in the frequency domain, j represents an imaginary unit (square root of −1), k represents a degree of expansion and is a constant, n represents a discretized frequency unit, and H* represents a complex conjugate of H.

Figure 5B:
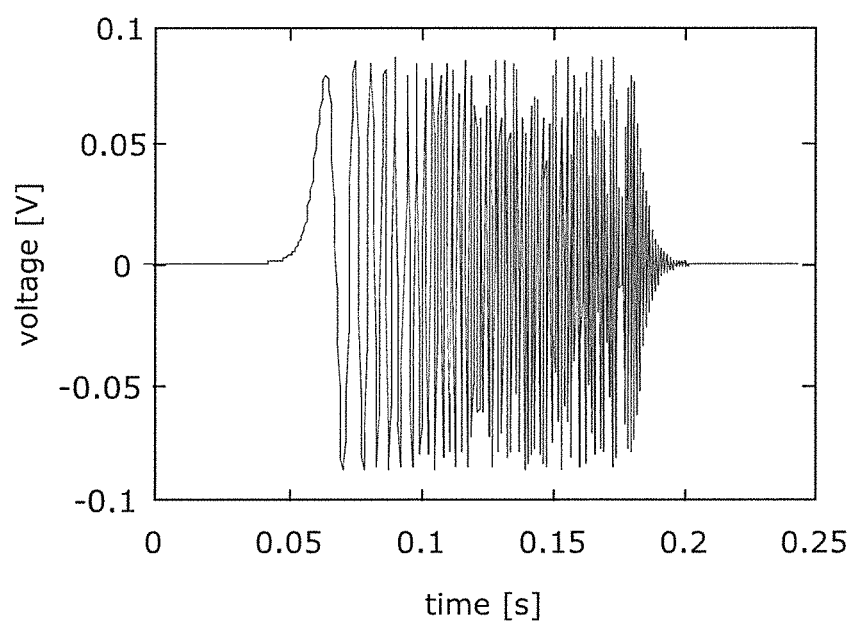
FIG. 5B shows one example of TSP response.

The actuator $A_j$ is driven using the signal obtained by performing reverse Fourier transform on the TSP from Equation 1, and the vibration (hereinafter referred to as TSP response) at the position $P_i(x_i, y_i)$ on the panel 101 is measured. There is no need to limit the measuring method, but the vibration (TSP response) is measured using a Doppler displacement meter, for example. FIG. 5B shows one example of TSP response.

Impulse response is calculated using the measured TSP response. More specifically, the impulse response is calculated by performing a convolution operation using the inverse function of TSP, shown in Equation 2.

[Math 2]

$$H^{-1}(n) = \exp(-jkn^2) \quad (2)$$
$$0 \le n \le \frac{N}{2}$$
$$H^{-1}(n) = H^*(N - n)$$
$$\frac{N}{2} + 1 \le n \le N$$

Figure 5C:
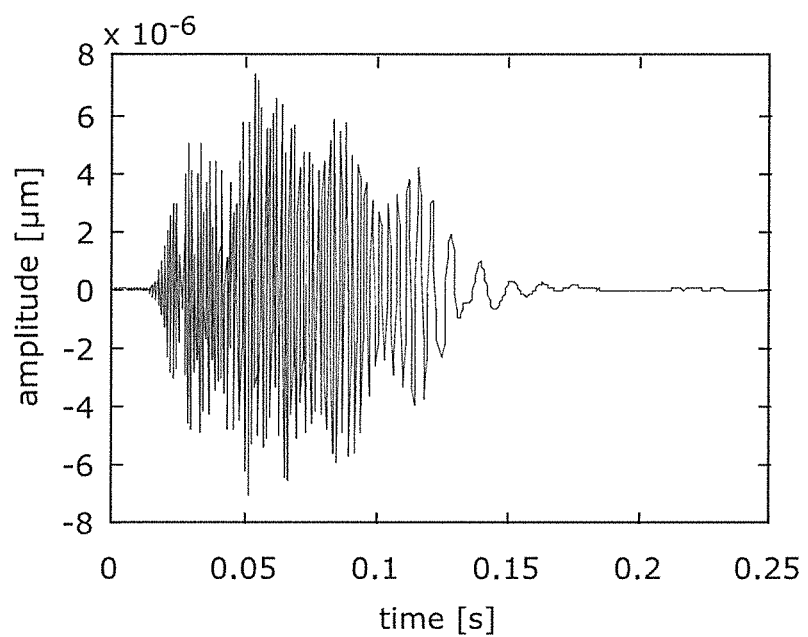
FIG. 5C is one example of the inverted function of TSP.

In Equation 2, $H^{-1}(n)$ represents the inverted function of TSP. FIG. 5C is one example of the inverted function of TSP.

Figure 5D:
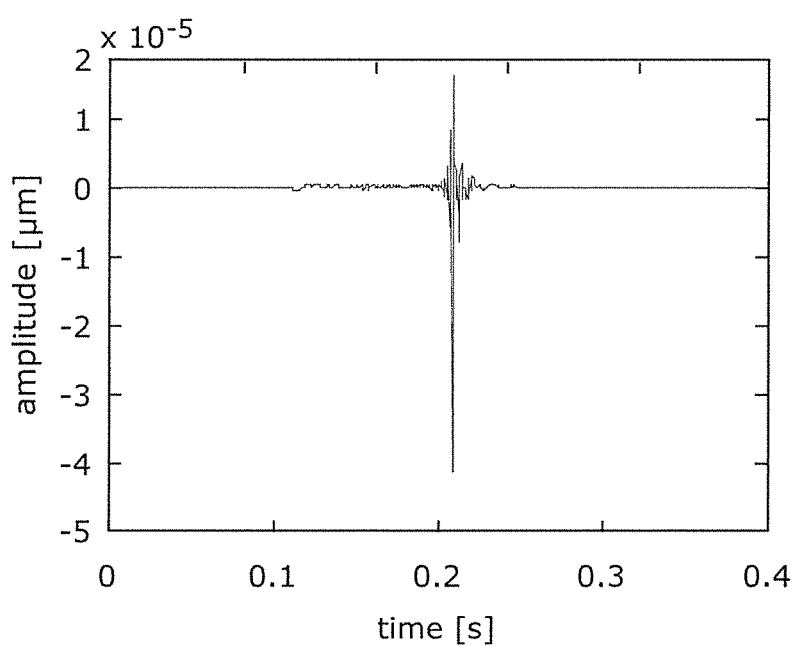
FIG. 5D shows one example of the impulse response calculated from the TSP response.

Moreover, FIG. 5D shows one example of the impulse response calculated from the TSP response in FIG. 5B.

As described above, the impulse response from the actuator $A_j$ to the position $P_i(x_i, y_i)$ is measured. By performing this measurement on all combinations of the M actuators 102 ($A_1, A_2, \ldots, A_M$) and the N positions ($P_1(x_1, y_1), P_2(x_2, y_2), \ldots, P_N(x_N, y_N)$), M×N transfer functions are obtained. The M×N transfer functions obtained in this manner are stored in the transfer function storage unit 105.

It should be noted that the method used to measure the transfer functions is not limited to the above-described method. For example, the transfer functions may be measured using an M-sequence signal. Moreover, the transfer functions may be measured using a Gaussian random variable, for example.

(Transfer Function Obtaining Unit 106)

The transfer function obtaining unit 106 obtains, from among a plurality of transfer functions stored in the transfer function storage unit 105, transfer functions corresponding to each touch position obtained by the touch information obtaining unit 103. In other words, the transfer function obtaining unit 106 retrieves transfer functions from each actuator 102 to each touch position from the transfer function storage unit 105.

(Filter Calculating Unit 107)

The filter calculating unit 107 is an example of the filter obtaining unit. The filter calculating unit 107 obtains filters for generating desired driving signals by filtering a given haptic signal. Here, desired driving signals are signals each of which drives one of the actuators 102 to vibrate the panel 101 at the feedback position according to the given haptic signal and vibrate the panel 101 at the non-feedback position according to a signal having a weaker vibration strength than a vibration strength of the given haptic signal. A signal having a weaker vibration strength than a vibration strength of the given haptic signal is, for example, a signal having an amplitude that is 1/10th or less than that of the given haptic signal.

Preferably, the signal having a weaker vibration strength than a vibration strength of the given haptic signal is a signal indicating a vibration that is undetectable by the user. More preferably, the signal having a weaker vibration strength than a vibration strength of the given haptic signal is a signal having an amplitude of 0. In this case, using the transfer functions obtained by the transfer function obtaining unit 106, the filter calculating unit 107 can calculate filters for providing haptic feedback to only a feedback position from among the plurality of touch positions obtained by the touch information obtaining unit 103 and refraining from providing haptic feedback to other touch positions (non-feedback positions) among the plurality of touch positions obtained by the touch information obtaining unit 103. A more detailed explanation of the method of calculation used for this sort of filter will be given later.

(Haptic Signal Storage Unit 108)

The haptic signal storage unit 108 is, for example, a hard disk or semiconductor memory. The haptic signal storage unit 108 stores haptic signals. A haptic signal represents haptics provided to a user. In other words, the haptic signal indicates the vibrations on the panel 101 at the feedback position.

Figure 6A:
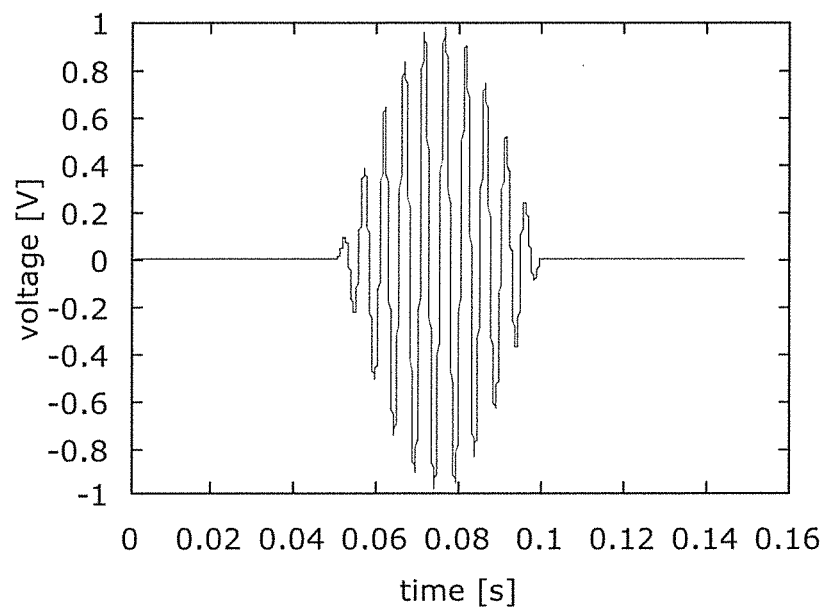
FIG. 6A shows one example of the haptic signal.
Figure 6B:
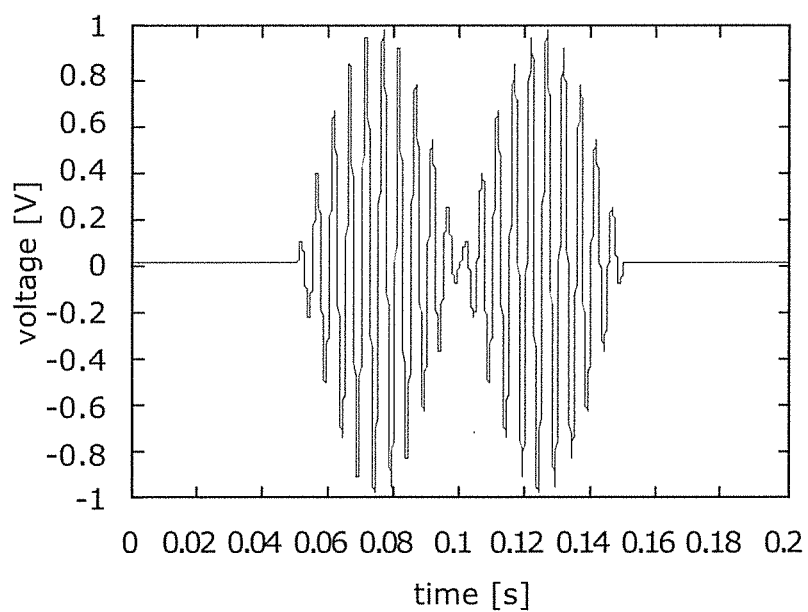
FIG. 6B shows one example of the haptic signal.

FIG. 6A and FIG. 6B are each examples of a haptic signal. In Embodiment 1, the haptic signal storage unit 108 stores haptic signals like those shown in FIG. 6A and FIG. 6B, for example.

The haptic signal may be any signal so long as it can provide the user with haptic feedback. For example, the haptic signal may be determined based on the vibration characteristics of the panel 101. More specifically, the haptic signal may be a signal with a frequency that matches or is in the vicinity of the resonance frequency of the panel 101, for example. With this, it is possible to increase energy efficiency.

Next, one example of the method for generating the haptic signal will be explained. When the haptic signal is generated based on a signal having an r cycle of a sine wave of a frequency fc, as Equation 3 shows, by modulating the sine wave using a modulating frequency fm which halves r cycle, a haptic signal s(n) such as the one shown in FIG. 6A is generated.

[Math 3]

$$s(n) = \sin(2\pi f_m n T_s)\sin(2\pi f_c n T_s) \quad (3)$$
$$f_m = \frac{f_c}{2r}$$

Here, Ts represents the sampling period. In the example shown in FIG. 6A, fc=200 Hz, r=10, and modulating frequency fm is 10 Hz. A haptic signal generated in this fashion can be used as a signal for providing haptic feedback when a GUI object button is clicked, for example.

It should be noted that the haptic signal is not necessarily required to be a signal generated in the above-described manner. For example, performing the modulation shown in Equation 3 is not required. In other words, a sine wave may be used as the haptic signal.

It should be noted that the frequency fc may be any frequency so long as it is a frequency that can be perceived as a haptic sensation by a human. For example, the frequency fc may be determined based on the vibration characteristics of the panel 101.

For example, the frequency fc may be determined to be equal to the resonance frequency of the panel 101. By determining the frequency fc in this manner, it is possible to reduce the attenuation of the vibration imparted to the panel 101 by the actuator 102 and efficiently provide haptic feedback.

It should be noted that in Embodiment 1, the haptic signals are generated in advance offline and stored in the haptic signal storage unit 108, but they may be generated online after detection of multiple touches. With this, it is possible to reduce the storage region for storing the haptic signals.

(Filtering Unit 109)

The filtering unit 109 is an example of the driving signal obtaining unit. The filtering unit 109 generates driving signals for driving the actuators 102 by filtering a haptic signal stored in the haptic signal storage unit 108 using filters calculated by the filter calculating unit 107 for each actuator 102.

Each actuator 102 vibrates the panel 101 according to a driving signal generated by the filtering unit 109 in this manner. As a result, among the plurality of touch positions, vibrations based on the haptic signal occur only at the feedback position, and vibrations are suppressed at non-feedback positions. With this, the haptic feedback device 100 is capable of providing haptic feedback to a user at the feedback position and refraining from providing haptic feedback at the non-feedback positions.

(Operation)

Figure 7:
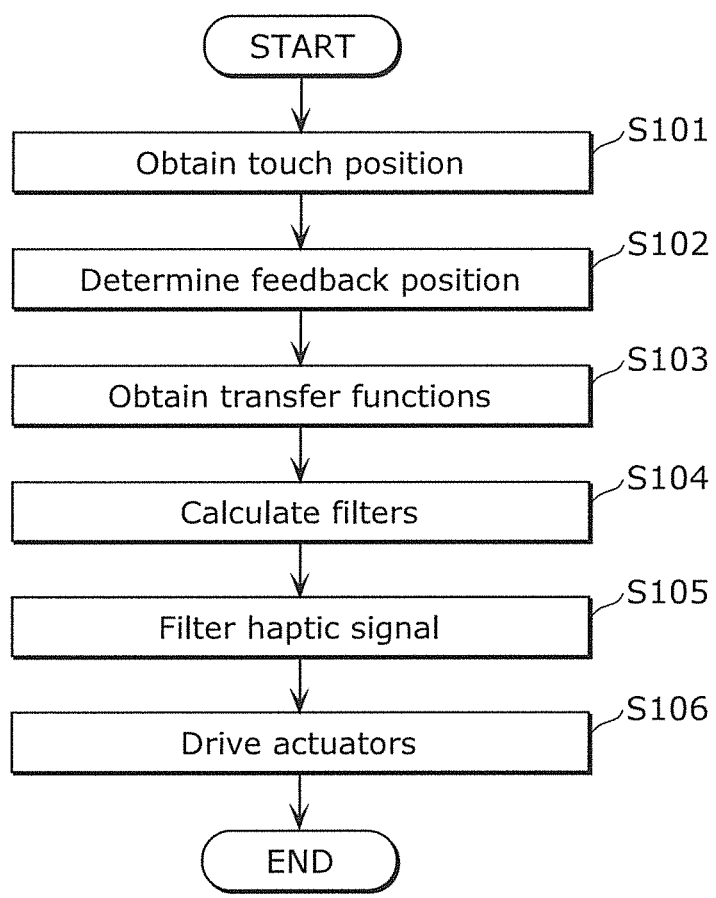
FIG. 7 is a flow chart showing operations performed by the haptic feedback device according to Embodiment 1.
Figure 8:
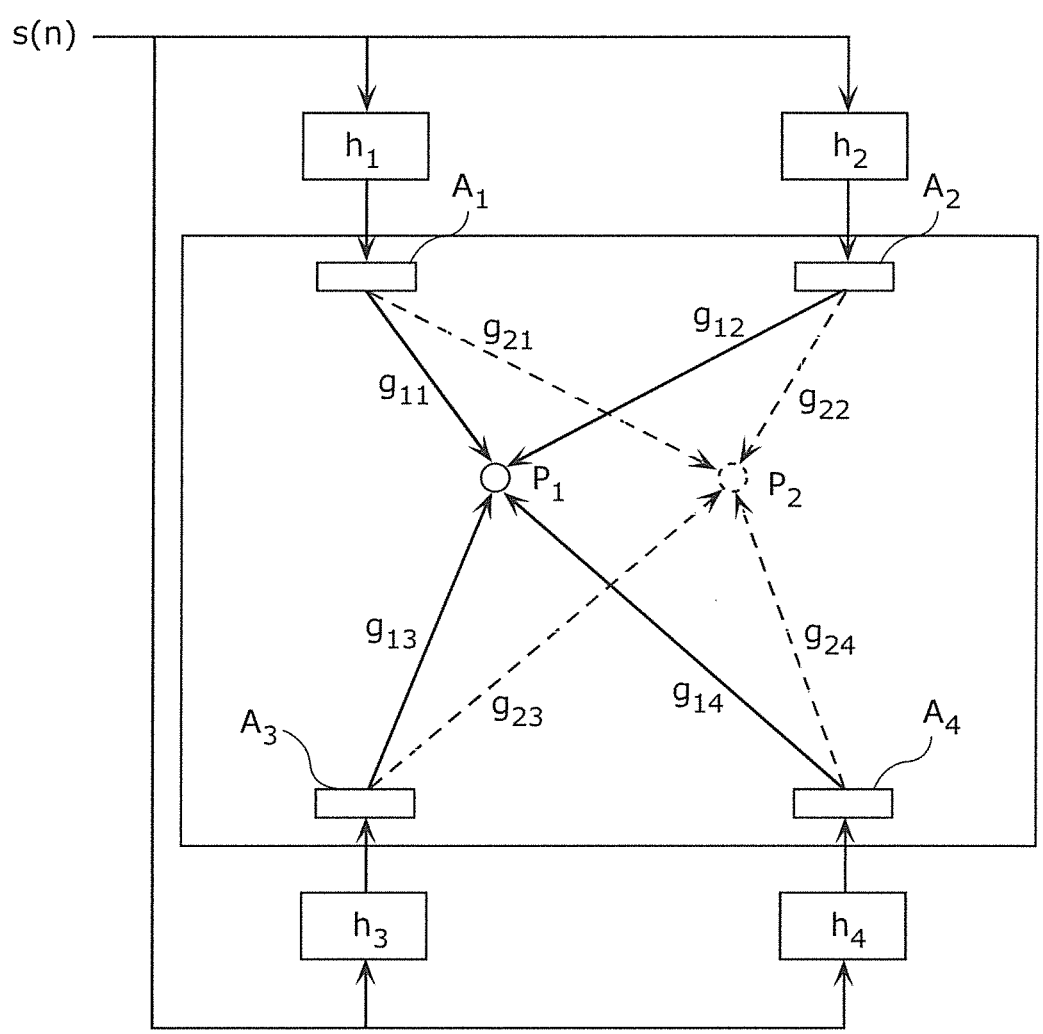
FIG. 8 is a diagram for illustrating the processes performed by the haptic feedback device according to Embodiment 1.

Next, operations performed by each structural element of the haptic feedback device 100 having the above-described configuration will be described in detail. FIG. 7 is a flow chart of the processes performed by the haptic feedback device 100 according to Embodiment 1. FIG. 8 is a diagram for illustrating the processes performed by the haptic feedback device 100 according to Embodiment 1. It should be noted that in the explanations given hereinafter, it is assumed that haptic feedback is provided only to the feedback position from among the plurality of touch positions.

(Step S101)

First, the touch information obtaining unit 103 obtains a plurality of touch positions on the panel 101 by detecting multiple touches (S101). For example, the touch information obtaining unit 103 obtains the two touch positions $P_1$ and $P_2$ shown in FIG. 8.

More specifically, the touch information obtaining unit 103 obtains, for example, a center position of a finger of the user on the panel 101 in a predetermined time period as the touch position. It should be noted that the touch information obtaining unit 103 is not necessarily required to obtain the center position of a finger as the touch position. For example, the touch information obtaining unit 103 may obtain the position of center of gravity of the load from a finger as the touch position.

(Step S102)

Next, from among the plurality of obtained touch positions, the haptic feedback determining unit 104 determines the first touch position (feedback position) at which to provide haptic feedback and a second touch position (non-feedback position) at which not to provide feedback (S102). For example, the haptic feedback determining unit 104 determines, from among the two touch positions $P_1$ and $P_2$, the feedback position to be the touch position $P_1$ and the non-feedback position to be the touch position $P_2$.

More specifically, the haptic feedback determining unit 104, for example, determines the feedback position based on information displayed. More specifically, the haptic feedback determining unit 104, for example, determines the feedback position to be a touch position at which a GUI object (a button or slider, for example) is displayed. Moreover, the haptic feedback determining unit 104 may, for example, determine the feedback position to be a touch position at which link information for a web browser is shown.

It should be noted that the haptic feedback determining unit 104 is not necessarily required to determine the feedback position based on information displayed. For example, the haptic feedback determining unit 104 may determine the feedback position based on load magnitude, duration of a touch, or positional relationship between a plurality of touch positions.

Moreover, the haptic feedback determining unit 104 is not required to always determine the feedback position when the plurality of touch positions are obtained by the touch information obtaining unit 103. For example, when no touch position among the plurality of touch positions fulfills a predetermined condition, the haptic feedback determining unit 104 may determine all touch positions to be non-feedback positions without determining a feedback position. Moreover, for example, when temporal changes in a touch position are great, all touch positions may be determined to be non-feedback positions. In this case, since provision of haptic feedback is not required, processing returns to step S101.

(Step S103)

Next, the transfer function obtaining unit 106 obtains, from the transfer function storage unit 105, transfer functions corresponding to the plurality of touch positions obtained by the touch information obtaining unit 103 (S103). For example, the haptic feedback determining unit 104 retrieves, from the transfer function storage unit 105, transfer functions $g_{11}$, $g_{12}$, $g_{13}$, and $g_{14}$ from actuators $A_1$, $A_2$, $A_3$, and $A_4$ to the touch position $P_1$, and transfer functions $g_{21}$, $g_{22}$, $g_{23}$, and $g_{24}$ from actuators $A_1$, $A_2$, $A_3$, and $A_4$ to the touch position $P_2$.

(Step S104)

For example, the haptic feedback determining unit 104 calculates filters for providing haptic feedback at the touch position $P_1$ and for refraining from providing haptic feedback at the touch position $P_2$ using the transfer functions $g_{11}$, $g_{12}$, $g_{13}$, $g_{14}$, $g_{21}$, $g_{22}$, $g_{23}$, and $g_{24}$.

Hereinafter a more detailed example of a method of calculating the filters will be given.

Here, the transfer function (impulse response) $g_{ij}$ from the actuator $A_j$ to the touch position $P_i$ is expressed as Equation 4 shows. Moreover, the filter $h_j$ for generating the driving signal for the actuator $A_j$ is expressed as Equation 5 shows. Moreover, the response (output) $d_i$ at the touch position $P_i$ relative to the input to all actuators $A_1$ through $A_M$ is expressed as Equation 6 shows.

[Math 4]

$$g_{ij} = [g_{ij}(0) g_{ij}(1) \ldots g_{ij}(L_g)]^T \qquad (4)$$

[Math 5]

$$h_j = [h_j(0) h_j(1) \ldots h_j(L)]^T \qquad (5)$$

[Math 6]

$$d_i = [d_i(0) d_i(1) \ldots d_i(L_g+L)]^T \qquad (6)$$

In Equation 4, $L_g$ represents the length of the impulse response. In Equation 5, L represents the length of the filter (filter length). The longer the filter length, the more detailed the control can become.

Next, the relationship between (i) the input to the actuators $A_1$ through $A_M$ and the filters $h_1$ and $h_M$ and (ii) the response $d_i$ at one touch position $P_i$ will be considered. The response at one touch position $P_i$ relative to the input to one actuator $A_j$ is calculated using the convolution of the filter $h_j$ and the transfer function $g_{ij}$. It is possible to calculate the response $d_i$ at one touch position $P_i$ relative to the input to all of the actuators $A_1$ through $A_M$ by overlapping the responses at one touch position $P_i$ relative to the input to one actuator $A_j$ for all of the actuators $A_1$ through $A_M$. In other words, the response $d_i$ can be expressed as Equation 7 shows using a filter $h_j$ and a transfer function $g_{ij}$.

[Math 7]

$$D = GH \qquad (7)$$

$$D = \begin{bmatrix} d_1(0) \\ d_1(1) \\ \vdots \\ \hline \vdots \\ \hline d_N(0) \\ d_N(1) \\ \vdots \end{bmatrix}$$

$$G = \begin{bmatrix} G_{11} & G_{12} & \ldots & G_{1M} \\ G_{21} & G_{22} & \ldots & G_{2M} \\ \vdots & \vdots & \ddots & \vdots \\ G_{N1} & G_{N2} & \ldots & G_{NM} \end{bmatrix}$$

$$G_{ij} = \begin{bmatrix} g_{ij}(0) & 0 & \ldots & 0 & 0 \\ g_{ij}(1) & g_{ij}(0) & \ldots & 0 & 0 \\ g_{ij}(2) & g_{ij}(1) & \ldots & 0 & 0 \\ \vdots & \vdots & \ddots & \vdots & \vdots \\ g_{ij}(L_g) & g_{ij}(L_g-1) & \ldots & g_{ij}(0) & 0 \\ 0 & g_{ij}(L_g) & \ldots & g_{ij}(1) & g_{ij}(0) \\ \vdots & \vdots & \ddots & \vdots & \vdots \\ 0 & 0 & \ldots & 0 & g_{ij}(L_g) \end{bmatrix}$$

$$H = \begin{bmatrix} H_1 \\ H_2 \\ \vdots \\ H_M \end{bmatrix} = \begin{bmatrix} h_1(0) \\ h_1(1) \\ \vdots \\ \hline \vdots \\ \hline h_M(0) \\ h_M(1) \\ \vdots \end{bmatrix}$$

As Equation 7 shows, the responses $d_1$ through $d_N$ at the touch positions $P_1$ through $P_N$ relative to the inputs to the actuators $A_1$ through $A_M$ are expressed as the sum of the convolutions of the transfer functions $g_{ij}$ from each actuator $A_j$ to each touch position $P_i$ and the filter $h_j$ to be calculated.

Here, a desired filter can be obtained if the filter $h_j$ can be calculated so that only the response $d_k$ at the touch position $P_k$ ($0 < k \leq N$) among the plurality of touch positions $P_1$ through $P_N$ is an impulse ($d_k(0)=1$, $d_k(1)=0$, $d_k(2)=0$, ..., $d_k(M)=0$), and the responses at all other touch positions $P_l$ ($0 < l \leq N$, $l \neq k$) is zero ($d_l(0)=0$, $d_l(1)=0$, $d_l(2)=0$, ..., $d_l(M)=0$). In other words, by filtering a given haptic signal using the filter $h_j$ calculated in this manner, it is possible to generate driving signals for providing haptic feedback according to the given haptic signal only at the touch position $P_k$ and refrain from providing haptic feedback at other touch positions $P_l$ ($l \neq k$).

The filter calculating unit 107 calculates the filters so that a sum of convolution results, in the time domain, of the transfer functions from the plurality of actuators 102 to the feedback position and the filters indicates an impulse and a sum of convolution results, in the time domain, of the transfer functions from the plurality of actuators 102 to the non-feedback position and the filters indicates zero.

The method of calculating the above-described filters is not particularly limited to a given method, but the filters can be calculated by calculating the generalized inverse matrix G* of G, as Equation 8 shows. In other words, it is possible to calculate H, which represents a desired filter, from D, which indicates impulse, and the generalized inverse matrix G* of G.

[Math 8]

$$H = G^*D \qquad (8)$$

Typically, it is possible to solve Equation 8 if the number of actuators (M) is greater than or equal to the number of touch positions (N). It should be noted that in order to stably solve Equation 8 with respect to an arbitrary combination of touch positions, at each position, it is preferable that the transfer functions $g_{ij}$ from the plurality of actuators 102 do not have the same zero point. For example, by providing two actuators 102 at the edge on each lengthwise side of the panel 101, as FIG. 3 shows, when there are two touch positions, it is possible to arrange the actuators 102 so that the transfer functions at two given points are different.

It should be noted that zero point refers to a frequency, in the frequency domain, at which the transfer function level is 0 or as close to 0 as possible. In other words, even if a zero point frequency component is included in the input, that frequency component is almost never included in the output.

As such, when transfer functions from all actuators 102 to a given position have a zero point at the same frequency, regardless of the kind of signal inputted, the panel 101 will not vibrate at that position, at that frequency. In other words, capability of controlling vibration at a specific frequency is lost. Consequently, at each frequency to be used for control, it is preferable that the transfer functions from at least one actuator 102 have a characteristic that is not zero point.

Figure 9:
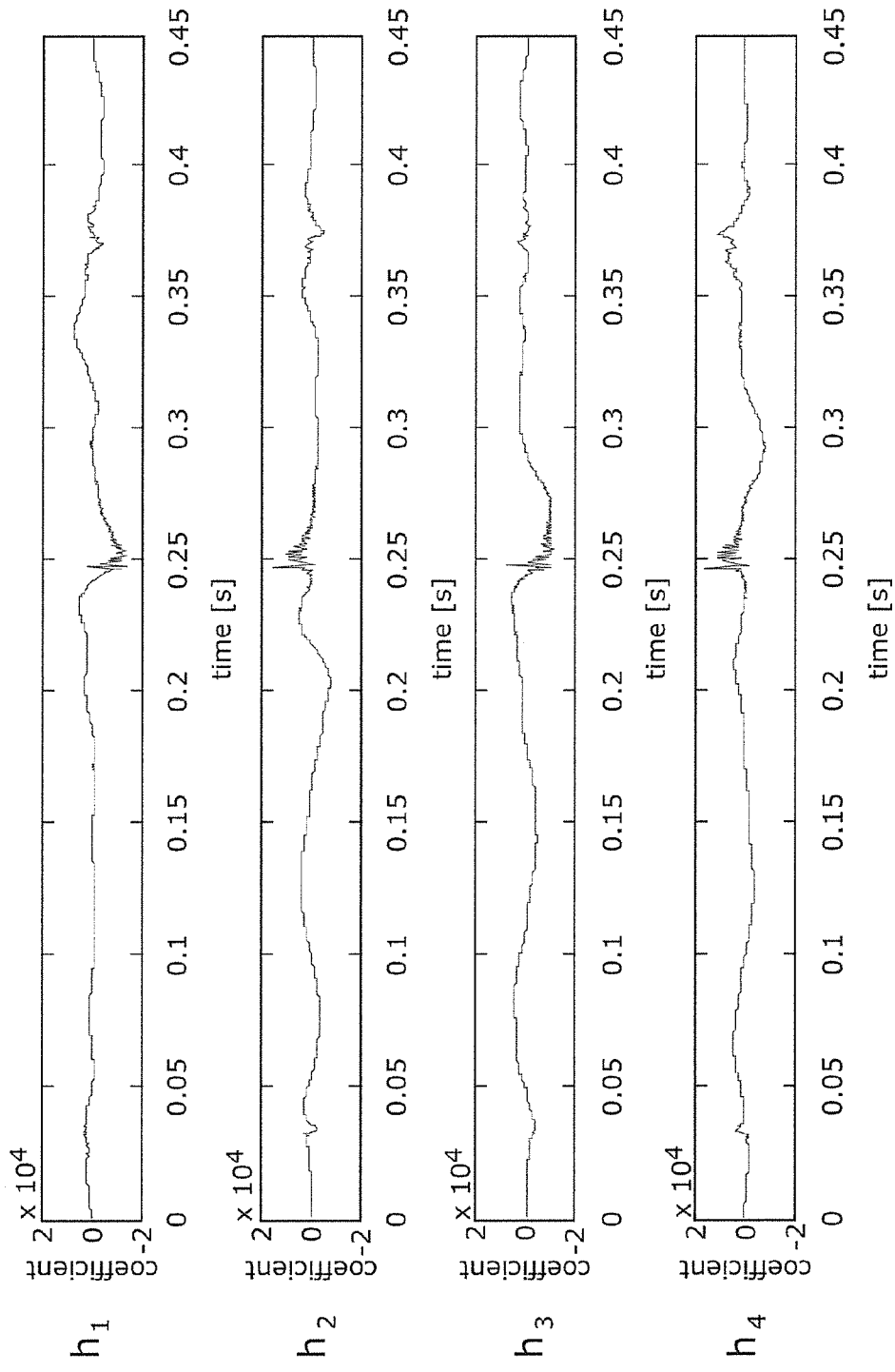
FIG. 9 shows examples of filters.

FIG. 9 shows examples of filters. More specifically, FIG. 9 shows the filters calculated when the touch position $P_1$ in FIG. 8 is determined to be the feedback position.

(Step S105)

Next, the filtering unit 109 filters a haptic signal stored in the haptic signal storage unit 108 using the filters calculated in step S104 to generate driving signals for driving the actuators 102. More specifically, the filtering unit 109 obtains a convolution result of the haptic signal S(n) and the filter $h_j(n)$ to generate the driving signals for the actuators $A_j$.

It should be noted that when a plurality of haptic signals are stored in the haptic signal storage unit 108, the filtering unit 109 selects one haptic signal from among the plurality of haptic signals, and filters the selected haptic signal. For example, the filtering unit 109 selects the haptic signal shown in FIG. 6A from among the haptic signals shown in FIG. 6A and FIG. 6B. It should be noted that the selection method of the haptic signal does not need to be restricted to this example.

Next, the filtering process will be discussed in more detail.

The filtering unit 109 generates a driving signal $u_j(n)$ for driving the actuator $A_j$, as Equation 9 shows. In other words, the filtering unit 109 generates the driving signal $u_j(n)$ by calculating a convolution of the haptic signal s(n) and the filter $h_j(n)$ calculated by the filter calculating unit 107.

[Math 9]

$$u_j(n) = s(n) \otimes h_j(n) = \Sigma s(n-k) h_j(k) \quad (9)$$

Figure 10:
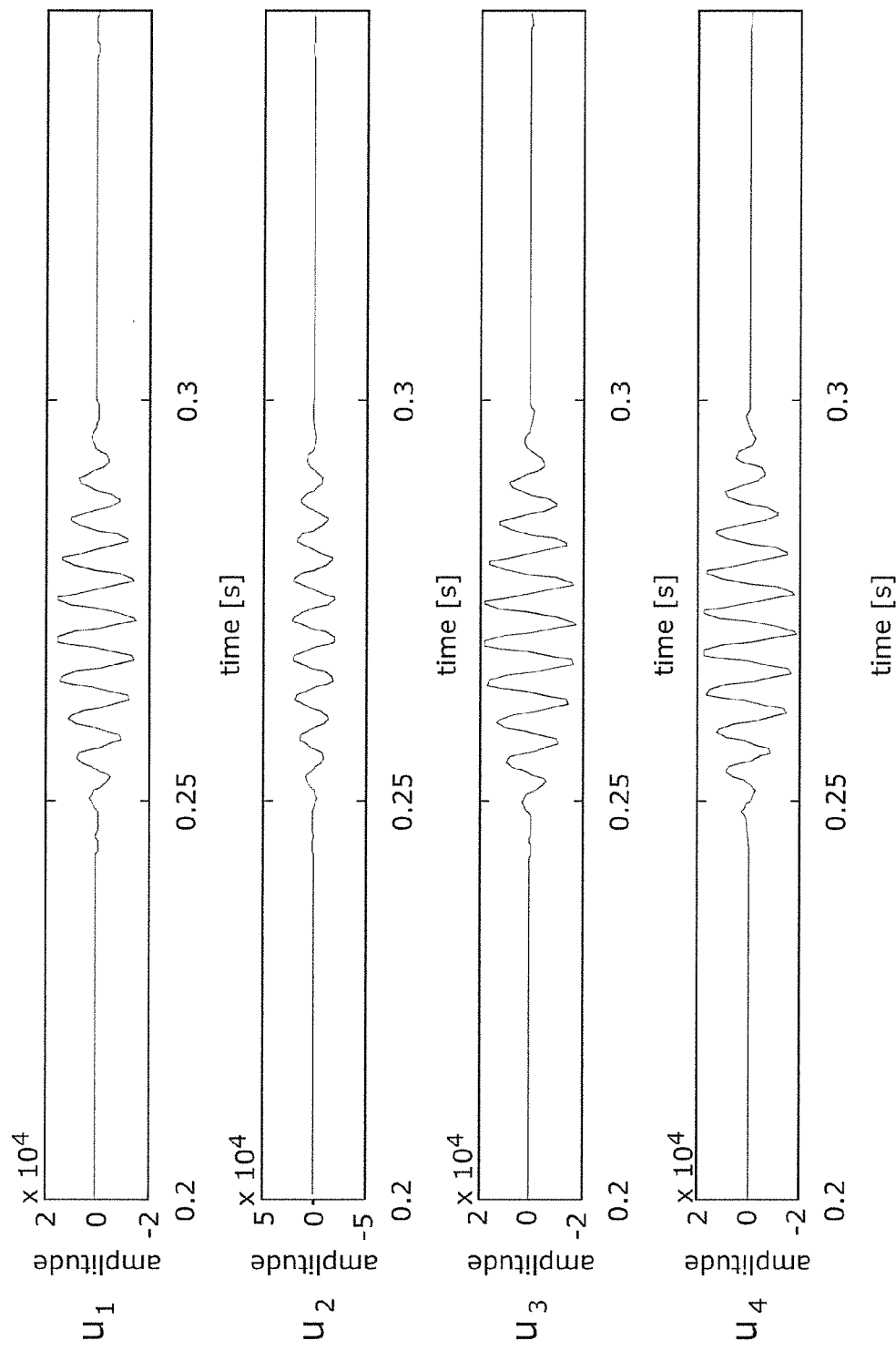
FIG. 10 shows examples of driving signals.

FIG. 10 shows examples of the driving signals. In other words, FIG. 10 shows examples of the driving signals generated by the filtering unit 109 according to Equation 9. More specifically, FIG. 10 shows driving signals generated by processing the haptic signal shown in FIG. 6A using the filters shown in FIG. 9.

(Step S106)

Next, the actuator $A_j$ is driven using the driving signal $u_j(n)$ generated in step S105. In other words, the actuator $A_j$ vibrates the panel 101 according to the driving signal $u_j(n)$.

It should be noted that depending on the type of actuators used, high voltage driving signals may be required. In this case, the actuators 102 may include an amplifier for amplifying the driving signals.

Figure 11:
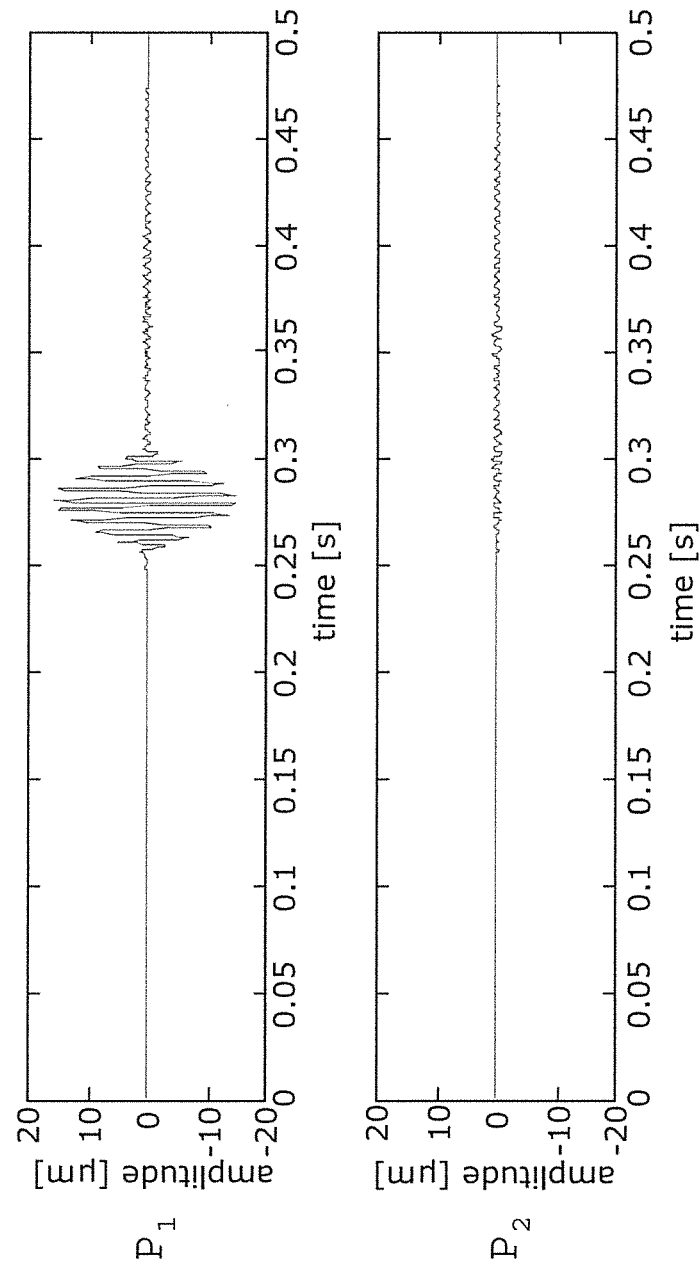
FIG. 11 shows an actual result of the vibration imparted on the panel 111 at each touch position.

FIG. 11 shows an actual result of the vibration imparted on the panel 101 at each touch position. More specifically, FIG. 11 shows vibrations imparted on the panel 101 at the touch positions $P_1$ and $P_2$ when the actuators 102 are driven using the driving signals shown in FIG. 10.

It can be seen that the touch position $P_1$ is strongly vibrated as the difference between vibration peaks (hereinafter referred to as amplitude level) is approximately 30 μm. On the other hand, it can be seen that the touch position $P_2$ is only vibrated to a degree that is not perceptible by humans as the amplitude level is approximately 1 μm.

It should be noted that in FIG. 11, vibration characteristics are shown at the touch positions $P_1$ and $P_2$, but locations other than the touch positions $P_1$ and $P_2$ are also vibrating. However, since the user is not touching any location other than the touch positions $P_1$ and $P_2$, haptic feedback is not provided to the user regardless of what kind of vibration is occurring.

(Advantageous Effect)

As described above, with the haptic feedback device 100 according to Embodiment 1, it is possible for haptic feedback to be provided at the feedback position and for either haptic feedback weaker than the haptic feedback provided at the feedback position to be provided at non-feedback positions or haptic feedback to not be provided at non-feedback positions. As such, among multiple touches, it is possible to provide suitable haptic feedback by providing a touch requiring haptic feedback with haptic feedback that is different than what is provided for other touches. In other words, it is possible to reduce unnecessary confusion caused by haptic feedback.

Moreover, the driving signals for driving the actuators 102 are signals generated using transfer functions. As such, even if the feedback position and the actuator are not closely located, it is possible to impart vibration at the feedback position and not impart vibration at the non-feedback position. In other words, since it is not necessary to provide a plurality of actuators below the panel, it is possible to efficiently provide haptic feedback for multiple touches. Furthermore, even in cases where a display apparatus is provided below the panel, provision of transparent actuators are not required, making it possible to relatively simply manufacture the haptic feedback device.

It should be noted that in Embodiment 1, the haptic feedback device 100 is provided with the transfer function storage unit 105 and the haptic signal storage unit 108, but provision of these storage units is not absolutely necessary. In the case that these storage units are not provided, the haptic feedback device 100, for example, may obtain a transfer function or a haptic signal from a storage apparatus connected over a network.

Variation 1 of Embodiment 1

The haptic feedback device according to Variation 1 is different from Embodiment 1 in that the filters are calculated in the frequency domain instead of the time domain. Hereinafter Variation 1 will be described focusing on the points that differ from Embodiment 1.

The filter calculating unit 107 calculates the filters so that a sum of products, in the frequency domain, of the transfer functions from the plurality of actuators 102 to the feedback position and the filters indicates an impulse and a sum of products, in the frequency domain, of the transfer functions from the plurality of actuators 102 to the non-feedback position and the filters indicates zero.

More specifically, the filter calculating unit 107 calculates the filters in the frequency domain in the following manner.

The response D represented in the frequency domain is expressed using the transfer function G represented in the frequency domain and the filter H, as Equation 10 shows.

[Math 10]

$$D = GH \quad (10)$$

$$D = \begin{bmatrix} D_1(\omega) \\ D_2(\omega) \\ \vdots \\ D_N(\omega) \end{bmatrix}$$

$$G = \begin{bmatrix} G_{11}(\omega) & G_{12}(\omega) & \ldots & G_{1M}(\omega) \\ G_{21}(\omega) & G_{22}(\omega) & \ldots & G_{2M}(\omega) \\ \vdots & \vdots & \ddots & \vdots \\ G_{N1}(\omega) & G_{N2}(\omega) & \ldots & G_{NM}(\omega) \end{bmatrix}$$

$$H = \begin{bmatrix} H_1(\omega) \\ H_2(\omega) \\ \vdots \\ H_M(\omega) \end{bmatrix}$$

In Equation 10, the transfer functions $G_{ij}(\omega)$ are transfer functions from the actuators $A_j$ to the touch positions $P_i$, and are represented in the frequency domain. Moreover, the filters $H_j(\omega)$ are filters for generating the driving signals for the actuators $A_j$, and are represented in the frequency domain. Moreover, the responses $D_i(\omega)$ are responses at the touch positions $P_i$, and are represented in the frequency domain.

Here, in the frequency band targeted for control, a desired filter can be obtained if the filter H can be calculated so that only the response $d_k$ at the touch position $P_k$ (0<k≤N) among the plurality of touch positions $P_1$ through $P_N$ is an impulse ($D_k(\omega)=1$), and the responses at all other touch positions $P_l$ (0<l≤N, l≠k) is zero ($D_l(\omega)=0$).

It should be noted that the frequency band targeted for control may be determined, for example, based on the frequency band detectable as haptic sensation by humans. In general, since humans can highly detect haptic sensation from a few Hz to 500 Hz, the frequency band targeted for control may be set to from 10 Hz to 500 Hz.

The method of calculating the above-described filters is not particularly limited to a given method, but the filters can be calculated by calculating the generalized inverse matrix G* of G, as Equation 11 shows. In other words, it is possible to calculate H, which represents a desired filter, from D, which indicates impulse, and the generalized inverse matrix G* of G.

[Math 11]

$$H=G^*D \tag{11}$$

In this way, the filter calculating unit 107 can easily calculate the filter if the generalized inverse matrix G* shown in Equation 11 is calculated. In Variation 1, as Equation 10 shows, G represented in the frequency domain is a matrix of N rows and M columns. As such, it is possible to calculate the generalized inverse matrix G* more easily than G represented in the time domain shown in Equation 7 in Embodiment 1.

In other words, with the haptic feedback device 100 according to Variation 1, it is possible to relatively easily calculate the reverse matrix of a matrix of the transfer functions by calculating filters in the frequency domain, and it is possible to reduce processing load. With this it is possible to suitably provide haptic feedback for multiple touches even in devices with low processing capability such as smart phones or tablet computers. Moreover, since the processing load for haptic feedback can be reduced, processes for haptic feedback can be performed in parallel with other processes.

Variation 2 of Embodiment 1

In Variation 2, the method of determining the feedback position in Embodiment 1 will be discussed in detail. Hereinafter Variation 2 will be described focusing on the points that differ from Embodiment 1.

In Variation 2, while viewing an image displayed by display apparatus 110 on the panel 101, the user touches a point on the image via the panel 101. In other words, the user makes an action by directly touching an image displayed by the display apparatus 110 on the panel 101.

As previously described, the display apparatus 110 is provided below the panel 101. The display apparatus 110 is, for example, a liquid crystal display or an organic light-emitting diode display. It should be noted that the display apparatus 110 does not need to be limited to a liquid crystal display or an organic light-emitting diode display, and may be any kind of apparatus that is capable of displaying an image on the panel 101.

In Variation 2, the display apparatus 110 is included in the haptic feedback device 100. In this case, the display apparatus 110 may be referred to as a display unit.

The haptic feedback determining unit 104 determines the feedback position based on an image displayed on the panel 101. In other words, the haptic feedback determining unit 104 determines the feedback position based on positional relationships of the displayed image and the multiple touches on the panel 101.

Hereinafter, operations performed by the haptic feedback determining unit 104 will be described with reference to three specific examples of images displayed on the panel 101. First, the first example will be discussed.

Figure 12:
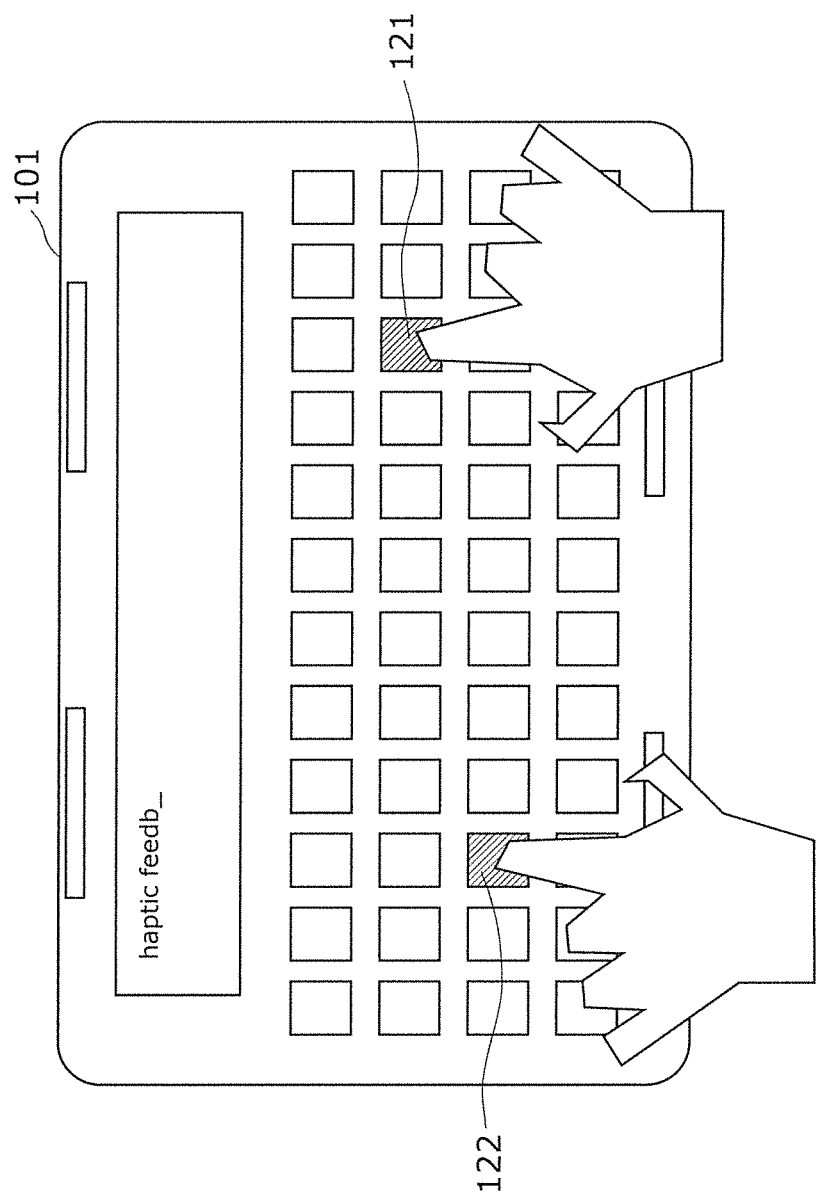
FIG. 12 shows a first example of an image displayed on the panel according to Variation 2 of Embodiment 1.

FIG. 12 shows a first example of an image displayed on the panel 101 according to Variation 2 of Embodiment 1. In this example, the image being displayed is an image of a keyboard. The user makes key inputs by touching with his or her finger, for example, a position at which a key is displayed on the panel 101.

In FIG. 12, after touching key 121, the user touches key 122 while still touching key 121. In other words, the touch positions in FIG. 12 include the position at which key 121 is shown and the position at which key 122 is shown.

Next, operations performed by the haptic feedback determining unit 104 when an image like this is displayed will be discussed.

Figure 13:
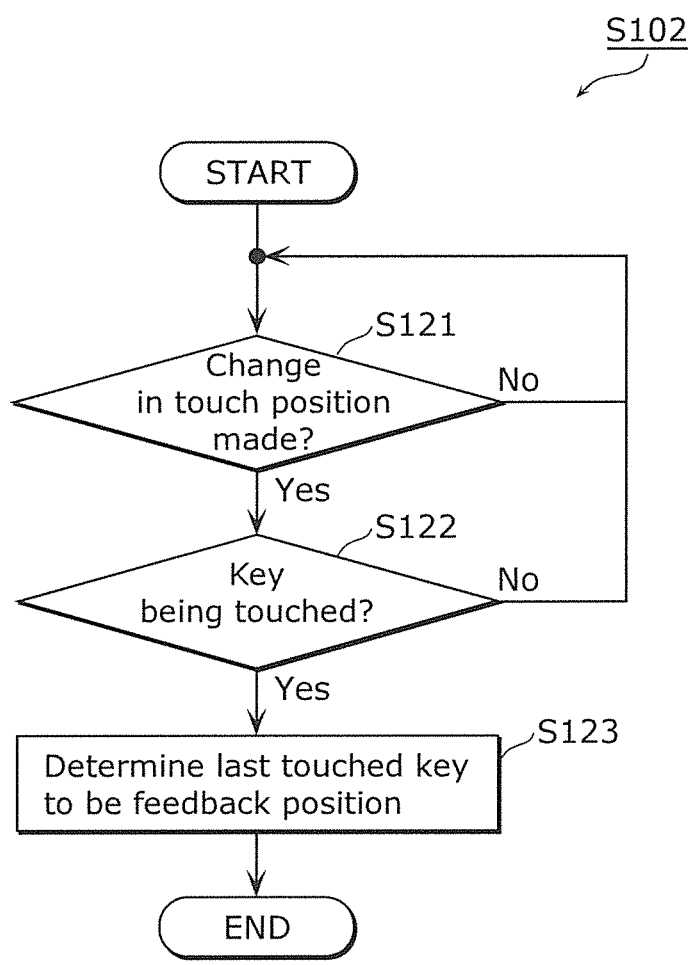
FIG. 13 is a flow chart showing an example of operations performed by the haptic feedback determining unit according to Variation 2 of Embodiment 1.

FIG. 13 is a flow chart showing operations performed by the haptic feedback determining unit 104 according to Variation 2 of Embodiment 1. More specifically, FIG. 13 shows step S102 in detail when, for example, the image in FIG. 12 is displayed.

First, the haptic feedback determining unit 104 determines whether a change in touch position has been made (S121). The haptic feedback determining unit 104, for example, determines whether the touch position has moved or whether the number of touch positions has increased.

Here, when no change in touch position has been made (no in S121), the processing returns to step S121. However, when a change in touch position has been made (yes in S121), the haptic feedback determining unit 104 determines whether the touch position at which a change has occurred is a position at which a key (button) is displayed or not (S122).

For example, when the panel 101 goes from a state in which no fingers are touching it to a state in which one finger is touching a key, the haptic feedback determining unit 104 determines that the touch position at which a change occurred is a position at which a key is displayed. Moreover, when the panel 101 goes from a state in which one finger is already touching a key to a state in which another finger is touching a different key, the haptic feedback determining unit 104 determines that the touch position at which a change occurred is a position at which a key is displayed. On the other hand, when the panel 101 goes from a state in which one finger is already touching a key to a state in which another finger is touching an area that is not a key, the haptic feedback determining unit 104 determines that the touch position at which a change occurred is not a position at which a key is displayed. In other words, the haptic feedback determining unit 104 determines whether a state changing touch is a touch made on a key or not.

Here, when the touch position at which a change is made is not a display position of a key (no in S122), the processing returns to step S121. On the other hand, when the touch position at which a change is made is a display position of a key (yes in S122), the haptic feedback determining unit 104 determines the touch position of the key last touched to be a feedback position (S123). In the specific example shown in FIG. 12, the haptic feedback determining unit 104 determines the touch position at key 122 to be a feedback position. In other words, the haptic feedback determining unit 104 determines the touch position at key 121 to be a non-feedback position.

As a result of the feedback position and the non-feedback position being determined in this manner, the haptic feedback device 100 is capable of providing haptic feedback to a valid key touch and refraining from providing haptic feedback to an invalid key touch. In other words, the haptic feedback device 100 can provide haptic feedback at a touch position which requires haptic feedback and can refrain from providing haptic feedback at a touch position which does not require haptic feedback. As such, the haptic feedback device 100 is capable of reducing unnecessary confusion caused by haptic feed back.

It should be noted that instead of the touch position of a key last touched, the haptic feedback determining unit 104 may determine a touch position simply having a load greater than or equal to a threshold to be a feedback position. In this case, the haptic feedback device 100 can refrain from providing haptic feedback at a touch position at which a finger is simply contacting the key, and provide haptic feedback at a touch position of a key being pressed down.

Next, the second example will be discussed.

Figure 14:
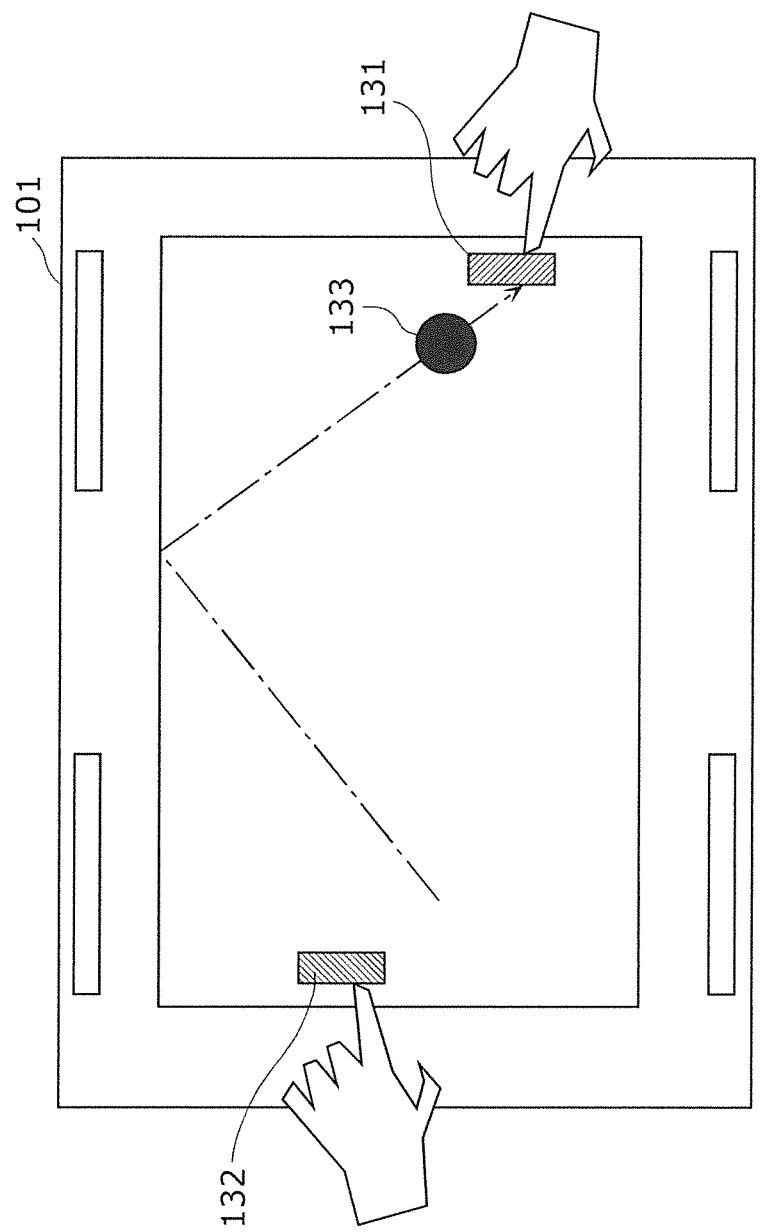
FIG. 14 shows a second example of an image displayed on the panel according to Variation 2 of Embodiment 1.

FIG. 14 shows a second example of an image displayed on the panel 101 according to Variation 2 of Embodiment 1. In this example, the image being displayed is an image of an air hockey game being played. Two users move paddles 131 and 132 by touching the positions at which the paddles 131 and 132 are displayed on the panel 101 with their fingers and moving their fingers. The direction of movement and speed of the puck 133 is changed by the paddles 131 and 132.

Next, the operations performed by the haptic feedback determining unit 104 when an image like this is displayed will be discussed.

Figure 15:
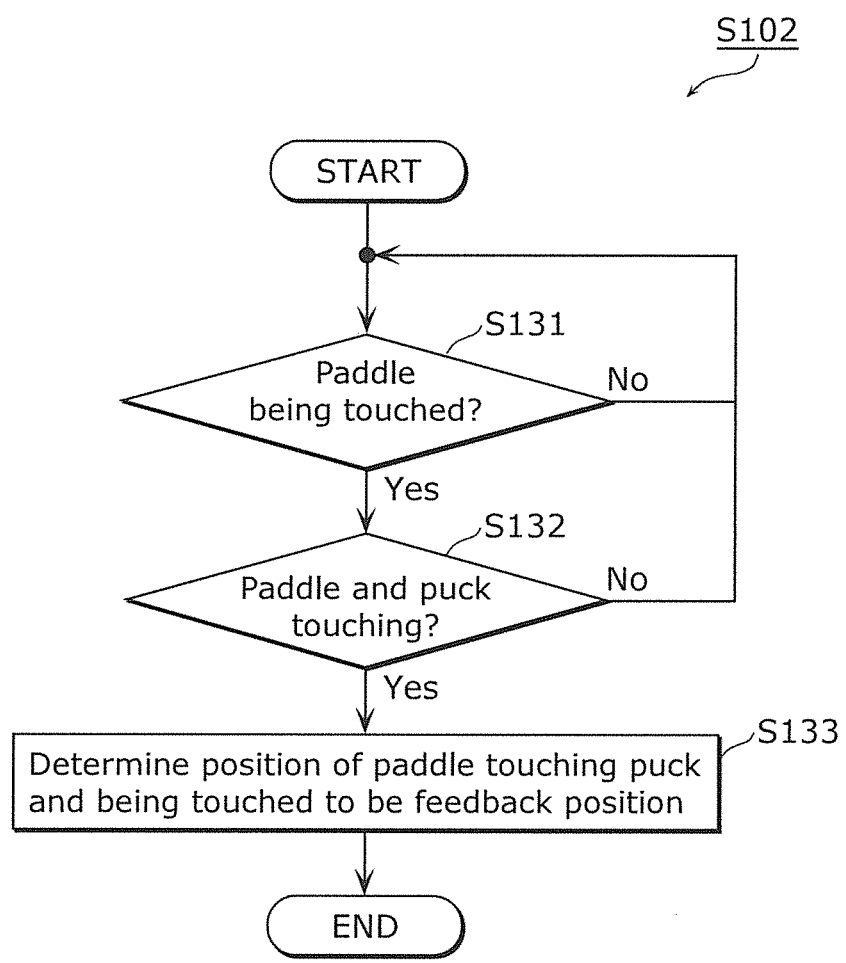
FIG. 15 is a flow chart showing an example of operations performed by the haptic feedback determining unit according to Variation 2 of Embodiment 1.

FIG. 15 is a flow chart showing another example of operations performed by the haptic feedback determining unit 104 according to Variation 2 of Embodiment 1. More specifically, FIG. 15 shows step S102 in detail when, for example, the image in FIG. 12 is displayed.

First, the haptic feedback determining unit 104 determines whether at least one of a plurality of touch positions is a position at which a paddle is displayed (S131). In other words, the haptic feedback determining unit 104 determines whether a user is touching a paddle displayed on the panel or not.

Here, when the touch position is not a position at which a paddle is displayed (no in S131), the processing returns to step S131. However, when the touch position is a position at which a paddle is displayed (yes in S131), the haptic feedback determining unit 104 determines whether the paddle displayed at the touch position is touching the puck or not (S132). In other words, the haptic feedback determining unit 104 determines whether a paddle being used is touching the puck or not.

Here, when the paddle displayed at the touch position is not touching the puck (no in S132), the processing returns to step S131. On the other hand, when the paddle displayed at the touch position is touching the puck (yes in S132), the haptic feedback determining unit 104 determines the touch position of the paddle touching the puck to be a feedback position (S133). In other words, the haptic feedback determining unit 104 determines a touch position at which the paddle is not touching the puck to be a non-feedback position.

As a result of the feedback position and the non-feedback position being determined in this manner, the haptic feedback device 100 is capable of providing haptic feedback to touch position at which a paddle is touching the puck and refraining from providing haptic feedback to a touch position at which a paddle is not touching the puck. In other words, the haptic feedback device 100 can provide haptic feedback at a touch position which requires haptic feedback and can refrain from providing haptic feedback at a touch position which does not require haptic feedback. As such, the haptic feedback device 100 is capable of reducing unnecessary confusion caused by haptic feedback.

Next, the third example will be discussed.

Figure 16:
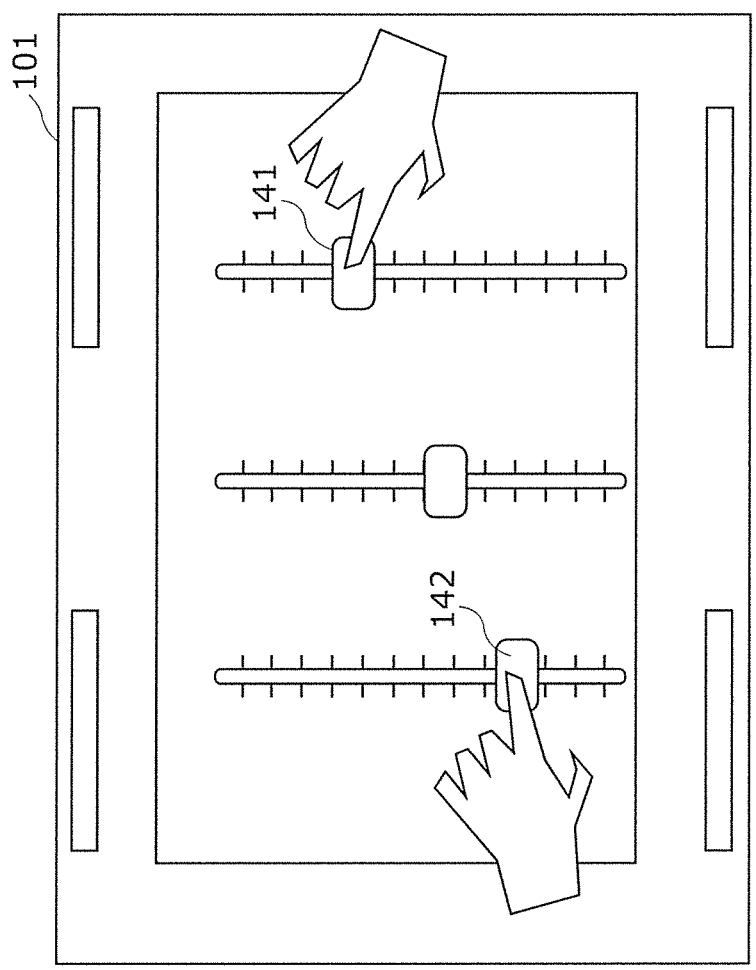
FIG. 16 shows a third example of an image displayed on the panel according to Variation 2 of Embodiment 1.

FIG. 16 shows a third example of an image displayed on the panel 101 according to Variation 2 of Embodiment 1. In this example, the image being displayed is an image of a slider interface. A user moves buttons 141 and 142 in their sliding directions by touching the position at which the buttons 141 and 142 are displayed on the panel 101 with his or her fingers and moving his or her fingers. A limiting amount is determined based on the position of the buttons 141 and 142 in the sliding direction. It should be noted tick marks are displayed in the sliding direction which denote the relationship to the limiting amount.

Next, the operations performed by the haptic feedback determining unit 104 when such an image is displayed will be discussed.

Figure 17:
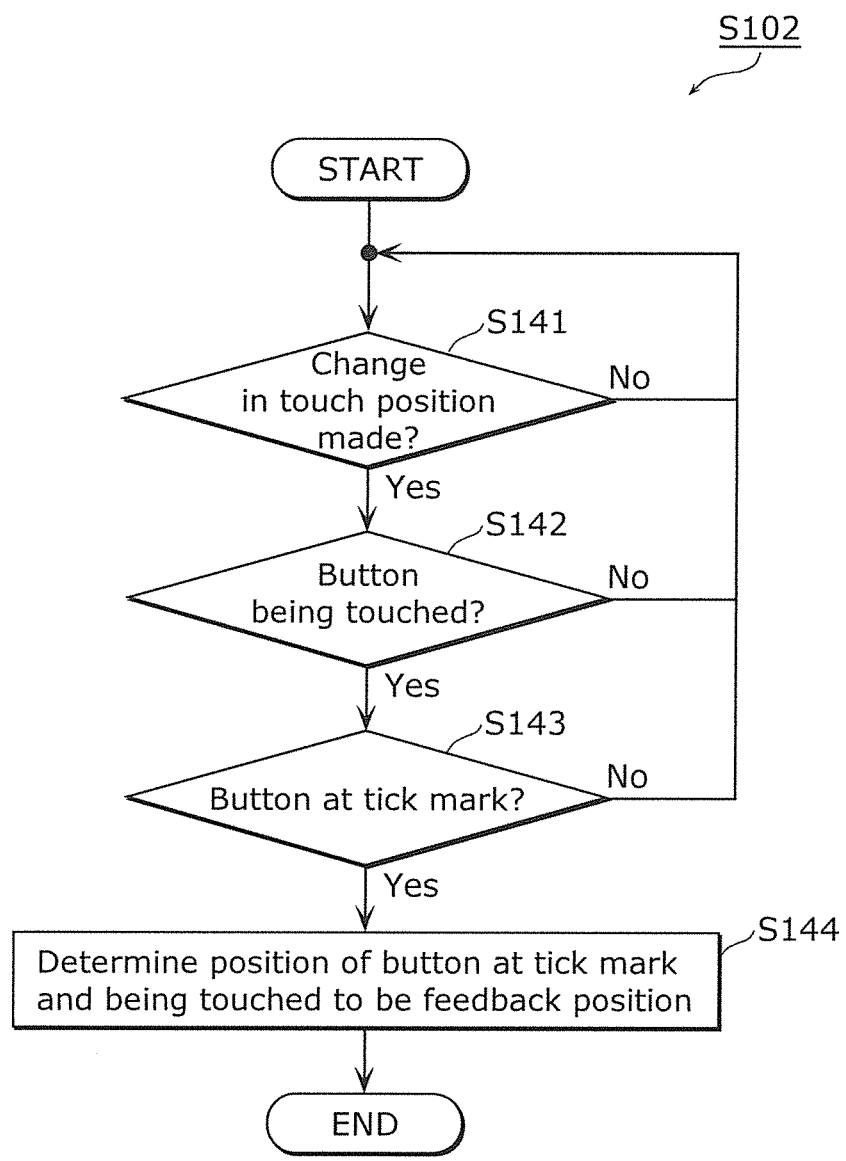
FIG. 17 is a flow chart showing an example of operations performed by the haptic feedback determining unit according to Variation 2 of Embodiment 1.

FIG. 17 is a flow chart showing another example of operations performed by the haptic feedback determining unit 104 according to Variation 2 of Embodiment 1. More specifically, FIG. 17 shows step S102 in detail when, for example, the image in FIG. 16 is displayed.

First, the haptic feedback determining unit 104 determines whether a change in touch position has been made (S141). The haptic feedback determining unit 104, for example, determines whether the touch position has moved or not.

Here, when no change in touch position has been made (no in S141), the processing returns to step S141. However, when a change in touch position has been made (yes in S141), the haptic feedback determining unit 104 determines whether the touch position at which a change has occurred is a position at which a button is displayed or not (S142).

Here, when the touch position at which a change is made is not a display position of a button (no in S142), the processing returns to step S141. On the other hand, when the touch position at which a change is made is a display position of a button (yes in S142), the haptic feedback determining unit 104 determines whether button at the touch position is a position corresponding to a tick mark (hereinafter referred to as a tick mark position) or not (S143).

Here, when the button at the touch position is not at a tick mark position (no in S143), the processing returns to step S141. On the other hand, when the button at the touch position is at a tick mark position (yes in S143), the haptic feedback determining unit 104 determines the touch position at both the tick mark position and the display position of the button to be a feedback position (S144). In other words, the haptic feedback determining unit 104 determines touch positions not in memory or not at a display position of a button to be non-feedback positions.

As a result of the feedback position and the non-feedback position being determined in this manner, the haptic feedback device 100 is capable of providing haptic feedback when a button passes a tick mark position and refraining from providing haptic feedback when a button is still or passing a position which is not a tick mark position. In other words, the haptic feedback device 100 can provide haptic feedback at a touch position which requires haptic feedback and can refrain from providing haptic feedback at a touch position which does not require haptic feedback. As such, the haptic feedback device 100 is capable of reducing unnecessary confusion caused by haptic feedback.

As shown hereinbefore, the haptic feedback device 100 according to Variation 2 is capable of adequately determining a feedback position based on the image being displayed on the panel 101. As such, the haptic feedback device 100 is capable of suitably providing haptic feedback to multiple touches, and reducing unnecessary confusion caused by haptic feedback.

Embodiment 2

Whereas the haptic feedback device according to Embodiment 1 provides haptic feedback to one touch position, the haptic feedback device according to Embodiment 2 is different in that it provides haptic feedback to a plurality of mutually different touch positions. Hereinafter Embodiment 2 will be described focusing on the points that differ from Embodiment 1.

(Device Configuration)

Figure 18:
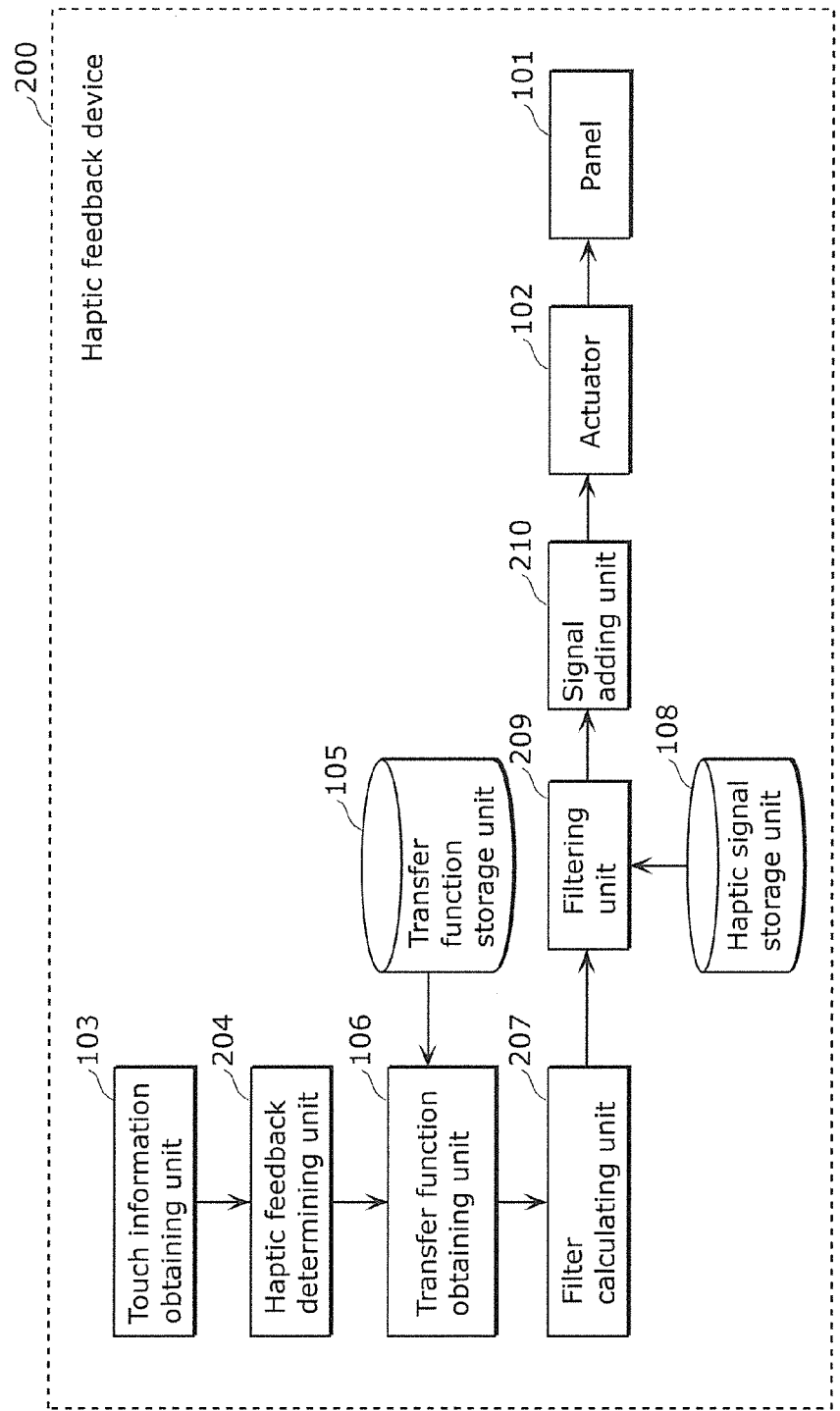
FIG. 18 is a block diagram showing the functional configuration of the haptic feedback device according to Embodiment 2.

FIG. 18 shows the functional configuration of a haptic feedback device 200 according to Embodiment 2. In FIG. 18, the structural elements that are the same as those in FIG. 2 share the same reference numerals, and as such, explanations thereof are omitted.

As FIG. 18 shows, the haptic feedback device 200 includes the panel 101, a plurality of the actuators 102, the touch information obtaining unit 103, a haptic feedback determining unit 204, the transfer function storage unit 105, the transfer function obtaining unit 106, a filter calculating unit 207, the haptic signal storage unit 108, a filtering unit 209, and a signal adding unit 210.

(Haptic Feedback Determining Unit 204)

The haptic feedback determining unit 204 determines at least a first touch position (hereinafter referred to as the first feedback position) and a second touch position (hereinafter referred to as the second feedback position) from among a plurality of touch positions. The first feedback position is a touch position at which haptic feedback is provided with vibrations indicated by a first haptic signal. The second feedback position is a touch position at which haptic feedback is provided by vibrations indicated by a second haptic signal.

In Embodiment 2, the second haptic signal is a different signal from the first haptic signal. For example, the first haptic signal and the second haptic signals may be one or the other of the signals shown in FIG. 6A and FIG. 6B.

(Filter Calculating Unit 207)

The filter calculating unit 207 obtains first filters for filtering a given haptic signal to generate driving signals for driving the actuators 102 to vibrate the panel 101 at the first feedback position according to a given haptic signal and not vibrate the panel 101 at the second feedback position. Furthermore, the filter calculating unit 207 obtains second filters for filtering a given haptic signal to generate driving signals for driving the actuators 102 to not vibrate the panel 101 at the first feedback position and vibrate the panel 101 at the second feedback position according to a given haptic signal.

(Filtering Unit 209)

The filtering unit 209 generates first driving signals by filtering the first haptic signal using first filters. With these first driving signals, it is possible to drive the actuators 102 to vibrate the panel 101 at the first feedback position according to the first haptic signal and not vibrate the panel 101 at the second feedback position.

Furthermore, the filtering unit 209 generates second driving signals by filtering the second haptic signal using second filters. With these second driving signals, it is possible to drive the actuators 102 to not vibrate the panel 101 at the first feedback position and vibrate the panel 101 at the second feedback position according to the second haptic signal.

In Embodiment 2, the filtering unit 209 obtains the first haptic signal and the second haptic signal from the haptic signal storage unit 108.

(Signal Adding Unit 210)

The signal adding unit 210 adds together, for each actuator 102, the first driving signal and the second driving signal generated by the filtering unit 209. In other words, for each of the actuators 102, the signal adding unit 210 adds together a plurality of driving signals generated by the filtering unit 209.

It should be noted that the preceding description is based on there being two feedback positions, but there may be three or more feedback positions. In this case, the haptic feedback determining unit 204, for example, may determine a touch position at which haptic feedback is to be provided with vibration indicated by a third haptic signal which differs from the first haptic signal and the second haptic signal to be a third feedback position. Then, the filter calculating unit 207 may calculate third filters, the filtering unit 209 may generate third driving signals, and the signal adding unit 210 may add together the first through third driving signals.

(Operation)

Figure 19:
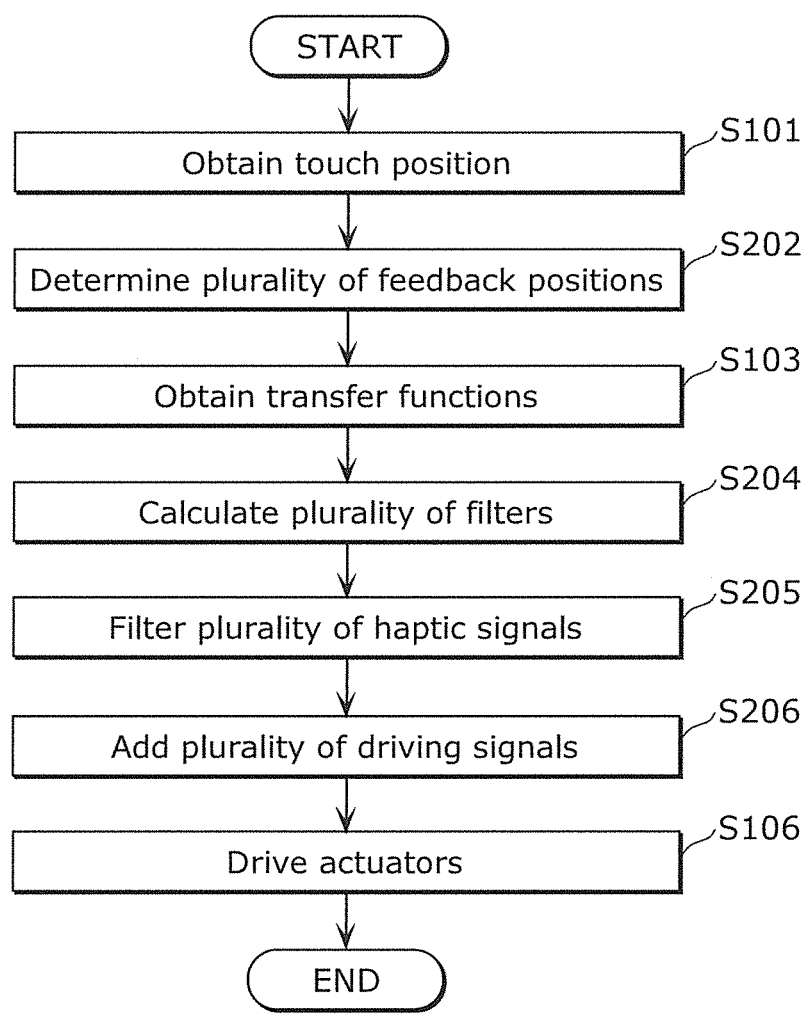
FIG. 19 is a flow chart showing operations performed by the haptic feedback device according to Embodiment 2.

Next, operations performed by each structural element of the haptic feedback device 200 having the above-described configuration will be described in detail. FIG. 19 is a flow chart showing operations performed by the haptic feedback device 200 according to Embodiment 2. It should be noted that in FIG. 19, the steps that are the same as those in FIG. 7 share the same reference numerals, and as such, explanations thereof are omitted.

(Step S202)

The haptic feedback determining unit 204 determines, from among a plurality of touch positions, a plurality of feedback positions at which to provide haptic feedback (S202). It should be noted that the method of determining the plurality of feedback positions are not particularly limited.

(Step S204)

The filter calculating unit 207 calculates filters for the feedback positions (S204). The details regarding the method of calculating the filters for the feedback positions is the same as Embodiment 1, and as such, detailed description thereof will be omitted.

(Step S205)

The filtering unit 209 generates a plurality of driving signals by filtering a plurality of haptic signals using the plurality of calculated filters (S205). More specifically, the filtering unit 209 generates driving signals $u_{ij}(n)$ for driving the actuators $A_j$ as Equation 12 shows. In other words, the filtering unit 209 generates the driving signals $u_{ij}(n)$ for providing haptic feedback at the touch position $P_i$ with vibration indicated in the haptic signals $s_i(n)$ by obtaining the convolution of the haptic signals $s_i(n)$ and the filters $h_{ij}(n)$.

[Math 12]

$$u_{ij}(n) = s_i(n) \otimes h_{ij}(n) = \Sigma s_i(n-k) h_{ij}(k) \quad (12)$$

(Step S206)

The signal adding unit 210 generates a combined driving signal for each of the actuators 102 by adding together a plurality of driving signals generated by the filtering unit 209. More specifically, the signal adding unit 210 generates a combined driving signal $u_j$ for each of the actuators $A_j$ by adding together the plurality of driving signals $u_{ij}$ for providing haptic feedback to the feedback positions, as Equation 13 shows.

[Math 13]

$$u_j(n) = \sum_{i=1}^{N} u_{ij}(n) \quad (13)$$

Figure 20:
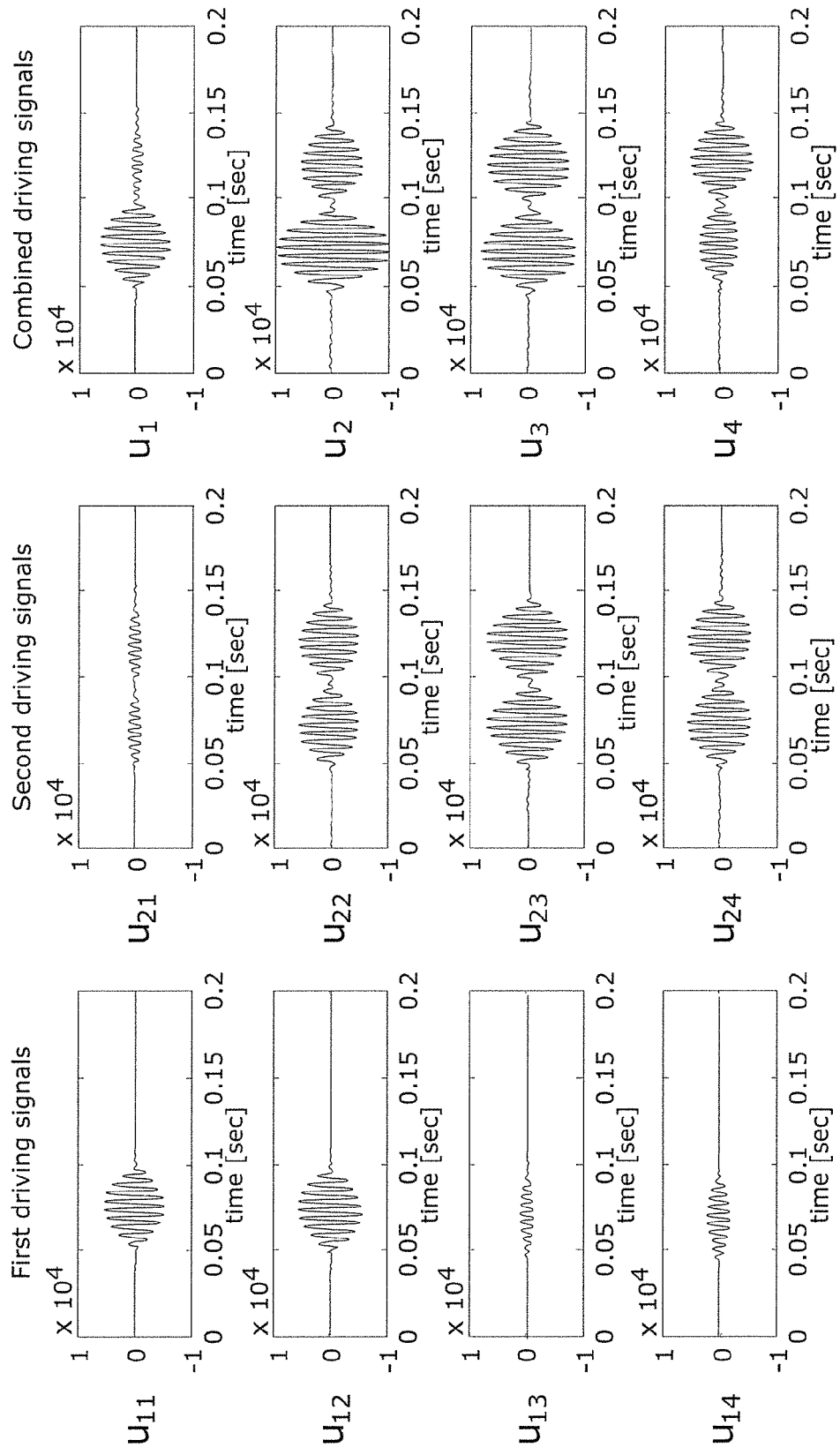
FIG. 20 shows examples of first driving signals, second driving signals, and combined driving signals.

FIG. 20 shows examples of first driving signals, second driving signals, and combined driving signals.

The first driving signals $u_{11}$ through $u_{14}$ are signals generated by the filtering unit 209 in accordance with Equation 12. When each actuator $A_1$ through $A_4$ is driven by these first driving signals $u_{11}$ through $u_{14}$, the panel 101 is vibrated at the touch position $P_1$ (the first feedback position) according to the first haptic signal shown in FIG. 6A and not vibrated at the touch position $P_2$ (the second feedback position).

The second driving signals $u_{21}$ through $u_{24}$ are signals generated by the filtering unit 209 in accordance with Equation 12. When each actuator $A_1$ through $A_4$ is driven by these second driving signals $u_{21}$ through $u_{24}$, the panel 101 is vibrated at the touch position $P_2$ (the second feedback position) according to the second haptic signal shown in FIG. 6B and not vibrated at the touch position $P_1$ (the first feedback position).

Moreover, the combined driving signals $u_1$ through $u_4$ are signals obtained by adding the first driving signals $u_{11}$ through $u_{14}$ and the second driving signals $u_{21}$ through $u_{24}$ together for the actuators $A_1$ through $A_4$. More specifically, the combined driving signals $u_1$ through $u_4$ are signals generated by the signal adding unit 210 in accordance with Equation 13.

Figure 21:
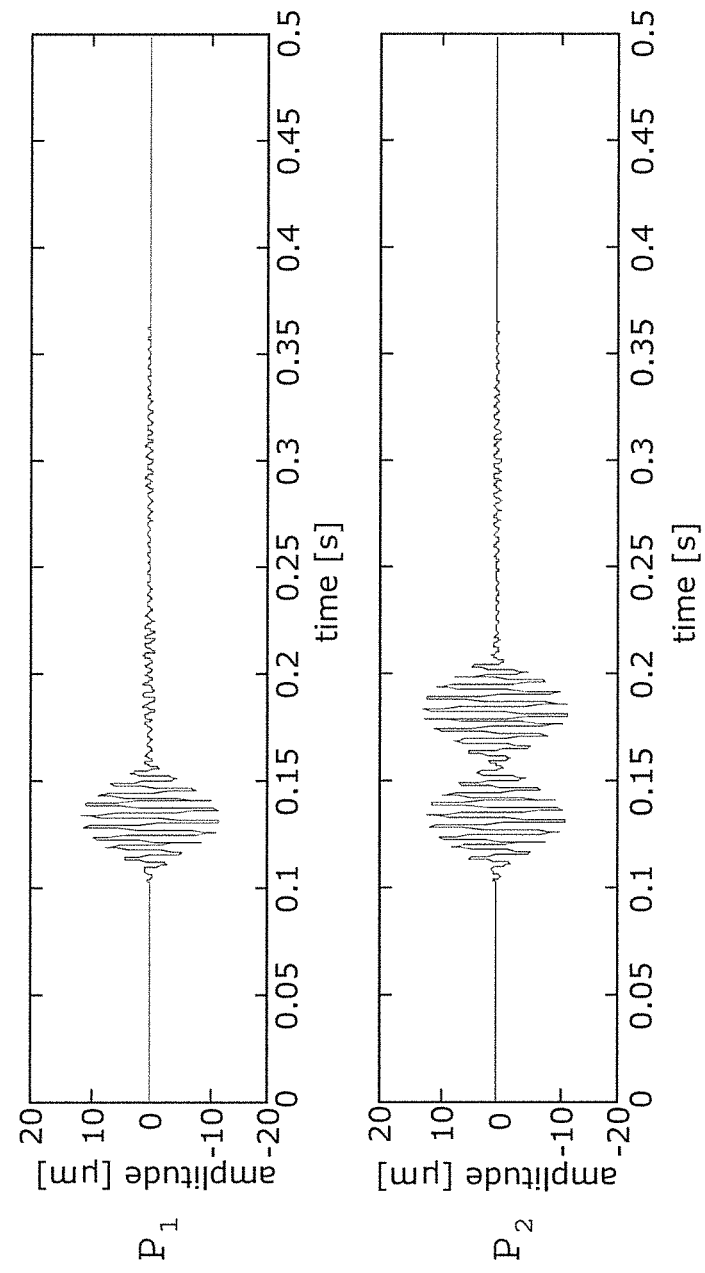
FIG. 21 shows an actual result of the vibration imparted on the panel at each touch position according to Embodiment 2.

FIG. 21 shows an actual result of the vibration imparted on the panel 101 at each touch position according to Embodiment 2. More specifically, FIG. 21 shows the results of measurements of vibrations imparted on the panel 101 at the touch positions $P_1$ and $P_2$ when the actuators $A_1$ through $A_4$ are driven according to the combined driving signals $u_1$ through $u_4$ shown in FIG. 20.

For the test shown in FIG. 21, a 180 mm×270 mm rectangular component was used for the panel 101. The touch position $P_1$ was a position 50 mm from the top and 50 mm from the left. The touch position $P_2$ was a position 50 mm from the top and 50 mm from the right. It should be noted that a laser Doppler vibrometer was used to measure the vibrations.

As FIG. 21 shows, when the actuators $A_1$ through $A_4$ were driven according to the combined driving signals $u_1$ through $u_4$, the panel 101 was vibrated at the touch position $P_1$ according to the first haptic signal shown in FIG. 6A, and vibrated at the touch position $P_2$ according to the second haptic signal shown in FIG. 6B. This actual result shows that mutually different vibrations are imparted at the touch position $P_1$ and the touch position $P_2$ by driving the actuators 102 based on the combined driving signals obtained by adding the first driving signals and the second driving signals. In other words, this actual result shows that haptic feedback is provided individually and concurrently at the touch position $P_1$ and the touch position $P_2$.

As described above, with the haptic feedback device 200 according to Embodiment 2, it is possible to provide mutually different haptic feedback for a plurality of touch positions. As such, the haptic feedback device 200 is capable of providing further suitable haptic feedback by providing distinguishable haptic feedback for multiple touches at the same time.

Embodiment 3

The haptic feedback device according to Embodiment 3 differs from the haptic feedback device according to Embodiment 1 in that it obtains filters from the filter storage unit when a feedback position is determined. In other words, in Embodiment 3, the processes up until the filter calculation are implemented offline, not online. Hereinafter Embodiment 3 will be described focusing on the points that differ from Embodiment 1.

(Device Configuration)

Figure 22:
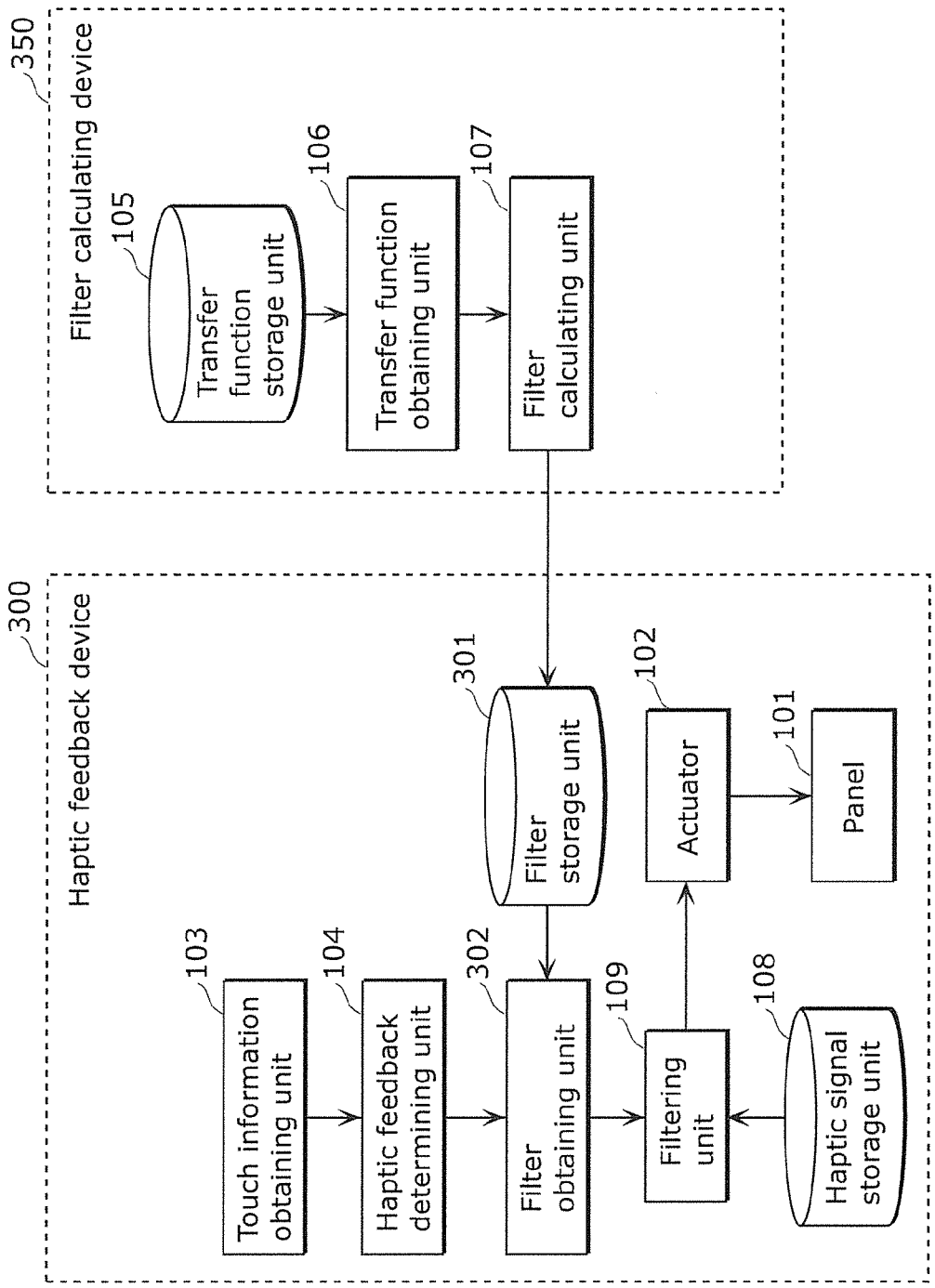
FIG. 22 is a block diagram showing the functional configuration of the haptic feedback device and the filter calculating device according to Embodiment 3.

FIG. 22 shows the functional configuration of a haptic feedback device 300 and a filter calculating device 350 according to Embodiment 3. It should be noted that in FIG. 22, the structural elements that are the same as those in FIG. 2 share the same reference numerals, and as such, explanations thereof are omitted.

The haptic feedback device 300 includes the panel 101, a plurality of the actuators 102, the touch information obtaining unit 103, the haptic feedback determining unit 104, a filter storage unit 301, a filter obtaining unit 302, the haptic signal storage unit 108, and the filtering unit 109. Moreover, the filter calculating device 350 includes the transfer function storage unit 105, the transfer function obtaining unit 106, and the filter calculating unit 107.

The filter calculating device 350 calculates filters for combinations of positions on the panel 101 and stores the calculated filters in the filter storage unit 301, offline. It should be noted that the filter calculating device 350 may be included in the haptic feedback device 300.

Offline refers to the performing of processes before a touch position is obtained by the touch information obtaining unit 103. Determining of the arrangement of the GUI before product shipment and prediction of a touch position from an operation made by the user immediately before are included in "before a touch position is obtained".

(Filter storage unit 301)

The filter storage unit 301 is, for example, a hard disk or semiconductor memory. The filter storage unit 301 stores a plurality of filters calculated by the filter calculating device 350, each of which are associated with a combination of touches on the panel. In other words, the filter storage unit 301 stores filters for filtering a given haptic signal to generate driving signals for driving the actuators 102 to, with respect to an arbitrary combination of a plurality of positions on the panel 101, vibrate the panel 101 at one position according to the given haptic signal, and not vibrate the panel 101 at any other position.

(Filter Obtaining Unit 302)

The filter obtaining unit 302 obtains filters from the filter storage unit 301 based on the combination of touch positions obtained by the touch information obtaining unit 103 and the feedback position determined by the haptic feedback determining unit 104. More specifically, the filter obtaining unit 302 obtains from the filter storage unit 301 filters corresponding to a combination of a feedback position and a non-feedback position.

(Operation)

Next, operations performed by each structural element of the filter calculating device 350 and the haptic feedback device 300 having the above-described configuration will be described in detail.

(Offline Processes)

Figure 23A:
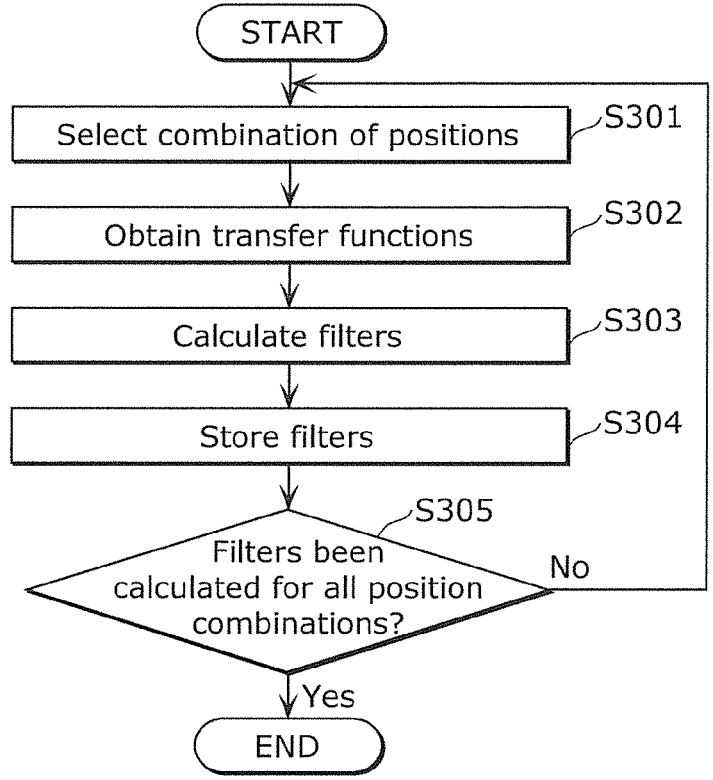
FIG. 23A is a flow chart showing operations performed by the filter calculating device according to Embodiment 3.

FIG. 23A is a flow chart showing operations performed by the filter calculating device 350 according to Embodiment 3.

First, a combination of positions including a plurality of given positions are selected from a plurality of predetermined positions on the panel 101 (S301). The transfer function obtaining unit 106 obtains transfer functions corresponding to the positions included in the selected combination from the transfer function storage unit 105 (S302).

Next, the filter calculating unit 107 calculates filters which filter a given haptic signal to generate driving signals for driving the actuators 102 to vibrate the panel 101 according to the given haptic signal at one position included in the selected combination and not vibrate the panel 101 at any other position (S303). Here, the filter calculating unit 107 calculates filters while changing the one position. It should be noted that the method of calculating the filters is the same as Embodiment 1, and as such, detailed description thereof will be omitted.

The filter calculating unit 107 stores filters calculated in this manner in the filter storage unit 301 (S304). Here, when filters have been calculated for all combinations of positions (yes in S305), the processing is completed. However, when filters have not yet been calculated for all combinations of positions (no in S305), processing returns to step S301.

(Online Processes)

Figure 23B:
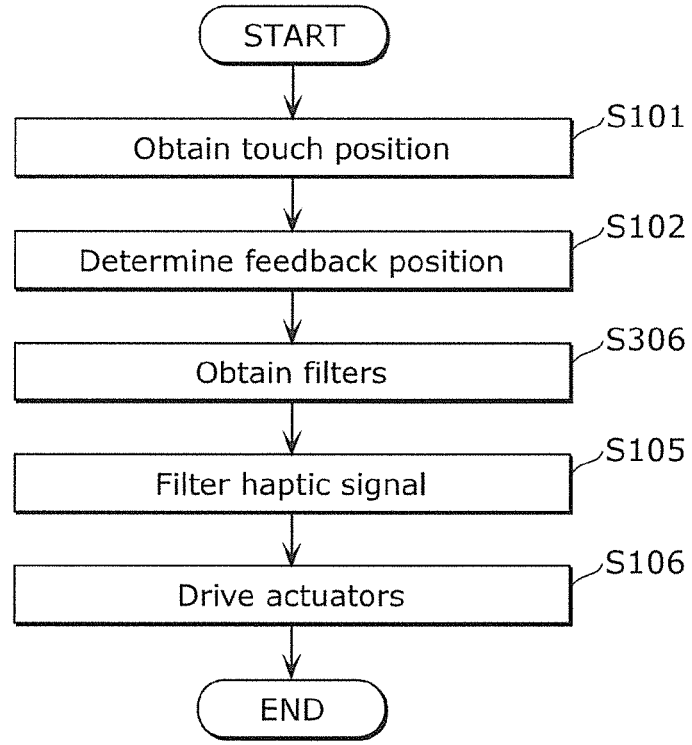
FIG. 23B is a flow chart showing operations performed by the haptic feedback device according to Embodiment 3.

FIG. 23B is a flow chart showing operations performed by the haptic feedback device 300 according to Embodiment 3. It should be noted that in FIG. 23B, the steps that are the same as those in FIG. 7 share the same reference numerals, and as such, explanations thereof are omitted.

The filter obtaining unit 302 obtains from the filter storage unit 301 filters corresponding to a combination of a feedback position and a non-feedback position determined in step S102 (S306). Next, step S105 and step S106 are performed.

As described above, the haptic feedback device 300 according to Embodiment 3 is capable of generating driving signals using filters stored in the filter storage unit 301. As such, it is possible to reduce the time between obtaining the touch position and providing haptic feedback, thereby reducing delays in haptic feedback. Furthermore, it is also possible to reduce the processing load for haptic feedback, meaning it is possible to suitably provide haptic feedback for multiple touches even in devices with low processing capability such as smart phones or tablet computers.

Moreover, a filter is valid for a given haptic signal. In other words, a filter is not dependent on a haptic signal. As such, since it is not required to store a filter for each haptic signal even when a plurality of haptic signals are used, it is possible to reduce the amount of required storage space compared to when driving signals are stored.

It should be noted that in Embodiment 3, the haptic feedback device 300 is provided with the filter storage unit 301 and the haptic signal storage unit 108, but provision of the filter storage unit 301 is not absolutely necessary. In the case that the filter storage unit 301 is not provided, the haptic feedback device 300 may, for example, obtain a filter from a storage apparatus connected over a network.

Embodiment 4

The haptic feedback device according to Embodiment 4 differs from the haptic feedback device according to Embodiment 1 in that when a feedback position is determined, it obtains driving signals for the actuators from a driving signal storage unit. In other words, in Embodiment 4, the processes up until the generation of the driving signals are implemented offline, not online. Hereinafter Embodiment 4 will be described focusing on the points that differ from Embodiment 1.

(Device Configuration)

Figure 24:
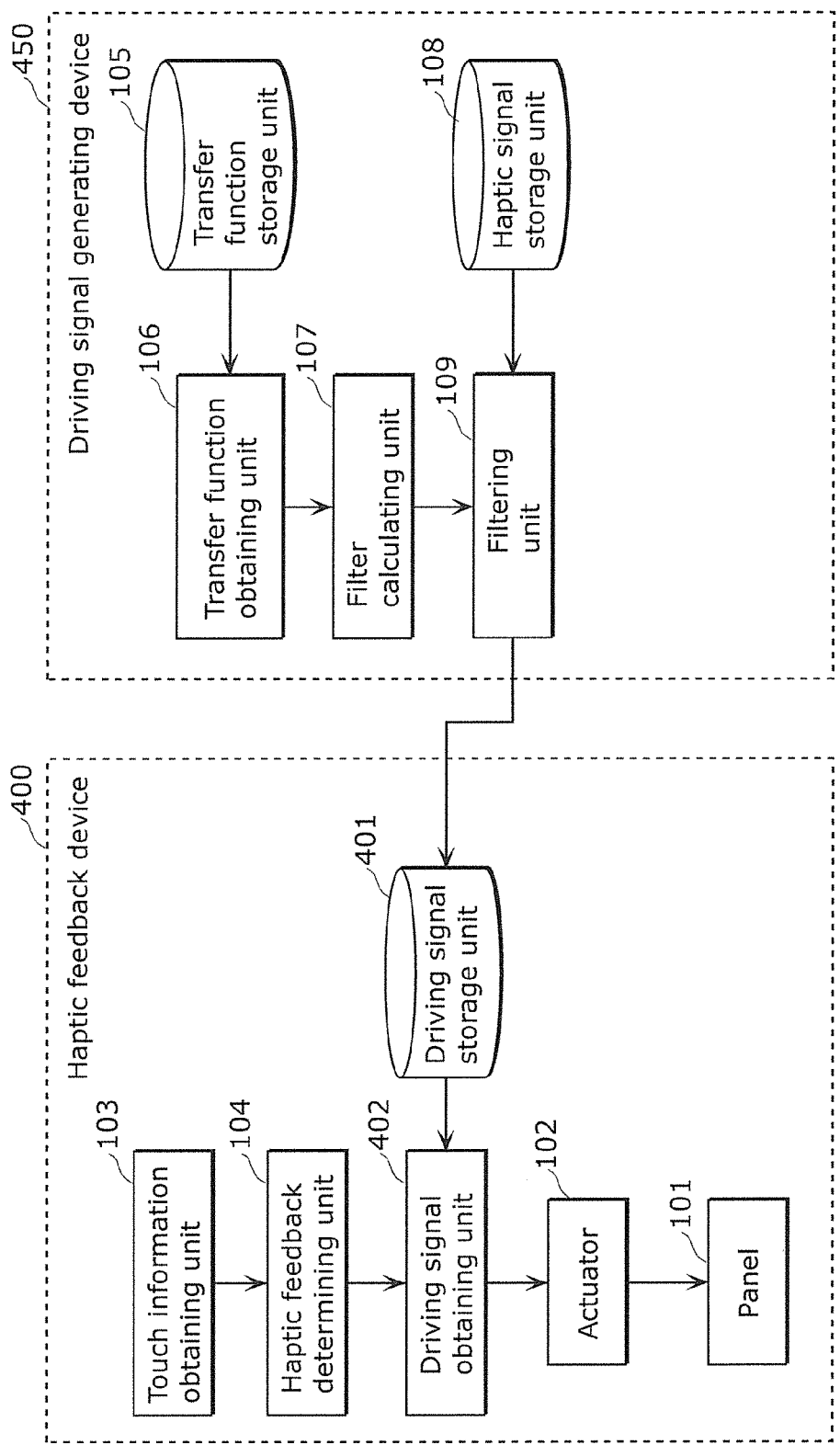
FIG. 24 is a block diagram showing the functional configuration of the haptic feedback device and the driving signal generating device according to Embodiment 4.

FIG. 24 shows the functional configuration of a haptic feedback device 400 and a driving signal generating device 450 according to Embodiment 4. It should be noted that in FIG. 24, the structural elements that are the same as those in FIG. 2 share the same reference numerals, and as such, explanations thereof are omitted.

The haptic feedback device 400 includes the panel 101, a plurality of the actuators 102, the touch information obtaining unit 103, the haptic feedback determining unit 104, a driving signal storage unit 401, and a driving signal obtaining unit 402. Moreover, the driving signal generating device 450 includes the transfer function storage unit 105, the transfer function obtaining unit 106, the filter calculating unit 107, the haptic signal storage unit 108, and the filtering unit 109.

The driving signal generating device 450 generates driving signals for combinations of positions on the panel 101 and stores the generated driving signals in the driving signal storage unit 401, offline. It should be noted that the driving signal generating device 450 may be included in the haptic feedback device 400.

(Driving Signal Storage Unit 401)

The driving signal storage unit 401 is, for example, a hard disk or semiconductor memory. The driving signal storage unit 401 stores a plurality of driving signals generated by the driving signal generating device 450, in association with combinations of positions on the panel. In other words, the driving signal storage unit 401 stores driving signals for driving the actuator 102 to, with respect to an arbitrary combination of a plurality of positions on the panel 101, vibrate the panel 101 at one position according to a given haptic signal, and not vibrate the panel 101 at any other position, wherein the driving signals are generated using transfer functions from the actuators 102 to the one position and the other positions.

(Driving Signal Obtaining Unit 402)

The driving signal obtaining unit 402 obtains driving signals from the driving signal storage unit 401 based on the combination of touch positions obtained by the touch information obtaining unit 103 and the feedback position determined by the haptic feedback determining unit 104. More specifically, the driving signal obtaining unit 402 obtains from the driving signal storage unit 401 driving signals corresponding to a feedback position and a non-feedback position.

It should be noted that when a plurality of types of haptic feedback are to be provided based on a plurality of haptic signals, the driving signal generating device 450 generates driving signals for the plurality of haptic signals and stores the generated driving signals in association with the haptic signals in the driving signal storage unit 401. Moreover, in this case, the driving signal obtaining unit 402 obtains from the driving signal storage unit 401 driving signals corresponding to a feedback position and a non-feedback position as well as to a haptic signal indicating a vibration at that feedback position.

(Operation)

Next, operations performed by each structural element of the driving signal generating device 450 and the haptic feedback device 400 having the above-described configuration will be described in detail.

(Offline Processes)

Figure 25A:
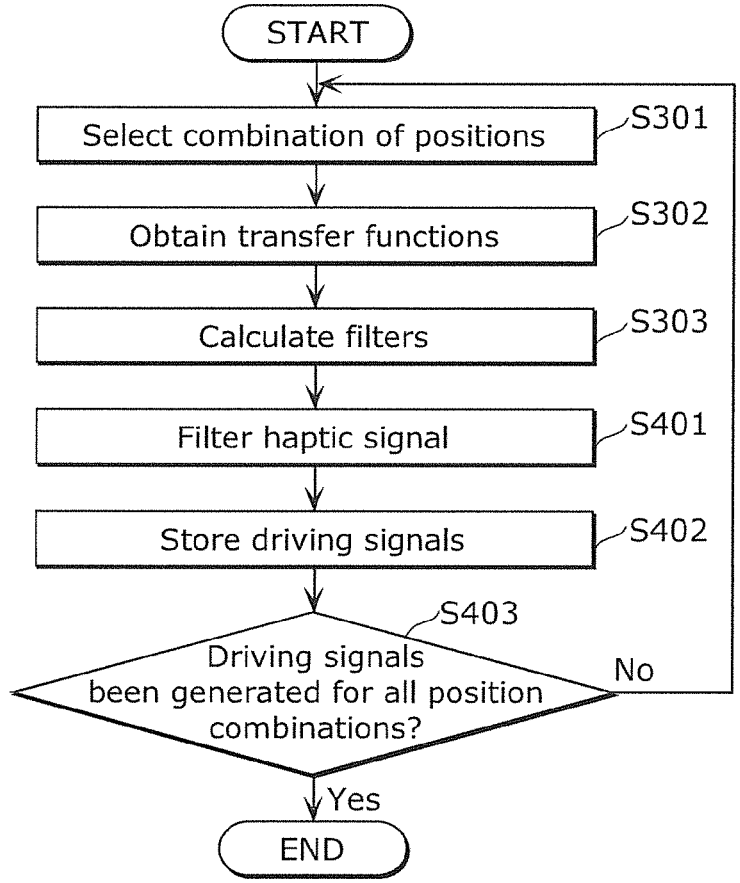
FIG. 25A is a flow chart showing operations performed by the driving signal generating device according to Embodiment 4.

FIG. 25A is a flow chart showing operations performed by the driving signal generating device 450 according to Embodiment 4. It should be noted that in FIG. 25A, the steps that are the same as those in FIG. 23A share the same reference numerals, and as such, explanations thereof are omitted.

The filtering unit 109 generates driving signals by filtering a haptic signal using the filters calculated in step S303 (S401).

It should be noted that the method of calculating the filters is the same as Embodiment 1, and as such, detailed description thereof will be omitted.

Next, the filtering unit 109 stores the generated driving signals in the driving signal storage unit 401 (S402). Here, when driving signals have been calculated for all combinations of positions (yes in S403), the processing is completed. However, when driving signals have not yet been calculated for all combinations of positions (no in S403), processing returns to step S301.

(Online Processes)

Figure 25B:
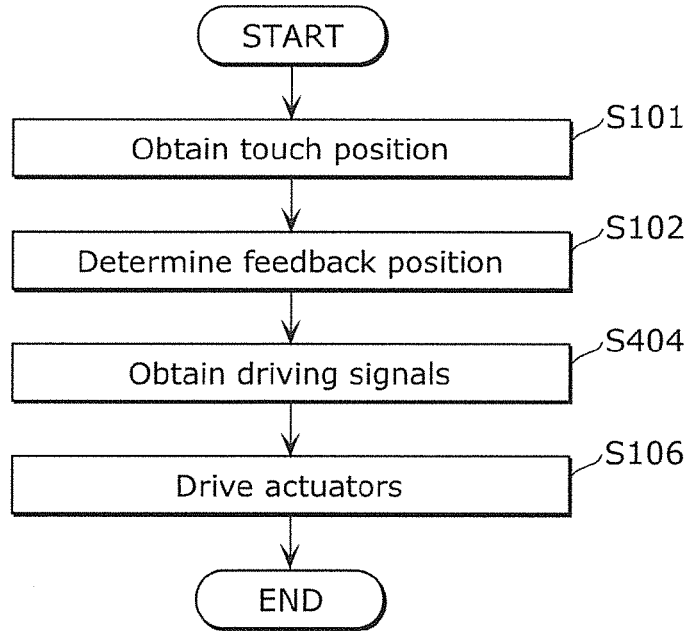
FIG. 25B is a flow chart showing operations performed by the haptic feedback device according to Embodiment 4.

FIG. 25B is a flow chart showing operations performed by the haptic feedback device 400 according to Embodiment 4. It should be noted that in FIG. 25B, the steps that are the same as those in FIG. 7 share the same reference numerals, and as such, explanations thereof are omitted.

The driving signal obtaining unit 402 obtains from the driving signal storage unit 401 driving signals each corresponding to a combination of a feedback position and a non-feedback position determined in step S102 (S404). Next, step S106 is performed.

As described above, the haptic feedback device 400 according to Embodiment 4 is capable of providing haptic feedback using driving signals stored in the driving signal storage unit 401. As such, it is possible to reduce the time between obtaining the touch position and providing haptic feedback, thereby reducing delays in haptic feedback. Furthermore, it is also possible to reduce the processing load for haptic feedback, meaning it is possible to suitably provide haptic feedback for multiple touches even in devices with low processing capability such as smart phones or tablet computers.

It should be noted that in Embodiment 4, the haptic feedback device 400 is provided with the driving signal storage unit 401, but provision of the driving signal storage unit 401 is not absolutely necessary. In the case that the driving signal storage unit 401 is not provided, the haptic feedback device 400 may, for example, obtain driving signals from a storage apparatus connected over a network.

Embodiment 5

In Embodiment 1, the filter calculating unit 107 calculates filters for providing haptic feedback to only one touch position among a plurality of touch positions. However, since the amount of arithmetic for calculating the filters is high, there are instances where filters cannot be calculated immediately.

In this case, the timing of the haptic feedback relative to the timing of the detection of the touch position is delayed. Consequently, when the touch position moves, there are instances when vibration is imparted at a different position than the current touch position.

For example, with the air hockey game shown in FIG. 14, the user is constantly moving the paddle. As such, there are instances where the touch position moves while the filter is still being calculated by the filter calculating unit. In this kind of situation, if haptic feedback is provided using the touch position as obtained by the touch information obtaining unit 103, a type of haptic feedback not intended to be provided is provided. In other words, there are times when haptic feedback cannot be provided based on the haptic signal at a touch position intended to be provided with haptic feedback. Moreover, there are times when haptic feedback is provided at touch positions where haptic feedback is not intended to be provided.

For these reasons, the haptic feedback device according to Embodiment 5 takes into consideration changes in touch position before the filter calculating unit 107 calculates the filters, estimates a touch position of a touch to be made a predetermined amount of time later, and determines the estimated touch position to be a feedback position. Hereinafter, the haptic feedback device according to Embodiment 5 is described with reference to the Drawings.

(Device Configuration)

FIG. 26 shows the functional configuration of a haptic feedback device 500 according to Embodiment 5. It should be noted that in FIG. 26, the structural elements that are the same as those in FIG. 2 share the same reference numerals, and as such, explanations thereof are omitted.

The haptic feedback device 500 includes the panel 101, a plurality of the actuators 102, the touch information obtaining unit 103, a touch position estimating unit 501, a haptic feedback determining unit 502, the transfer function storage unit 105, the transfer function obtaining unit 106, the filter calculating unit 107, the haptic signal storage unit 108, and the filtering unit 109.

(Touch Position Estimating Unit 501)

The touch position estimating unit 501 estimates, for each of the plurality of touch positions obtained by the touch information obtaining unit 103, a touch position of a touch to be made a predetermined amount of time later based on temporal changes in the corresponding touch position. In other words, the touch position estimating unit 501 predicts a plurality of touch positions of touches to be made a predetermined amount of time later.

The predetermined amount of time is, for example, predetermined based on the time required by the filter calculating unit 107 to calculate a filter. Moreover, for example, the predetermined amount of time may be predetermined based on an amount of time required by the filtering unit 109 to perform filtering in addition to the amount of time required by the filter calculating unit 107 to calculate the filter. Moreover, the predetermined amount of time may be predetermined based on the amount of time required between the obtainment of the touch position by the touch information obtaining unit 103 and the driving of the actuators 102.

More specifically, the touch position estimating unit 501, for example, estimates a touch position of a touch to be made a predetermined amount of time t1 later based on a coordinate series p(n) of touch positions made up to the current time. For example, when the time series of certain touch positions is expressed as P(n)=[x(n)y(n)], the touch position estimating unit 501 estimates future touch positions using linear prediction, as Equation 14 shows.

[Math 14]

$$\hat{x}(n) = -\sum_{i=1}^{p} a_i x(n-i) \quad (14)$$

$$\hat{y}(n) = -\sum_{i=1}^{p} b_i y(n-i)$$

In Equation 14, $a_i$ and $b_i$ represent linear prediction coefficients. Moreover, p represents the order of linear prediction.

More specifically, the touch position estimating unit 501 estimates a touch position of a touch to be made a predetermined amount of time t1 later using Equation 14 by estimating x(n+t1) and y(n+t1) to be made after the predetermined amount of time t1.

It should be noted that here, a method of estimating a touch position using linear prediction is described, but the method of estimating the touch position is not limited to this example. For example, the touch position may be estimated using a method such as a Kalman filter. Moreover, the touch position may be estimated by extrapolation in a line from the change in the touch position immediately before.

(Operation)

Figure 27:
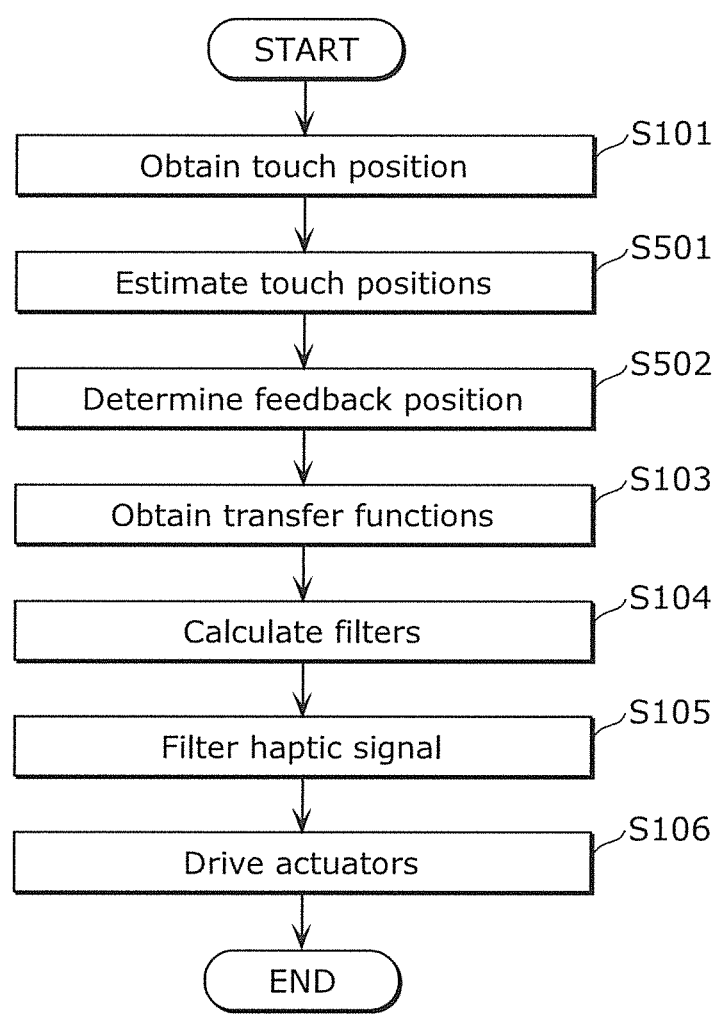
FIG. 27 is a flow chart showing operations performed by the haptic feedback device according to Embodiment 5.

Next, operations performed by each structural element of the haptic feedback device 500 having the above-described configuration will be described in detail. FIG. 27 is a flow chart showing operations performed by the haptic feedback device 500 according to Embodiment 5. It should be noted that in FIG. 27, the steps that are the same as those in FIG. 7 share the same reference numerals, and as such, explanations thereof are omitted.

He touch position estimating unit 501 estimates a touch position for each touch to be made a predetermined amount of time later based on temporal changes in the plurality of touch positions obtained in step S101 (S501). Next, the haptic feedback determining unit 502 determines a feedback position from among the plurality of touch positions estimated by the touch position estimating unit 501 (S502). It should be noted that the method of determining the feedback position is not particularly limited. For example, the method shown in Variation 2 of Embodiment 1 may be used.

As described above, with the haptic feedback device 500 according to Embodiment 5, it is possible to provide haptic feedback at an estimated touch positions. As such, even if the touch position moves during the time between obtaining the touch position and providing haptic feedback, the haptic feedback device 500 is capable of suitably providing haptic feedback.

Embodiment 6

The haptic feedback device according to Embodiment 6 is different from Embodiment 1 in that it directly calculates the driving signals from the transfer functions and the haptic signal, without calculating filters. Hereinafter Embodiment 6 will be described focusing on the points that differ from Embodiment 1.

(Device Configuration)

Figure 28:
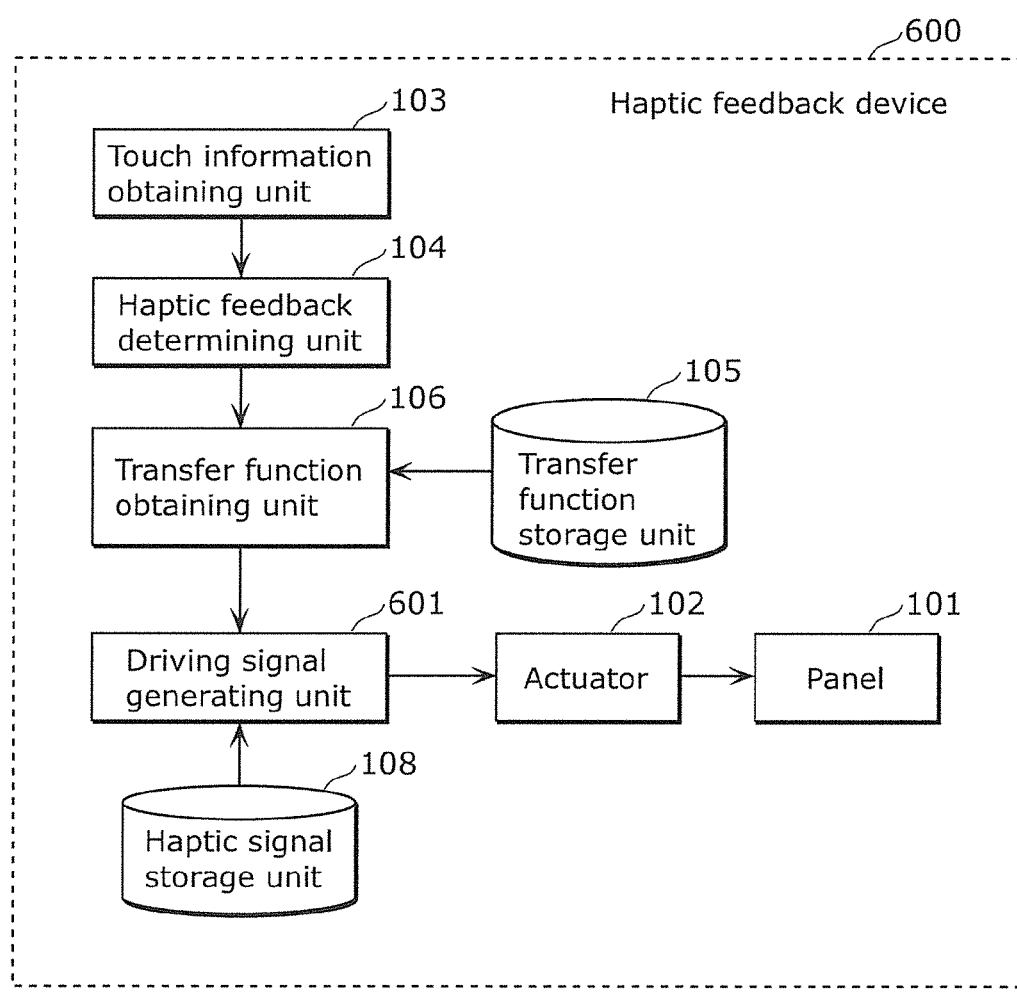
FIG. 28 is a block diagram showing the functional configuration of the haptic feedback device according to Embodiment 6.

FIG. 28 shows the functional configuration of a haptic feedback device 600 according to Embodiment 6. It should be noted that in FIG. 28, the structural elements that are the same as those in FIG. 2 share the same reference numerals, and as such, explanations thereof are omitted.

The haptic feedback device 600 includes the panel 101, a plurality of the actuators 102, the touch information obtaining unit 103, the haptic feedback determining unit 104, the transfer function storage unit 105, the transfer function obtaining unit 106, the haptic signal storage unit 108, and a driving signal generating unit 601.

(Driving Signal Generating unit 601)

The driving signal generating unit 601 is an example of the driving signal obtaining unit. The driving signal generating unit 601 generates driving signals based on transfer functions from the actuators 102 to the feedback position and the non-feedback position. More specifically, using transfer functions obtained by the transfer function obtaining unit 106, the driving signal generating unit 601 generates driving signals for driving the actuators 102 to provide haptic feedback at the feedback position determined by the haptic feedback determining unit 104 and refrain from providing haptic feedback at non-feedback positions.

(Operation)

Figure 29:
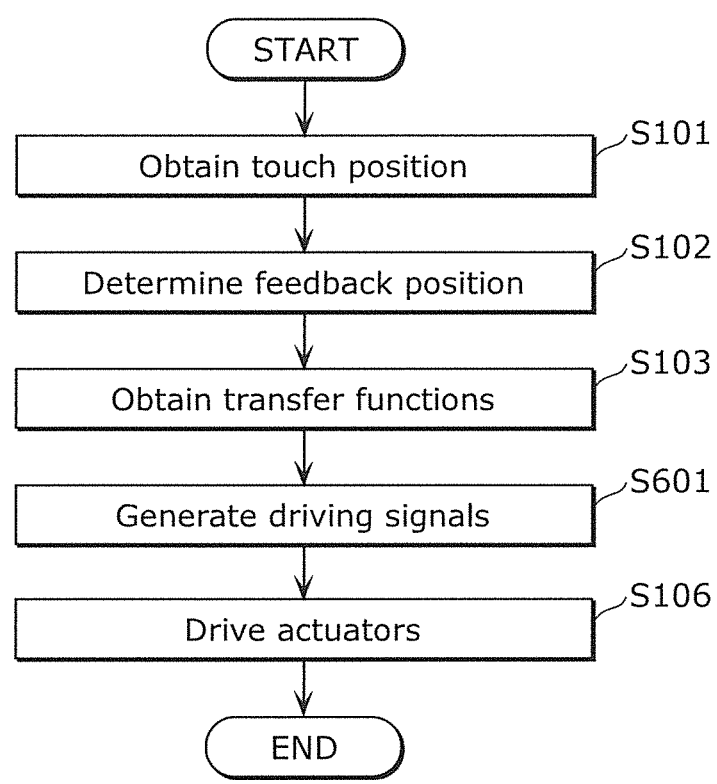
FIG. 29 is a flow chart showing operations performed by the haptic feedback device according to Embodiment 6.

Next, operations performed by each structural element of the haptic feedback device 600 having the above-described configuration will be described in detail. FIG. 29 is a flow chart showing operations performed by the haptic feedback device 600 according to Embodiment 6. It should be noted that in FIG. 29, the steps that are the same as those in FIG. 7 share the same reference numerals, and as such, explanations thereof are omitted.

The driving signal generating unit 601 generates driving signals based on transfer functions from the actuators 102 to the each of the feedback and non-feedback positions determined in step S102 (S601).

Hereinafter a more detailed example of a method of generating the driving signals will be given.

Here, similar to Embodiment 1, transfer function (impulse response) $g_{ij}$ from the actuator $A_j$ to the touch position $P_i$ is represented as Equation 15 shows. Moreover, the driving signal (input) $u_j$ for the actuator $A_j$ is expressed as Equation 16 shows. Moreover, the response (output) $d_i$ at the touch position $P_i$ relative to the input to all actuators $A_1$ through $A_M$ is represented as Equation 17 shows.

[Math 15]

$$g_{ij} = [g_{ij}(0) g_{ij}(1) \ldots g_{ij}(L_g)]^T \quad (15)$$

[Math 16]

$$u_j = [u_j(0) u_j(1) \ldots u_j(L)]^T \quad (16)$$

[Math 17]

$$d_i = [d_i(0) d_i(1) \ldots d_i(L_g+L)]^T \quad (17)$$

Here, the relationships between the inputs $u_1$ through $u_M$ to the actuators $A_1$ through $A_M$ and the response $d_i$ at one touch position $P_i$ will be considered. The response at one touch position $P_i$ relative to the input $u_j$ to one actuator $A_j$ is calculated using the convolution of the input $u_j$ and the transfer function $g_{ij}$. It is possible to calculate the response $d_i$ at one touch position $P_i$ relative to the inputs $u_1$ through $u_M$ to all of the actuators $A_1$ through $A_M$ by overlapping the response at one touch position $P_i$ relative to the input to one actuator $A_j$ across all of the actuators $A_1$ through $A_M$. In other words, the response $d_i$ can be expressed as Equation 18 shows using an input $u_j$ and a transfer function $g_{ij}$.

[Math 18]

$$D = GU \quad (18)$$

$$D = \begin{bmatrix} d_1(0) \\ d_1(1) \\ \vdots \\ \hline \vdots \\ \hline d_N(0) \\ d_N(1) \\ \vdots \end{bmatrix}$$

$$G = \begin{bmatrix} G_{11} & G_{12} & \ldots & G_{1M} \\ G_{21} & G_{22} & \ldots & G_{2M} \\ \vdots & \vdots & \ddots & \vdots \\ G_{N1} & G_{N2} & \ldots & G_{NM} \end{bmatrix}$$

-continued $$G_{ij} = \begin{bmatrix} g_{ij}(0) & 0 & \cdots & 0 & 0 \\ g_{ij}(1) & g_{ij}(0) & \cdots & 0 & 0 \\ g_{ij}(2) & g_{ij}(1) & \cdots & 0 & 0 \\ \vdots & \vdots & \ddots & \vdots & \vdots \\ g_{ij}(L_g) & g_{ij}(L_g-1) & \cdots & g_{ij}(0) & 0 \\ 0 & g_{ij}(L_g) & \cdots & g_{ij}(1) & g_{ij}(0) \\ \vdots & \vdots & \ddots & \vdots & \vdots \\ 0 & 0 & \cdots & 0 & g_{ij}(L_g) \end{bmatrix}$$

$$U = \begin{bmatrix} u_1(0) \\ u_1(1) \\ \vdots \\ \hline \vdots \\ \hline u_M(0) \\ u_M(1) \\ \vdots \end{bmatrix}$$

As Equation 18 shows, the responses $d_1$ through $d_N$ at the touch positions $P_1$ through $P_N$ relative to the inputs $u_1$ through $u_M$ to the actuators $A_1$ through $A_M$ are expressed as the sum of the convolutions of the transfer function $g_{ij}$ from each actuator $A_j$ to each touch position $P_i$ and the input $u_j$.

Here, if an input $u_j$ can be calculated so that only the response $d_k$ at the touch position $P_k$ (0<k≤N) among the plurality of touch positions $P_1$ through $P_N$ becomes a haptic signal, and the responses at all other touch positions $P_l$ (0<l≤N, l≠k) become zero ($d_l(0)=0$, $d_l(1)=0$, $d_l(2)=0$, ..., $d_l(M)=0$), it is possible to generate a driving signal for each of the actuators.

As such, the driving signal generating unit 601 generates driving signals so that the sum of convolution results, in the time domain, of the transfer functions from the actuators 102 to the feedback position and the driving signals indicates the haptic signal, and the sum of convolution results, in the time domain, of the transfer functions from the actuators 102 to the non-feedback position and the driving signals indicates zero.

The method of calculating the above-described driving signal (input $u_j$) is not particularly limited to a given method, but the filter can be calculated by calculating the generalized inverse matrix G* of G, as Equation 19 shows. In other words, it is possible to calculate U, which represents a driving signal, from D, which indicates a haptic signal, and the generalized inverse matrix G* of G.

[Math 19]

$$U = G^*D \tag{19}$$

Typically, it is possible to solve Equation 19 if the number of actuators (M) is greater than or equal to the number of touch positions (N).

By driving the plurality of actuators 102 according to the driving signals U obtained in this manner, the haptic feedback device 600 is capable of vibrating the panel 101 at a feedback position based on the haptic signal, and causing the panel 101 to not vibrate at a non-feedback position.

For example, as previously described, when the haptic signal shown in FIG. 6A is set as response $d_1$ and the haptic signal shown in FIG. 6B is set as response $d_2$, the driving signals calculated based on Equation 19 are the same as the combined driving signals shown in FIG. 20. The vibrations shown in FIG. 21 are imparted at the touch positions $P_1$ and $P_2$ by driving the actuators 102 using the driving signals calculated in this manner. In other words, mutually different haptic feedback is provided at the touch positions $P_1$ and $P_2$.

In other words, the driving signal generating unit 601 may generate the driving signals so that the sum of convolution results, in the time domain, of the transfer functions from the actuators 102 to the first feedback position and the driving signals indicates the first haptic signal, and the sum of convolution results, in the time domain, of the transfer functions from the actuators 102 to the second feedback position and the driving signals indicates the second haptic signal.

As described above, even if filters are not calculated, the haptic feedback device 600 according to Embodiment 6 is capable of directly generating driving signals using haptic signals and transfer functions. In other words, the haptic feedback device 600 is capable of reducing processing load.

It should be noted that the driving signal generating unit 601 is not necessarily required to generate the driving signals in the time domain. In other words, the driving signal generating unit 601 may generate the driving signals in the frequency domain, similar to Variation 1 of Embodiment 1.

More specifically, the driving signal generating unit 601 may generate the driving signals so that the sum of the products, in the frequency domain, of the transfer functions from the actuators 102 to the feedback position and the driving signals indicates the haptic signal, and the sum of the products, in the frequency domain, of the transfer functions from the actuators 102 to the non-feedback position and the driving signals indicates zero. Moreover, the driving signal generating unit 601 may generate the driving signals so that the sum of products, in the frequency domain, of the transfer functions from the actuators 102 to the first feedback position and the driving signals indicates the first haptic signal, and the sum of the products, in the frequency domain, of the transfer functions from the actuators 102 to the second feedback position and the driving signals indicates the second haptic signal.

Embodiment 7

The haptic feedback device according to Embodiment 7 is different from the haptic feedback device according to Embodiment 1 in that it can strongly vibrate the panel at a touch position (feedback position) by controlling the vibration of the panel at a control position near the touch position based on the haptic signal. Hereinafter the haptic feedback device according to Embodiment 7 will be described focusing on the points that differ from Embodiment 1.

(Device Configuration)

Figure 30:
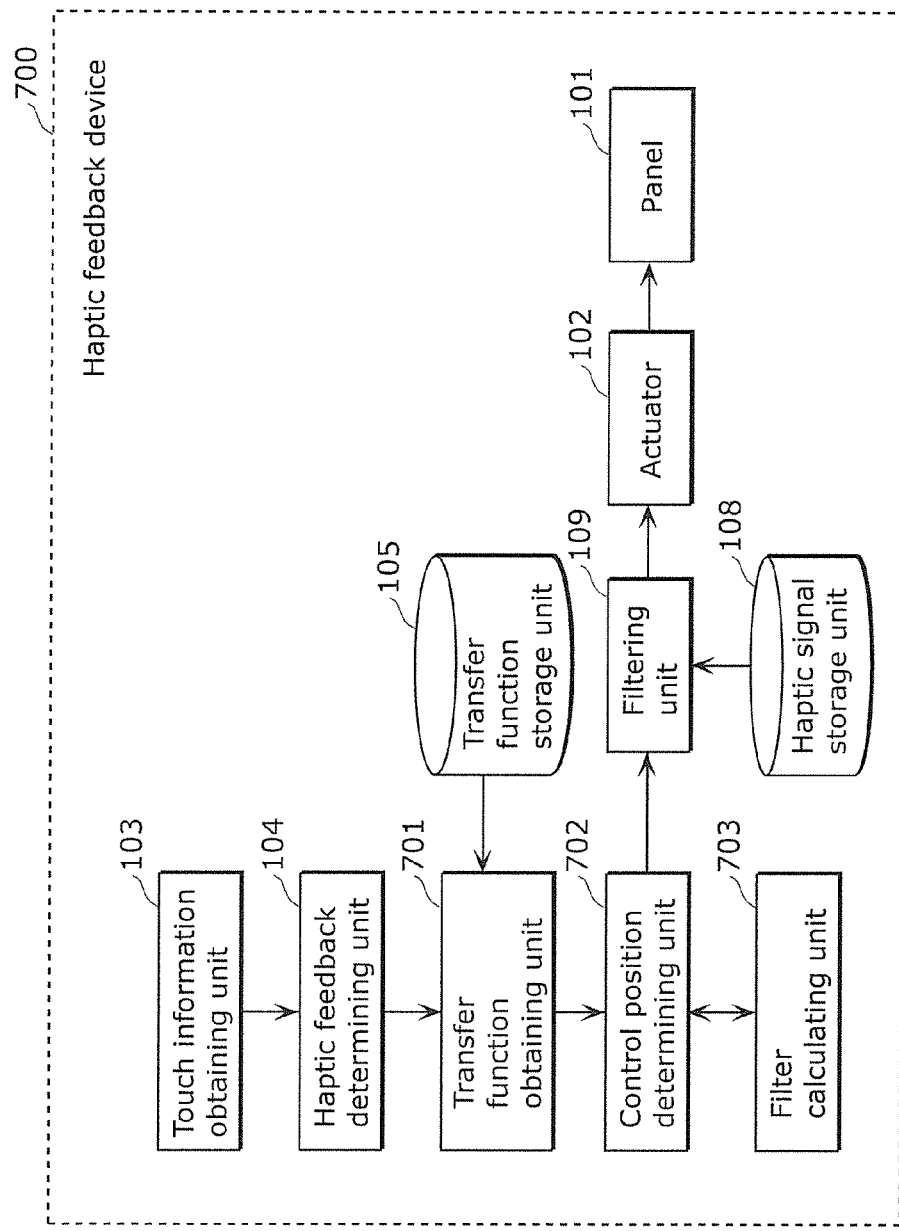
FIG. 30 is a block diagram showing the functional configuration of the haptic feedback device according to Embodiment 7.

FIG. 30 shows the functional configuration of a haptic feedback device 700 according to Embodiment 7. It should be noted that in FIG. 30, the structural elements that are the same as those in FIG. 2 share the same reference numerals, and as such, explanations thereof are omitted.

As FIG. 30 shows, the haptic feedback device 700 includes the panel 101, a plurality of the actuators 102, the touch information obtaining unit 103, the haptic feedback determining unit 104, the transfer function storage unit 105, a transfer function obtaining unit 701, a control position determining unit 702, a filter calculating unit 703, the haptic signal storage unit 108 and the filtering unit 109.

(Transfer Function Obtaining Unit 701)

The transfer function obtaining unit 701 obtains from the transfer function storage unit 105 the transfer functions from the actuators 102 to the first control position and the transfer functions from the actuators 102 to the second control position. The first control position is the first touch position or is a position in the vicinity of the first touch position. More specifically, the first control position is a position in an area having a predetermined range and including the first touch position (hereinafter referred to as the first region). Moreover, the second control position is the second touch position or is a position in the vicinity of the second touch position. More specifically, the second control position is a position in an area having a predetermined range and including the second touch position (hereinafter referred to as the second region).

The transfer function obtaining unit 701, for example, obtains transfer functions from the actuators 102 to a plurality of first candidate positions, which are candidates for the first control position in the first region. Moreover, the transfer function obtaining unit 701, for example, obtains transfer functions from the actuators 102 to a plurality of second candidate positions, which are candidates for the second control position in the second region.

(Control Position Determining Unit 702)

The control position determining unit 702 determines the first control position from within the first region. Furthermore, the control position determining unit 702 determines the second control position from within the second region.

More specifically, the control position determining unit 702 may determine, for example, the second touch position to be the second control position. Furthermore, the control position determining unit 702, for example, may calculate, for each of a plurality of first candidate positions in the first region, a vibration strength at the first touch position upon the plurality of actuators 102 being driven by driving signals generated using transfer functions from the plurality of actuators 102 to the first candidate position and transfer functions from the plurality of actuators 102 to the second control position, and determine the first control position to be one of the plurality of first candidate positions yielding a vibration strength that is greater than or equal to a predetermined vibration strength.

The vibration strength is a value indicating a magnitude of oscillation. For example, the vibration strength may be a value indicating a magnitude of amplitude. Moreover, for example, the vibration strength may be a value indicating a magnitude of a relative amplitude with respect to the magnitude of a reference amplitude.

(Filter Calculating Unit 703)

The filter calculating unit 703 calculates filters for filtering a given haptic signal to generate driving signals for driving the actuators 102 to vibrate the panel 101 at the first control position according to the given haptic signal and vibrate the panel 101 at the second control position more with a vibration weaker than the vibration at the first control position. More specifically, the filter calculating unit 703, for example, calculates filters by replacing the first touch position and the second touch position with the first control position and the second control position in the filter calculation method according to Embodiment 1.

(Operation)

Figure 31:
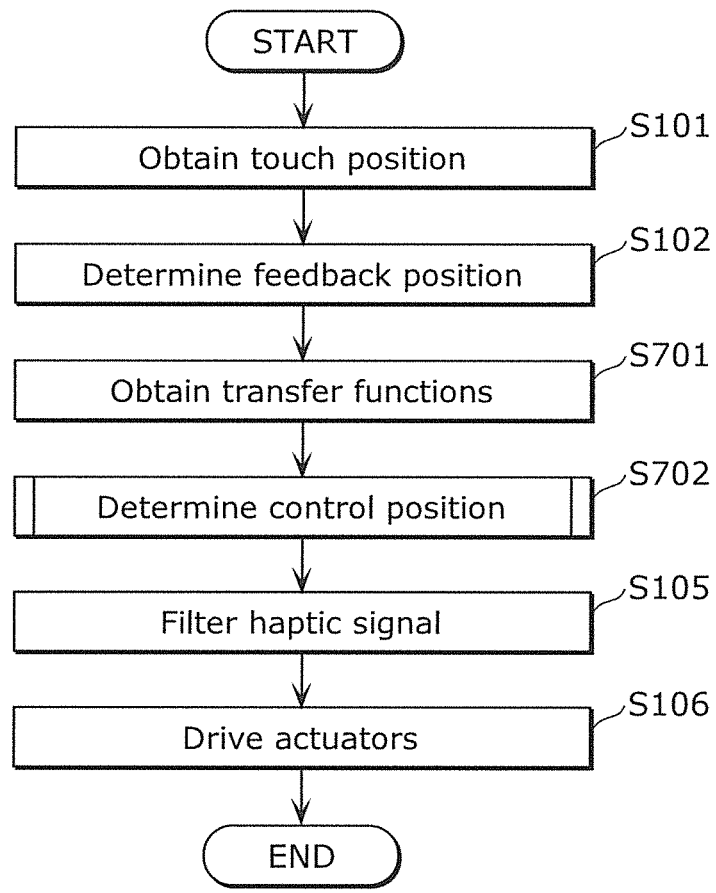
FIG. 31 is a flow chart showing operations performed by the haptic feedback device according to Embodiment 7.

Next, operations performed by the haptic feedback device 700 having the above-described configuration will be described in detail. FIG. 31 is a flow chart showing operations performed by the haptic feedback device 700 according to Embodiment 7. It should be noted that in FIG. 31, the steps that are the same as those in FIG. 7 share the same reference numerals, and as such, explanations thereof are omitted. In the subsequent description, it is assumed that the second control position is the second touch position.

The transfer function obtaining unit 701 obtains the transfer functions from the actuators 102 to the first candidate position and the transfer functions from the actuators 102 to the second control position (the second touch position) (S701).

Figure 33:
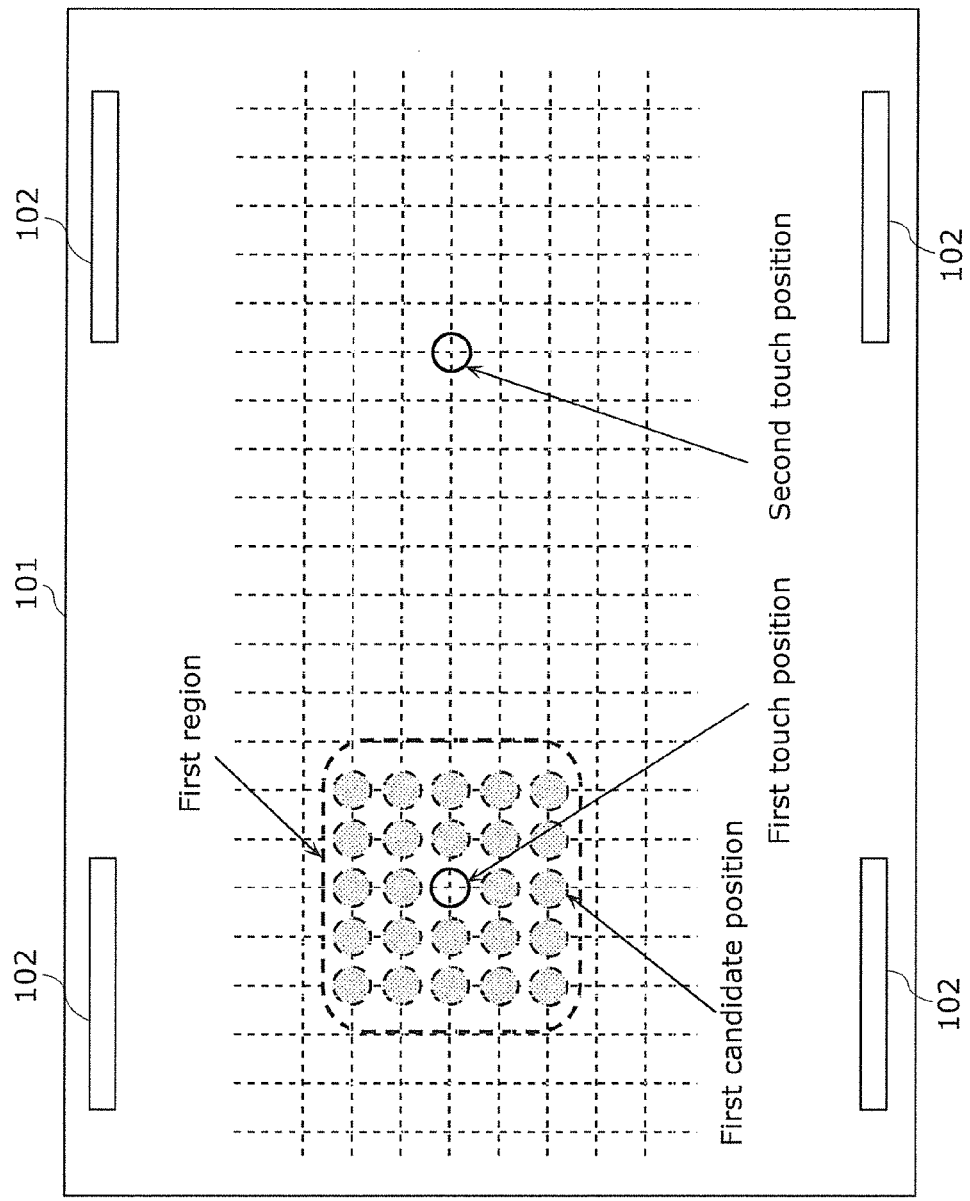
FIG. 33 shows an example of a plurality of the first candidate positions according to Embodiment 7.

FIG. 33 shows an example of a plurality of the first candidate positions. Positions in the vicinity of the first touch position, for example, are used as the plurality of first candidate positions, as FIG. 33 shows. In other words, a plurality of positions in the first region having a predetermined range and including the first touch position are used as the plurality of first candidate positions. It should be noted that, for example, positions having a distance from the first touch position that is within a predetermined threshold may be used as the first candidate positions. Moreover, for example, positions within a rectangular region of a predetermined size centered on the first touch position may be used as the first candidate positions.

Next, the control position determining unit 702 determines the first control position from among the plurality of first candidate positions (S702). More specifically, the control position determining unit 702 determines the first control position as FIG. 32 shows.

Figure 32:
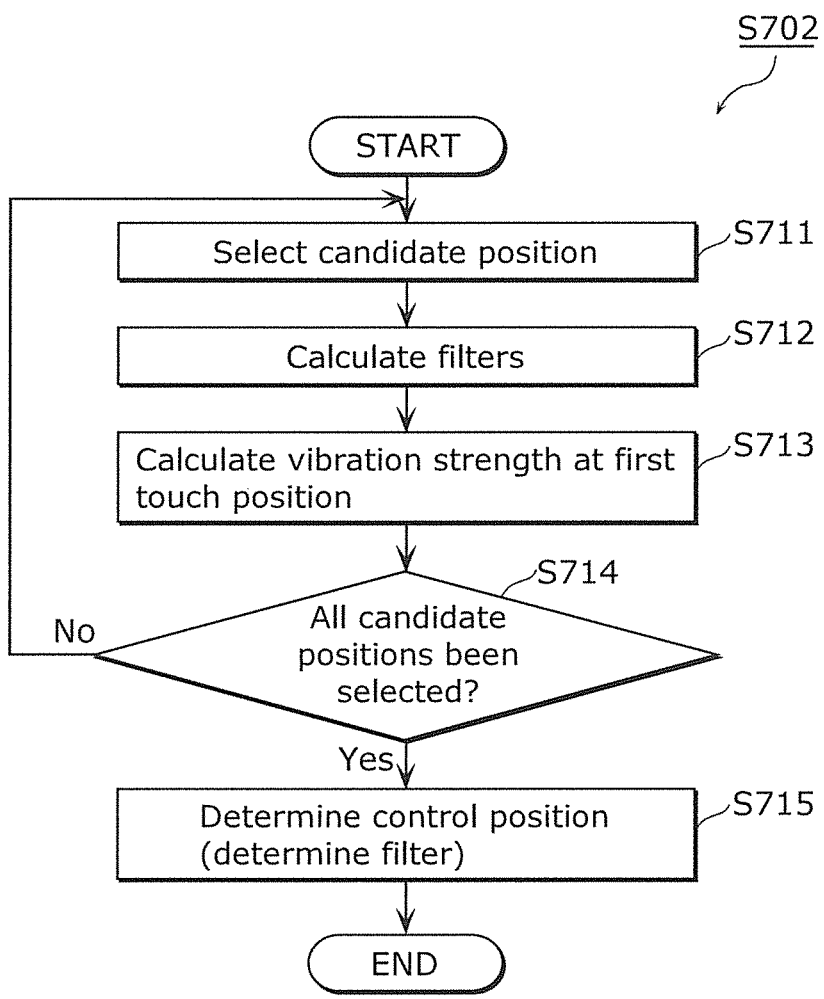
FIG. 32 is a flow chart showing operations performed by the control position determining unit and the filter calculating unit according to Embodiment 7.

FIG. 32 is a flow chart showing operations performed by the control position determining unit 702 and the filter calculating unit 703 according to Embodiment 7. Moreover, FIG. 33 shows an example of a plurality of the first candidate positions according to Embodiment 7. It should be noted that hereinafter, i indicates actuator, j indicates the first touch position, and k indicates the first candidate position.

The control position determining unit 702 selects one first candidate position from the plurality of first candidate positions that has not yet been selected (S711). More specifically, the control position determining unit 702 selects, from among the plurality of first candidate positions within the first region shown in FIG. 33, one first candidate position according to a predetermined order.

Next, using the method shown in Embodiment 1, the filter calculating unit 703 calculates filters $H_i^k(\omega)$ using transfer functions from the actuators 102 to the selected first candidate position and transfer functions from the actuators 102 to the second control position (the second touch position) (S712).

Next, the control position determining unit 702 calculates the vibration strength at the first touch position when the actuators 102 are to be driven by driving signals generated using the calculated filters (S713).

More specifically, the control position determining unit 702, for example, calculates the vibration strength at the first touch position using the frequency $\omega_0$ of the haptic signal, the calculated filter, and the transfer functions $G_{ij}$ of the panel 101 from the actuators 102 to the selected first candidate position. Even more specifically, the control position determining unit 702, for example, calculates the vibration strength $A_k$ at the first touch position as Equation 20 shows.

[Math 20]

$$A_k = \left| \sum_i G_{i,j} \cdot H_i^k(\omega_0) \right| \qquad (20)$$

Here, $H_i^k(\omega)$ indicates a filter corresponding to the first candidate position (k) and the actuator (i). Moreover, $G_{ij}$ indicates a transfer function from the actuator (i) to the first touch position (j).

Moreover, for example, without limiting to a specific frequency, the control position determining unit 702 may select a frequency at which the filter gain is the smallest from among given frequencies. Then, the control position determining unit 702 may calculate the vibration strength at the first touch position using the selected frequency. In this case, the control position determining unit 702 calculates the vibration strength according to Equation 21 and Equation 22.

[Math 21]

$$\hat{\omega} = \underset{\omega}{\operatorname{argmin}}(|H_i^k(\omega)|) \quad (21)$$

[Math 22]

$$A_k = \left| \sum_i G_{i,j} \cdot H_i^k(\hat{\omega}) \right| \quad (22)$$

In other words, the control position determining unit 702 first determines a frequency at which the filter gain is the smallest using Equation 21. The control position determining unit 702 then calculates the vibration strength $A_k$ at the first touch position using a filter coefficient at the determined frequency, as Equation 22 shows.

Next, the control position determining unit 702 determines whether all first candidate positions have been selected in step S711 or not (S714). In other words, the control position determining unit 702 determines whether the vibration strength $A_k$ for all first candidate positions has been calculated or not. Here, when not all first candidate positions have been selected (no in S714), the processing returns to step S711.

On the other hand, when all first candidate positions have been selected (yes in S714), the control position determining unit 702, as Equation 23 shows, determines the first candidate position yielding the strongest vibration strength from among the plurality of vibration strengths calculated in step S714 to be the first control position (S715). The control position determining unit 702 then determines a filter corresponding to the determined first control position to be the filter to be used for the filtering performed in step S105.

[Math 23]

$$\hat{k} = \underset{k}{\operatorname{argmax}} A_k \quad (23)$$

It should be noted that the control position determining unit 702 is not required to determine the first candidate position yielding the greatest vibration strength to be the first control position. For example, the control position determining unit 702 may determine the first candidate position yielding a vibration strength greater than a predetermined vibration strength to be the first control position. In this case, when a vibration strength that is greater than a predetermined vibration strength is calculated, the control position determining unit 702 may forcefully end the loop processing from step S711 to step S714, and perform step S715.

Figure 34:
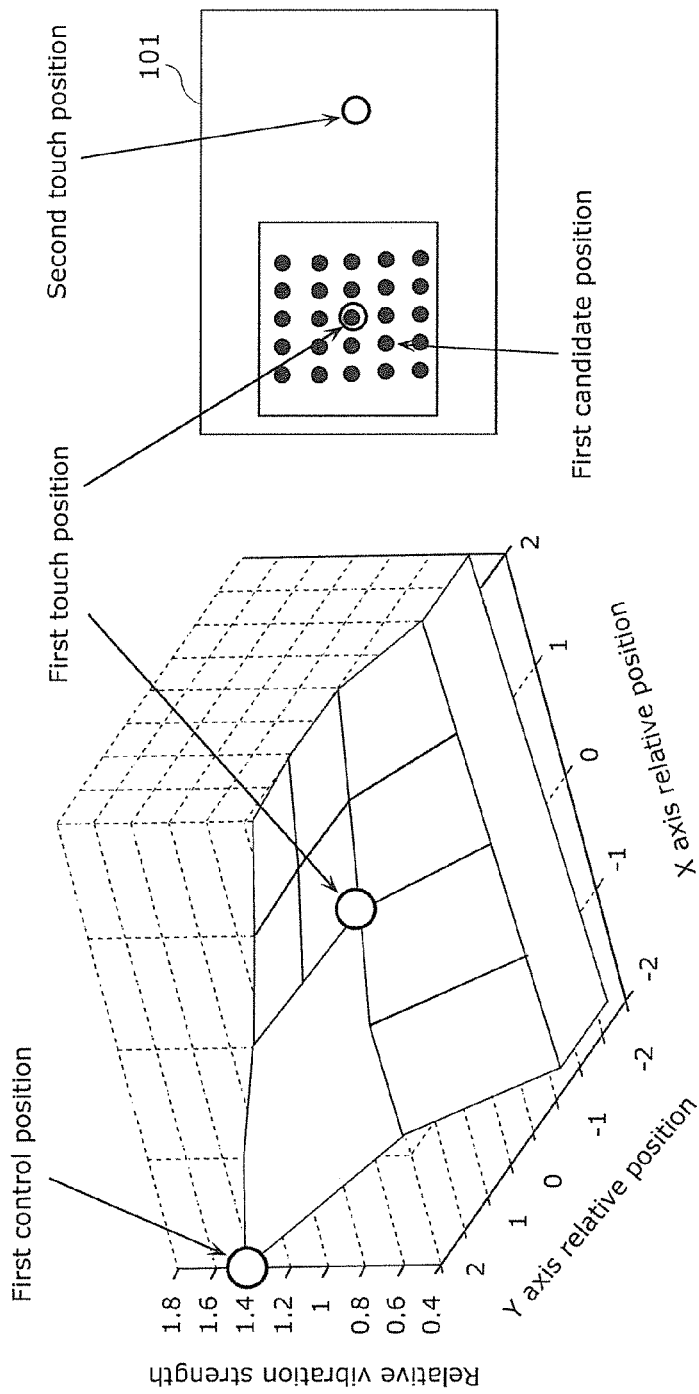
FIG. 34 shows a simulation result of the vibration strength at the first touch position corresponding to each of the first candidate positions according to Embodiment 7.

FIG. 34 shows a simulation result of the vibration strength at the first touch position corresponding to each of the first candidate positions according to Embodiment 7. More specifically, FIG. 34 shows the relative vibration strength at the first touch position when the actuators 102 are driven according to the driving signals generated using the first candidate positions in the vicinity of the first touch position.

Here, relative vibration strength is a ratio of the amplitude at the first touch position corresponding to the first candidate position relative to the amplitude at the first touch position when the first touch position is selected as the first candidate position. Moreover, a relative position is a position relative to the first touch position.

As can be seen from FIG. 34, the vibration strength at the first touch position is strongest (approximately 1.4) at the first candidate position [−2, 2]. In other words, in FIG. 34, the first candidate position [−2, 2] is determined to be the first control position.

It should be noted that the haptic signal S(n) is generated using the frequency ω used in step S712, as Equation 24 shows.

[Math 24]

$$s(n) = \sin(2\pi f_m n T_s)\sin(\omega n T_s) \quad (24)$$
$$f_m = \frac{\omega}{4\pi r}$$

(Advantageous Effect)

As described above, with the haptic feedback device 700 according to Embodiment 7, based on the first touch position and the second touch position, among a plurality of first candidate positions in the vicinity of the first touch position, it is possible to determine the first candidate position yielding the greatest vibration strength at the first touch position as the first control position. In other words, the haptic feedback device 700 can provide strong haptic feedback to the user since the vibration strength at the first touch position can be increased. Moreover, since the haptic feedback device 700 can reduce the energy needed to drive the actuators for realizing the vibration strength required at the first touch position, it is possible to increase energy efficiency.

It should be noted that in Embodiment 7, the second touch position is determined to be the second control position, but a position in the vicinity of the second touch position may be determined to be the second control position. In this case, for example, the control position determining unit 702 determines the first touch position to be the first control position, and for each of the plurality of second candidate positions in the second region, calculates the vibration strength at the first touch position upon the actuators being driven by the driving signals generated using the transfer functions from the actuators to the first control position and the transfer functions from the actuators to the second candidate position, then determines the second control position to be one of the second candidate positions yielding a vibration strength that is greater than or equal to a predetermined vibration strength.

When the second control position is determined in this manner, there are times when the second touch position and the second control position deviate. In this case, vibration occurs at the second touch position as well, but it is possible to make the vibration strength at the first touch position stronger.

Moreover, for example, the control position determining unit 702 may, for each combination of a plurality of first candidate positions in the first region and a plurality of second candidate positions in the second region, calculate the vibration strength at the first touch position upon the actuators 102 being driven by driving signals generated using the transfer functions from the actuators 102 to the first candidate position and the transfer functions from the actuators 102 to the second candidate position. Then, the control position determining unit 702, for example, may determine the first candidate position and the second candidate position yielding the greatest calculated vibration strength to be the first control position and the second control position, respectively. In this case, vibration occurs at the second touch position, but it is possible to make the vibration strength at the first touch position even stronger.

Embodiment 8

The haptic feedback device according to Embodiment 8 differs from the haptic feedback device according to Embodiment 1 in that it reduces the energy for driving the actuators or increases the vibration strength at the first touch position by permitting a vibration of a strength difficult for the user to detect at the second touch position. Hereinafter the haptic feedback device according to Embodiment 8 will be described focusing on the points that differ from Embodiment 1.

(Device Configuration)

Figure 35:
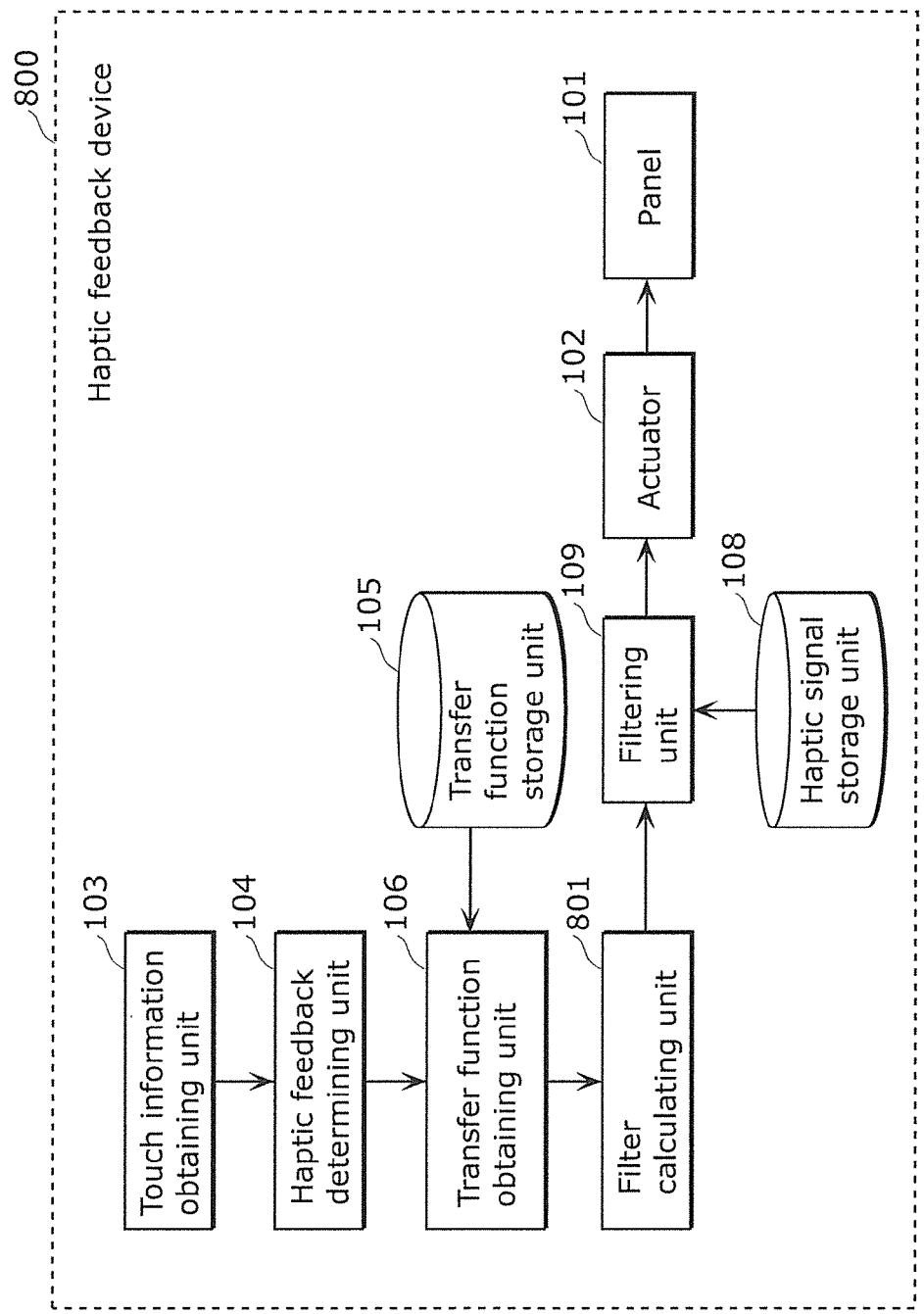
FIG. 35 shows the functional configuration of the haptic feedback device according to Embodiment 8.

FIG. 35 shows the functional configuration of a haptic feedback device 800 according to Embodiment 8. It should be noted that in FIG. 35, the structural elements that are the same as those in FIG. 2 share the same reference numerals, and as such, explanations thereof are omitted.

As FIG. 35 shows, the haptic feedback device 800 includes the panel 101, a plurality of the actuators 102, the touch information obtaining unit 103, the haptic feedback determining unit 104, the transfer function storage unit 105, the transfer function obtaining unit 106, a filter calculating unit 801, the haptic signal storage unit 108, and the filtering unit 109.

(Filter Calculating Unit 801)

The filter calculating unit 801 calculates the filters so that a sum of products, in the frequency domain, of the transfer functions from the actuators 102 to the first touch position and the filters indicates an impulse, and a sum of products, in the frequency domain, of the transfer functions from actuators 102 to the second touch position and the filters indicates a response signal having a vibration strength less than or equal to a predetermined vibration strength.

In other words, the filter calculating unit 801 calculates the filters using a modified version of the equation used to calculate the filters in the frequency domain shown in Variation 1 of Embodiment 1.

In Variation 1 of Embodiment 1, the filter calculating unit 107, in Equation 10, calculates the filter H using the response D shown in Equation 25.

[Math 25]

$$D = \begin{bmatrix} 1 \\ 0 \\ \vdots \end{bmatrix} \quad (25)$$

On the other hand, in Embodiment 8, the filter calculating unit 801 calculates the filter H using the response D shown in Equation 26. In other words, the filter calculating unit 801 permits the vibration having an amplitude $a_j$ and phase $\theta_j$ as the vibration at the second touch position.

In this way, the filter calculating unit 801 calculates the filter H so that the response at the first touch position is "1" and the amplitude of the response at the second touch position is $a_j$. At this time, the phase at the first touch position and the phase at the second touch position do not necessarily need to match. As such, an arbitrary value may be used as the phase $\theta_j$ at the second touch position.

[Math 26]

$$D = \begin{bmatrix} 1 \\ a_2 \exp(j\theta_2) \\ \vdots \\ a_m \exp(j\theta_m) \end{bmatrix} \quad (26)$$

In this way, as Equation 26 shows, when the target response D is determined, the filter calculating unit 801 calculates the filter H with Equation 27 for a frequency ω, similar to Variation 1 of Embodiment 1.

[Math 27]

$$H_{a_j\theta_j} G^* D \quad (27)$$

When the vibration strength at the second touch position is fixed (for example, $a_j$=0.1), in Equation 27, the filter H is dependent only on the phase $\theta_j$ in the response signal at the second touch position.

As such, the filter calculating unit 801 calculates a plurality of filter candidates by modifying the phase of the response signal, and calculates, as the filter to be used in the filtering, the filter candidate from among a plurality of filter candidates which yields a driving signal having a vibration strength less than or equal to a predetermined vibration strength through filtering. It should be noted that here, the filter calculating unit 801 changes the phase of the response signal, but the filter calculating unit 801 may change the amplitude of the response signal within a range which does not exceed a predetermined amplitude. It should be noted that here, the filter calculating unit 801 may change both the phase and amplitude of the response signal.

It should be noted that the filter calculating unit 801 may determine the filter based on the vibration strength at the first touch position rather than the vibration strength of the driving signal. Hereinafter the method of determining the filter based on the vibration strength at the first touch position will be described.

The vibration strength (amplitude) at the first touch position of the response signal obtained by the filter calculated using Equation 27 is calculated with Equation 28.

[Math 28]

$$A_{\theta_j} = \left| \sum_i G_{ij} \cdot H^i_{a_j\theta_j} \right| \quad (28)$$

At this time, the magnitude of the input signal to the actuator (i) is $|H_{a_j\theta_j}|$. Now, the case in which the strength $V_0$ of signals capable of being input to the actuators is predetermined will be considered. In other words, the case in which there is an upper limit to the input voltage or input power will be considered. Here, the vibration strength at the first touch position is calculated using Equation 29.

[Math 29]

$$A_{\theta_j} = \frac{V_0}{V_{a_j\theta_j}} \left| \sum_i G_{ij} \cdot H^i_{a_j\theta_j} \right| \quad (29)$$

Here, $V_{a_j\theta_j}$ is expressed in Equation 30.

[Math 30]

$$V_{a_j\theta_j} = \max_i \left( |H^i_{a_j\theta_j}| \right) \quad (30)$$

Here, the filter calculating unit 801 searches for phase θ at which the vibration strength A at the first touch position is the greatest while changing the phase $\theta_j$ at the second touch position, as Equation 31 shows. The method of solving Equation 31 at this time does not particularly need to be restricted. For example, it is possible to obtain an optimum solution using a numerical analysis method such as Newton's method.

[Math 31]

$$\hat{\theta}_j = \underset{\theta_j}{\mathrm{argmax}} A_{\theta_j} \quad (31)$$

The filter calculating unit 801 calculates the filter H(ω) as Equation 32 shows by inserting the phase calculated according to Equation 31 in Equation 27. The filter $H(\omega)$ calculated in this manner is a filter which makes the vibration strength at the first touch position the greatest among the plurality of filters corresponding to the plurality of phases.

[Math 32]

$$H(\omega) = H_{a\hat{\theta}_j} \tag{32}$$

The frequency $\omega$ may be a predetermined frequency like in Embodiment 7. A frequency $\omega_0$ which makes Equation 33 the smallest is also acceptable.

[Math 33]

$$\omega_0 = \underset{\omega}{\operatorname{argmin}} |H(\omega)| \tag{33}$$

It should be noted that with the above method, same fixed values are set as the vibration strength at the second touch position obtained by each actuator 102, but separate and different values may be set. In this case, it is possible to individually set the level for permissibility of the vibration strength at the second touch position obtained by each actuator 102. However, the amount of arithmetic when searching for the optimum phase increases.

Moreover, with the above method, the phase for the second touch position obtained by the actuators 102 is individually set, but a same phase may be set for the phase for the second touch position obtained by the actuators 102. In this case, an advantageous effect is achieved in that the amount of arithmetic for calculating the optimum phase is reduced.

(Operation)

Figure 36:
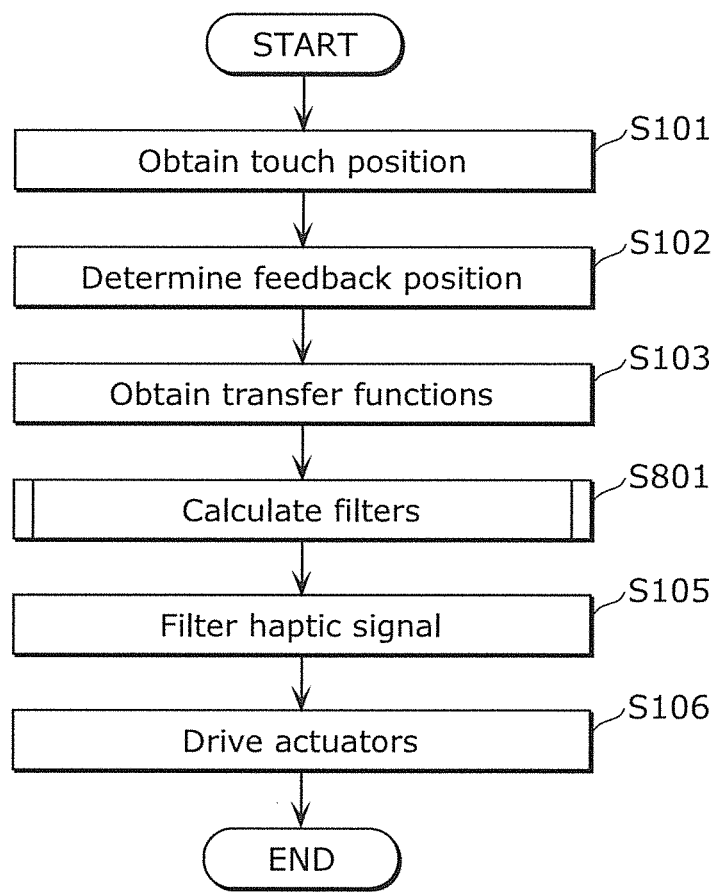
FIG. 36 is a flow chart showing operations performed by the haptic feedback device according to Embodiment 8.

Next, operations performed by each structural element of the haptic feedback device 800 having the above-described configuration will be described in detail. FIG. 36 is a flow chart showing operations performed by the haptic feedback device 800 according to Embodiment 8. It should be noted that in FIG. 36, the steps that are the same as those in FIG. 7 share the same reference numerals, and as such, explanations thereof are omitted.

The filter calculating unit 801 calculate filters based on the condition that vibrations of a magnitude undetectable by the user are permissible at the second touch position (S801). More specifically, the filter calculating unit 801 calculates the filters so that a sum of products, in the frequency domain, of the transfer functions from the actuators 102 to the first touch position and the filters indicates an impulse and a sum of products, in the frequency domain, of the transfer functions from actuators 102 to the second touch position and the filters indicates a response signal having a vibration strength less than or equal to a predetermined vibration strength. Even more specifically, the filter calculating unit 801 calculates the filters as FIG. 37 shows, for example.

Figure 37:
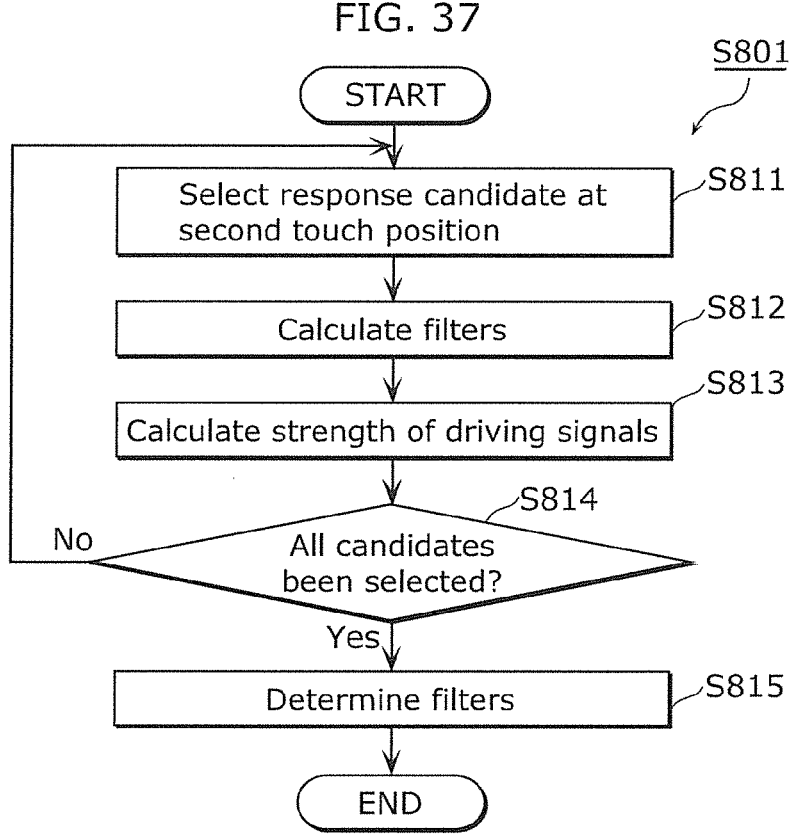
FIG. 37 is a flow chart showing operations performed by the filter calculating unit according to Embodiment 8.

FIG. 37 is a flow chart showing operations performed by the filter calculating unit 801 according to Embodiment 8.

First, the filter calculating unit 801 selects one candidate response signal not yet selected from among a plurality of response signal candidates having vibration strengths less than or equal to a predetermined vibration strength (S811). These plurality of response signal candidates are mutually different in regard to at least one of vibration strength or phase.

Next, the filter calculating unit 801 calculates filters using the selected response signal candidate (S812). More specifically, the filter calculating unit 801 calculates the filters as Equation 11 shows.

Next, the filter calculating unit 801 calculates the vibration strength of the driving signals obtained by filtering the haptic signal using the calculated filters (S813). More specifically, the filter calculating unit 801, for example, calculates, as the vibration strength, a statistical representative value (for example, an average value, a median value, or a maximum value) of the amplitude of a plurality of driving signals for the plurality of actuators 102.

Next, the filter calculating unit 801 determines whether all response signals have been selected in step S811 or not (S814). Here, when every response signal has not yet been selected (no in S814), the processing returns to step S811.

On the other hand, when all response signals have been selected (yes in S814), the filter calculating unit 801 determines the filter with which the smallest vibration strength is obtained among the plurality of vibration strengths calculated in step S814 to be the filter to be used for the filtering in step S105 (S815).

It should be noted that the filter calculating unit 801 may determine the filter with which a vibration strength less than or equal to a predetermine vibration strength is obtained among the plurality of vibration strengths to be the filter to be used for the filtering in step S105. The predetermined vibration strength may be determined, for example, based on the greatest driving strength of the actuators 102. In this case, when a vibration strength that is less than a predetermined vibration strength is calculated, filter calculating unit 801 may forcefully end the loop processing from step S811 to step S814, and perform step S815.

Figure 38:
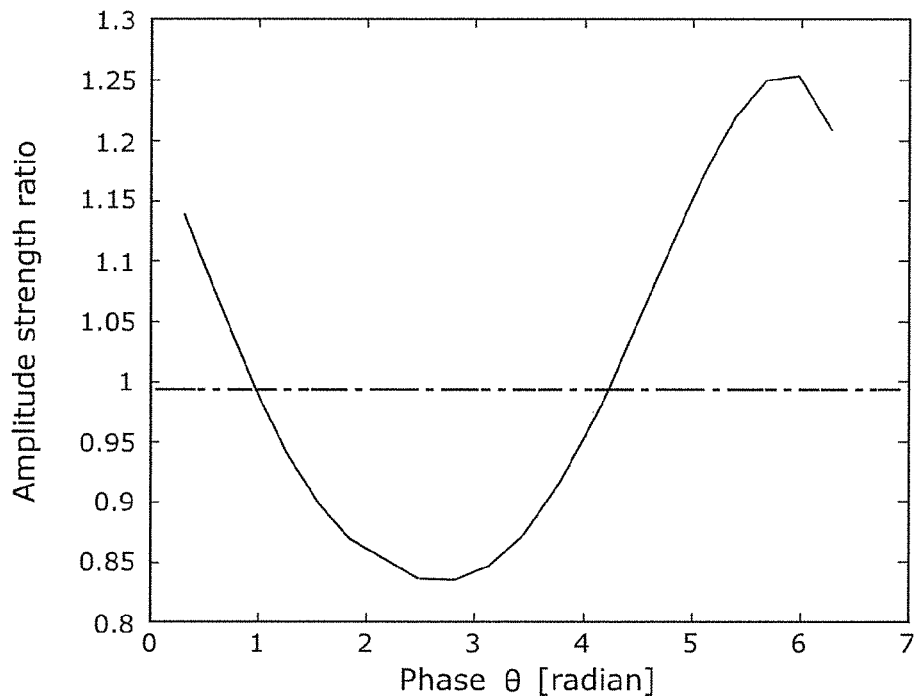
FIG. 38 is a graph showing an example of changes in vibration strength at the first touch position relative to the phase of the response signal at the second touch position, according to Embodiment 8.

FIG. 38 is a graph showing an example of changes in vibration strength at the first touch position relative to the phase of the response signal at the second touch position. More specifically, the graph in FIG. 38 shows the vibration strength at the first touch position obtained when the strength of the input signals to the actuators are constant, and the phase is changed in Equation 31, when the vibration strength at the second touch position is set to a=0.1. The horizontal axis represents the phase θ of the vibration at the second touch position. The vertical axis represents a relative vibration strength with respect to when the vibration strength at the first touch position shows "1" when the amplitude at the second touch position is "0".

As can be seen from FIG. 38, the relative strength at the first touch position when the phase is optimal is approximately 1.25, the vibration strength at the feedback position (the first touch position) increases.

(Advantageous Effect)

As described above, with the haptic feedback device 800 according to Embodiment 8, it is possible for haptic feedback to be provided at the feedback position and for haptic feedback weaker than the haptic feedback provided at the feedback position to be provided at a non-feedback position. As such, among multiple touches, it is possible to provide suitable haptic feedback by providing a touch requiring haptic feedback with haptic feedback that is different than what is provided for other touches. In other words, it is possible to reduce unnecessary confusion caused by haptic feedback. At this time, it is possible to reduce the vibration strength of the driving signals by permitting a subtle vibration undetectable by a user to be imparted at the non-feedback position (second touch position). In other words, it is possible to increase energy efficiency and efficiently provide haptic feedback. Moreover, when the vibration strength of the driving signals is not to be caused to change, it is possible to increase the vibration strength at the feedback position (the first touch position) and provide stronger haptic feedback.

It should be noted that in Embodiment 8, the vibration strength at the second touch position is defined in Equation 26, but it may be defined based on a ratio of the vibration strengths at the first touch position and the second touch position. For example, when a ratio of the vibration strengths at the first touch position and the second touch position of 10:1 is desired, in Equation 26, the vibration strength at the second touch position may be set to "0.1".

Hereinbefore, the haptic feedback device and the driving signal generating device according to one or more aspect of the present invention has been described based on the embodiments, but the present invention is not limited to these embodiments. Various modifications of the exemplary embodiments as well as embodiments resulting from combinations of constituent elements of the different exemplary embodiments that may be conceived by those skilled in the art are intended to be included within the scope of the one or more aspect as long as these do not depart from the essence of the present invention.

Some or all of the structural elements which make up the haptic feedback device and the driving signal generating device according to the above embodiments may be configured in the form of a single system Large Scale Integration (LSI). For example, the haptic feedback device may be configured in the form of a system LSI including the touch information obtaining unit 103, the haptic feedback determining unit 104, and the driving signal obtaining unit 402.

A system LSI is a super-multifunction LSI manufactured with a plurality of components integrated on a single chip and, specifically, is a computer system configured of a microprocessor, read only memory (ROM), and random access memory (RAM), for example. A computer program is stored in the ROM. The system LSI achieves its function as a result of the microprocessor operating according to the computer program.

It should be noted that here system LSI was used as an example, but depending on the degree of integration, IC, LSI, super LSI, and ultra LSI are also known. Moreover, the method of circuit integration is not limited to LSI. Integration may be realized with a specialized circuit or a general purpose processor. A Field Programmable Gate Array (FPGA) or a reconfigurable processor that allows reconfiguration of the connection or configuration of the inner circuit cells of the LSI circuit can be used after production of the LSI.

Furthermore, when advancement in semiconductor technology and derivatives of other technologies brings forth a circuit integration technology which replaces LSI, it will be appreciated that such a circuit integration technology may be used to integrate the functional blocks. Application of biotechnology is also a possibility.

Moreover, an aspect of the present invention may be a haptic feedback method in which characteristic structural units included in the haptic feedback device are realized as steps, not just a haptic feedback device. Moreover, an aspect of the present invention may also be a computer program realizing these characteristic steps included in the haptic feedback method with a computer. Moreover, an aspect of the present invention may also be a non-transitory computer-readable recording media on which this sort of computer program is recorded.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the haptic feedback device and the driving signal generating device according to each of the embodiments is a program described below.

That is, the program causes the computer to execute a haptic feedback method including: obtaining a plurality of touch positions on the panel by detecting a plurality touches having a state of concurrent contact on the panel; determining a first touch position at which to provide haptic feedback from among the plurality of touch positions; obtaining first driving signals for driving the plurality of actuators to vibrate the panel at the first touch position according to a first haptic signal and vibrate the panel at a second touch position included in the plurality of touch positions more weakly than at the first touch position, the first driving signals being generated using transfer functions from the plurality of actuators to the first touch position or a vicinity thereof and transfer functions from the plurality of actuators to the second touch position or a vicinity thereof; and driving the plurality of actuators based the first driving signals.

Moreover, the program causes the computer to execute a driving signal generation method of generating driving signals for driving a plurality of actuators to vibrate a panel to provide haptic feedback to a user and a haptic feedback method of providing haptic feedback to a user by vibrating a panel with a plurality of actuators placed in mutually different positions on the panel, the driving signal generation method including: obtaining transfer functions from the plurality of actuators to a plurality of positions on the panel; and generating driving signals for driving the plurality of actuators to, with respect to an arbitrary combination of the plurality of positions on the panel, vibrate the panel at one position according to a first haptic signal and vibrate the panel at an other position more weakly than at the one position, the driving signals being generated using the transfer functions from the plurality of actuators to the one position or a vicinity thereof and the transfer functions from the plurality of actuators to the other position or a vicinity thereof.

INDUSTRIAL APPLICABILITY

The haptic feedback device according to one aspect of the present invention is capable of providing mutually different haptic feedback at multiple touches, and as such is applicable in user interfaces in televisions, digital still cameras, digital movie cameras, personal computers, portable information devices, and cellular phones, for example. The haptic feedback device is also applicable to devices having a screen which a plurality of people touch at the same time, such as digital blackboards and displays for digital signs.

REFERENCE SIGNS LIST

100, 200, 300, 400, 500, 600, 700, 800 haptic feedback device
101 panel
102 actuator
103 touch information obtaining unit
104, 204, 502 haptic feedback determining unit
105 transfer function storage unit
106, 701 transfer function obtaining unit
107, 207, 703, 801 filter calculating unit
108 haptic signal storage unit
109, 209 filtering unit
110 display apparatus
210 signal adding unit
301 filter storage unit 302 filter obtaining unit
350 filter calculating device
401 driving signal storage unit
402 driving signal obtaining unit
450 driving signal generating device
501 touch position estimating unit
601 driving signal generating unit
702 control position determining unit

The invention claimed is:

1. A haptic feedback device which provides haptic feedback to a user by vibrating a panel, the haptic feedback device comprising:
   the panel;
   a plurality of actuators placed in mutually different positions on the panel for vibrating the panel;
   a touch information obtaining unit configured to obtain a plurality of touch positions on the panel by detecting a plurality of touches having a state of concurrent contact on the panel;
   a haptic feedback determining unit configured to determine a first touch position at which to provide haptic feedback from among the plurality of touch positions;
   a driving signal obtaining unit configured to obtain first driving signals for driving the plurality of actuators to vibrate the panel at the first touch position according to a first haptic signal and vibrate the panel at a second touch position included in the plurality of touch positions more weakly than at the first touch position, the first driving signals being generated using transfer functions from the plurality of actuators to the first touch position or a plurality of first candidate positions and transfer functions from the plurality of actuators to the second touch position or a plurality of second candidate positions, and the first driving signals being generated using the transfer functions from the plurality of actuators to at least one of the plurality of first candidate positions and the plurality of second candidate positions; and
   a control position determining unit configured to determine a first control position within a first region and a second control position within a second region, the first region having a predetermined size and including the first touch position and the plurality of first candidate positions, the second region having a predetermined size and including the second touch position and the plurality of second candidate positions, and the control position determining unit is configured to determine at least one of the first control position and the second control position from vibration strengths calculated at the first touch position for the plurality of first candidate positions and the plurality of second candidate positions, respectively,
   wherein the plurality of actuators vibrate the panel based on the first driving signals,
   wherein the driving signal obtaining unit is configured to obtain, as the first driving signals, signals generated using transfer functions from the plurality of actuators to the first control position and transfer functions from the plurality of actuators to the second control position, and
   wherein the control position determining unit is configured to determine, as the first control position, one of the plurality of first candidate positions which yields a vibration strength at the first touch position that is greater than or equal to a predetermined vibration strength.

2. The haptic feedback device according to claim 1, wherein the driving signal obtaining unit is further configured to obtain second driving signals for driving the plurality of actuators to vibrate the panel at the second touch position according to a second haptic signal and cause the panel to not vibrate at the first touch position, the second driving signals being generated using the transfer functions from the plurality of actuators to the first touch position and the transfer functions from the plurality of actuators to the second touch position, and
   the haptic feedback device further comprises a signal adding unit configured to sum the first driving signals and the second driving signals for the plurality of actuators,
   wherein the plurality of actuators vibrate the panel based on the summed signals.

3. The haptic feedback device according to claim 1, further comprising
   a driving signal storage unit which stores driving signals for driving the plurality of actuators to, with respect to an arbitrary combination of a plurality of positions on the panel, vibrate the panel at one position according to the first haptic signal and cause the panel to not vibrate at an other position, the driving signals being generated using transfer functions from the plurality of actuators to the one position and transfer functions from the plurality of actuators to the other position,
   wherein the driving signal obtaining unit is configured to obtain the driving signals that each correspond to both the first touch position and the second touch position from the driving signal storage unit as the first driving signals.

4. The haptic feedback device according to claim 1, wherein the driving signal obtaining unit is configured to generate the first driving signals using the first haptic signal and the transfer functions from the plurality of actuators to the first touch position and the second touch position.

5. The haptic feedback device according to claim 1, wherein the first haptic signal is determined based on a vibration characteristic of the panel.

6. The haptic feedback device according to claim 1, further comprising
   a touch position estimating unit configured to, for each of the plurality of touch positions obtained, based on temporal changes in the touch position, estimate a touch position of a touch to be made a predetermined amount of time later,
   wherein the haptic feedback determining unit is configured to determine the first touch position and the second touch position from among the touch positions estimated.

7. The haptic feedback device according to claim 1, wherein the transfer functions are impulse responses from the plurality of actuators to the first touch position and the second touch position.

8. The haptic feedback device according to claim 1, wherein the control position determining unit is configured to:
   determine the second touch position to be the second control position; and
   for each of the plurality of first candidate positions within the first region, calculate a vibration strength at the first touch position upon the plurality of actuators being driven by driving signals generated using transfer functions from the plurality of actuators to the plurality of first candidate positions and transfer functions from the plurality of actuators to the second control position, and determine the first control position to be the one of the plurality of first candidate positions yielding the vibration strength that is greater than or equal to the predetermined vibration strength.

9. The haptic feedback device according to claim 1, wherein the control position determining unit is configured to:
determine the first touch position to be the first control position; and
for each of the plurality of second candidate positions within the second region, calculate a vibration strength at the first touch position upon the plurality of actuators being driven by driving signals generated using the transfer functions from the plurality of actuators to the first control position and transfer functions from the plurality of actuators to the plurality of second candidate positions, and determine the second control position to be one of the plurality of second candidate positions yielding a vibration strength that is greater than or equal to the predetermined vibration strength.

10. The haptic feedback device according to claim 1, wherein for each combination of the plurality of first candidate positions in the first region and the plurality of second candidate positions in the second region, the control position determining unit is configured to calculate a vibration strength at the first touch position upon the plurality of actuators being driven by driving signals generated using transfer functions from the plurality of the actuators to the plurality of first candidate positions and transfer functions from the plurality of actuators to the plurality of second candidate positions, and determine the first control position to be the one of the plurality of first candidate positions yielding the vibration strength that is greater than or equal to the predetermined vibration strength, and determine the second control position to be one of the plurality of second candidate positions yielding a vibration strength that is greater than or equal to the predetermined vibration strength.

11. The haptic feedback device according to claim 1, further comprising
a filter obtaining unit configured to obtain first filters for generating, by filtering a given haptic signal, driving signals for driving the plurality of actuators to vibrate the panel at the first touch position according to the given haptic signal and vibrate the panel at the second touch position according to a signal having a weaker vibration strength than the given haptic signal,
wherein the driving signal obtaining unit is configured to obtain the first driving signals by filtering the first haptic signal with the first filters.

12. The haptic feedback device according to claim 11, wherein the filter obtaining unit being configured to obtain the first filters includes the filter obtaining unit being configured to calculate the first filters, so that a sum of convolution results, in a time domain, of the transfer functions from the plurality of actuators to the first touch position and the first filters indicates an impulse, and a sum of convolution results, in the time domain, of the transfer functions from the plurality of actuators to the second touch position and the first filters indicates zero.

13. The haptic feedback device according to claim 11, wherein the filter obtaining unit being configured to obtain the first filters includes the filter obtaining unit being configured to calculate the first filters, so that a sum of products, in a frequency domain, of the transfer functions from the plurality of actuators to the first touch position and the first filters indicates an impulse, and a sum of products, in the frequency domain, of the transfer functions from the plurality of actuators to the second touch position and the first filters indicates zero.

14. The haptic feedback device according to claim 11, further comprising
a filter storage unit which stores filters for generating, by filtering a given haptic signal, driving signals for driving the plurality of actuators to, with respect to an arbitrary combination of a plurality of positions on the panel, vibrate the panel at one position according to the given haptic signal and cause the panel to not vibrate at an other position,
wherein the filter obtaining unit is configured to obtain the filters that each correspond to both the first touch position and the second touch position from the filter storage unit as the first filters.

15. The haptic feedback device according to claim 11, wherein the filter obtaining unit being configured to obtain the first filters includes the filter obtaining unit being configured to calculate the first filters, so that a sum of products, in a frequency domain, of the transfer functions from the plurality of actuators to the first touch position and the first filters indicates an impulse, and a ratio of (i) a sum of products, in the frequency domain, of the transfer functions from the plurality of actuators to the first touch position and the first filters and (ii) a sum of products, in the frequency domain, of the transfer functions from the plurality of actuators to the second touch position and the first filters indicates a response signal having a vibration strength greater than or equal to a predetermined vibration strength ratio.

16. The haptic feedback device according to claim 11, wherein the filter obtaining unit being configured to obtain the first filters includes the filter obtaining unit being configured to calculate the first filters, so that a sum of products, in a frequency domain, of the transfer functions from the plurality of actuators to the first touch position and the first filters indicates an impulse, and a sum of products, in the frequency domain, of the transfer functions from the plurality of actuators to the second touch position and the first filters indicates a response signal having a vibration strength less than or equal to a predetermined vibration strength.

17. The haptic feedback device according to claim 16, wherein the filter obtaining unit is configured to calculate a plurality of first filter candidates by modifying at least one of an amplitude and a phase of the response signal, and calculate as the first filters, the first filter candidates from among the plurality of first filter candidates that yield, through filtering, driving signals having a vibration strength less than or equal to a predetermined vibration strength.

18. A haptic feedback method of providing haptic feedback to a user by vibrating a panel with a plurality of actuators placed in mutually different positions on the panel, the haptic feedback method comprising:
obtaining a plurality of touch positions on the panel by detecting a plurality of touches having a state of concurrent contact on the panel;
determining a first touch position at which to provide haptic feedback from among the plurality of touch positions;
obtaining first driving signals for driving the plurality of actuators to vibrate the panel at the first touch position according to a first haptic signal and vibrate the panel at a second touch position included in the plurality of touch positions more weakly than at the first touch position, the first driving signals being generated using transfer functions from the plurality of actuators to the first touch position or a plurality of first candidate positions and transfer functions from the plurality of actuators to the second touch position or a plurality of second candidate positions, and the first driving signals being generated using the transfer functions from the plurality of actuators to at least one of the plurality of first candidate positions and the plurality of second candidate positions;

determining a first control position within a first region and a second control position within a second region, the first region having a predetermined size and including the first touch position and the plurality of first candidate positions, the second region having a predetermined size and including the second touch position and the plurality of second candidate positions, and determining at least one of the first control position and the second control position from vibration strengths calculated at the first touch position for the plurality of first candidate positions and the plurality of second candidate positions, respectively; and driving the plurality of actuators based on the first driving signals, wherein the obtaining of the first driving signals comprises obtaining signals generated using transfer functions from the plurality of actuators to the first control position and transfer functions from the plurality of actuators to the second control position as the first driving signals, and wherein the determining of the first control position comprises determining one of the plurality of first candidate positions which yields a vibration strength at the first touch position that is greater than or equal to a predetermined vibration strength as the first control position.

19. A haptic feedback device which provides haptic feedback to a user by vibrating a panel, the haptic feedback device comprising:

a driving signal generating device which generates driving signals for driving a plurality of actuators to vibrate the panel to provide the haptic feedback to the user, the driving signal generating unit including:

a transfer function obtaining unit configured to obtain transfer functions from the plurality of actuators to a plurality of positions on the panel; and a driving signal generating unit configured to generate the driving signals for driving the plurality of actuators to, with respect to an arbitrary combination of the plurality of positions on the panel, vibrate the panel at one position according to a first haptic signal and vibrate the panel at another position more weakly than at the one position, the driving signals being generated using the transfer functions from the plurality of actuators to the one position or a plurality of first candidate positions and the transfer functions from the plurality of actuators to the other position or a plurality of second candidate positions, and the driving signals being generated using the transfer functions from the plurality of actuators to at least one of the plurality of first candidate positions and the plurality of second candidate positions; and a control position determining unit configured to determine a first control position within a first region and a second control position within a second region, the first region having a predetermined size and including the one position and the plurality of first candidate positions, the second region having a predetermined size and including the other position and the plurality of second candidate positions, and the control position determining unit is configured to determine at least one of the first control position and the second control position from vibration strengths calculated at the one position for the plurality of first candidate positions and the plurality of second candidate positions, respectively, wherein the driving signal generating unit is configured to generate, as the driving signals, signals generated using transfer functions from the plurality of actuators to the first control position and transfer functions from the plurality of actuators to the second control position, and wherein the control position determining unit is configured to determine, as the first control position, one of the plurality of first candidate positions which yields a vibration strength at the one position that is greater than or equal to a predetermined vibration strength.

20. A haptic feedback method of providing haptic feedback to a user by vibrating a panel with a plurality of actuators placed in mutually different positions on the panel, the haptic feedback method comprising:

generating driving signals for driving a the plurality of actuators to vibrate the panel to provide the haptic feedback to the user, the generating including:

obtaining transfer functions from the plurality of actuators to a plurality of positions on the panel; and generating the driving signals for driving the plurality of actuators to, with respect to an arbitrary combination of the plurality of positions on the panel, vibrate the panel at one position according to a first haptic signal and vibrate the panel at another position more weakly than at the one position, the driving signals being generated using the transfer functions from the plurality of actuators to the one position or a plurality of first candidate positions and the transfer functions from the plurality of actuators to the other position or a plurality of second candidate positions, and the driving signals being generated using the transfer functions from the plurality of actuators to at least one of the plurality of first candidate positions and the plurality of second candidate positions; and determining a first control position within a first region and a second control position within a second region, the first region having a predetermined size and including the one position and the plurality of first candidate positions, the second region having a predetermined size and including the other position and the plurality of second candidate positions, and determining at least one of the first control position and the second control position from vibration strengths calculated at the one position for the plurality of first candidate positions and the plurality of second candidate positions, respectively, wherein the generating of the driving signals comprises generating signals generated using transfer functions from the plurality of actuators to the first control position and transfer functions from the plurality of actuators to the second control position as the driving signals, and wherein the determining of the first control position comprises determining one of the plurality of first candidate positions which yields a vibration strength at the one position that is greater than or equal to a predetermined vibration strength is determined as the first control position.

* * * * *